(12) United States Patent
Zawistowski

(10) Patent No.: US 12,403,979 B2
(45) Date of Patent: Sep. 2, 2025

(54) 6-BAR VEHICLE SUSPENSION LINKAGE WITH DRIVE TRAIN IDLER

(71) Applicant: YETI CYCLING, LLC, Golden, CO (US)

(72) Inventor: Peter Zawistowski, Lakewood, CO (US)

(73) Assignee: YETI CYCLING, LLC, Golden, CO (US)

( * ) Notice: Subject to any disclaimer, the term of this patent is extended or adjusted under 35 U.S.C. 154(b) by 750 days.

(21) Appl. No.: 17/187,235

(22) Filed: Feb. 26, 2021

(65) Prior Publication Data

US 2021/0269117 A1     Sep. 2, 2021

Related U.S. Application Data

(60) Provisional application No. 62/983,322, filed on Feb. 28, 2020.

(51) Int. Cl.
*B62K 25/28*    (2006.01)
*B62K 25/26*    (2006.01)
*B62M 6/40*    (2010.01)

(52) U.S. Cl.
CPC .......... *B62K 25/286* (2013.01); *B62M 6/40* (2013.01); *B62K 25/26* (2013.01)

(58) Field of Classification Search
CPC ...... B62K 25/26; B62K 25/28; B62K 25/286; B62K 25/20; B62M 6/40
USPC ................................................. 280/261, 284
See application file for complete search history.

(56) References Cited

U.S. PATENT DOCUMENTS

| | | | |
|---|---|---|---|
| 944,795 A | 12/1909 | Leet et al. | |
| 5,282,517 A | 2/1994 | Prince | |
| 5,413,368 A | 5/1995 | Pong et al. | |
| 5,725,450 A | 3/1998 | Huskey | |
| 5,901,974 A | 5/1999 | Busby et al. | |

(Continued)

FOREIGN PATENT DOCUMENTS

| | | |
|---|---|---|
| AU | 2016102059 A4 | 1/2017 |
| DE | 19726067 B4 | 4/2006 |

(Continued)

OTHER PUBLICATIONS

U.S. Patent and Trademark Office, Final Office Action mailed on Jul. 22, 2021, for U.S. Appl. No. 15/925,165, 15 pages.

(Continued)

*Primary Examiner* — Anne Marie M Boehler
(74) *Attorney, Agent, or Firm* — Dorsey & Whitney LLP

(57) ABSTRACT

A two-wheel vehicle suspension linkage comprising: a suspended body 1, a wheel carrier body 2, a link body 3, a link body 4, a link body 5, and a link body 6 operatively coupled defining a primary instantaneous velocity center at each joint between link bodies; a driven cog operatively connected to a rear wheel; a driving cog operatively connected to the suspended body 1; an idler operatively connected by an elongated flexible member to a link body, wherein the idler is rotatable about an idler rotation axis; an elongated flexible member is disposed along a route between the driving cog and the driven cog. The idler is disposed in the route between the driving cog and the driven cog; and a damper unit is configured to resist movement between two or more of the link bodies.

35 Claims, 55 Drawing Sheets

(56) References Cited

U.S. PATENT DOCUMENTS

| | | |
|---|---|---|
| 6,203,042 B1 | 3/2001 | Wilcox |
| 6,644,677 B1 | 11/2003 | Rose |
| 7,059,983 B2 | 6/2006 | Heim |
| 7,066,481 B1 | 6/2006 | Soucek |
| 7,097,190 B2 | 8/2006 | Matsumoto et al. |
| 7,104,562 B2 | 9/2006 | Schmider et al. |
| 7,210,695 B2 | 5/2007 | Griffiths |
| 7,296,815 B2 | 11/2007 | Ellsworth et al. |
| 7,395,892 B2 | 7/2008 | Alonzo |
| 7,556,276 B1 | 7/2009 | Dunlap |
| 7,708,297 B2 | 5/2010 | Thorpe |
| 7,938,424 B2 | 5/2011 | Arraiz |
| 7,955,205 B2 | 6/2011 | Urabe |
| 7,971,892 B2 | 7/2011 | Sasnowski et al. |
| 8,376,382 B2 | 2/2013 | Twers |
| 8,434,776 B2 | 5/2013 | Wuthrich |
| 8,491,429 B2 | 7/2013 | Cranston et al. |
| 8,991,846 B2 | 3/2015 | Twers |
| 9,061,729 B2 | 6/2015 | Canfield et al. |
| 9,168,977 B2 | 10/2015 | Mcleay |
| 9,187,148 B2 | 11/2015 | Jewell |
| 9,908,583 B2 | 3/2018 | Matheson et al. |
| 10,093,387 B2 | 10/2018 | Beutner |
| 10,099,739 B2 | 10/2018 | Nishikawa |
| 10,377,442 B2 | 8/2019 | Neilson |
| 10,464,635 B2 | 11/2019 | Pfeiffer |
| 10,640,169 B2 | 5/2020 | Pedretti |
| 10,703,433 B2 | 7/2020 | Lauer |
| 10,737,742 B2 | 8/2020 | Soncrant |
| 10,926,830 B2 | 2/2021 | Zawistowski |
| 11,052,964 B2 | 7/2021 | Wallace |
| 2003/0160421 A1 | 8/2003 | Assier |
| 2003/0193163 A1 | 10/2003 | Chamberlain et al. |
| 2003/0193164 A1 | 10/2003 | Parigian |
| 2006/0030440 A1 | 2/2006 | Zmurko |
| 2006/0061059 A1 | 3/2006 | Lesage et al. |
| 2006/0225942 A1 | 10/2006 | Weagle |
| 2009/0261557 A1 | 10/2009 | Beale et al. |
| 2009/0322055 A1 | 12/2009 | Arraiz |
| 2011/0140387 A1 | 6/2011 | Andal et al. |
| 2012/0142469 A1 | 6/2012 | Barefoot et al. |
| 2012/0223504 A1 | 9/2012 | Antonot |
| 2012/0228850 A1 | 9/2012 | Tseng |
| 2014/0042726 A1 | 2/2014 | Canfield et al. |
| 2014/0060950 A1 | 3/2014 | Beutner |
| 2015/0035241 A1 | 2/2015 | McLeay |
| 2015/0360743 A1 | 12/2015 | Oconnor |
| 2016/0257371 A1 | 9/2016 | Droux |
| 2016/0318582 A1 | 11/2016 | Johnson et al. |
| 2016/0375956 A1 | 12/2016 | Talavasek et al. |
| 2017/0101152 A1 | 4/2017 | Pedretti |
| 2017/0151996 A1 | 6/2017 | Southall |
| 2018/0037295 A1 | 2/2018 | Beale |
| 2018/0072378 A1 | 3/2018 | Talavasek et al. |
| 2018/0072379 A1 | 3/2018 | Talavasek et al. |
| 2018/0072380 A1 | 3/2018 | Talavasek et al. |
| 2018/0072739 A1 | 3/2018 | Goldman et al. |
| 2018/0140387 A1 | 5/2018 | Richard |
| 2018/0148123 A1* | 5/2018 | Neilson ............... B62K 25/286 |
| 2018/0265165 A1 | 9/2018 | Zawistowski |
| 2018/0304958 A1 | 10/2018 | Madsen |
| 2019/0039682 A1 | 2/2019 | Zawistowski |
| 2019/0300097 A1 | 10/2019 | Chamberlain |
| 2020/0031428 A1 | 1/2020 | Lund et al. |
| 2020/0079470 A1 | 3/2020 | Saiki |
| 2020/0247500 A1 | 8/2020 | Zawistowski |
| 2021/0046996 A1 | 2/2021 | Beale |
| 2022/0153381 A1 | 5/2022 | Zawistowski et al. |
| 2022/0306240 A1 | 9/2022 | Talavasek et al. |
| 2023/0070334 A1 | 3/2023 | Zawistowski |

FOREIGN PATENT DOCUMENTS

| | | |
|---|---|---|
| DE | 102004059187 A1 | 6/2006 |
| DE | 102019002456 A1 | 10/2019 |
| EP | 1026073 A1 | 8/2000 |
| EP | 1238900 A2 | 9/2002 |
| EP | 2706002 A1 | 3/2014 |
| EP | 1799534 B1 | 8/2014 |
| EP | 2812234 A1 | 12/2014 |
| EP | 3235711 A1 | 10/2017 |
| FR | 2520321 A1 | 7/1983 |
| FR | 2766452 B1 | 9/1999 |
| FR | 2807730 B1 | 7/2002 |
| GB | 1087559 A | 10/1967 |
| GB | 2086319 A | 5/1982 |
| GB | 2338216 A | 12/1999 |
| GB | 2522461 A | 7/2015 |
| GB | 2590808 B | 7/2022 |
| GB | 2605244 A | 9/2022 |
| NL | 2027223 B1 | 2/2022 |
| WO | 03064243 A1 | 8/2003 |
| WO | 2010143795 A1 | 12/2010 |
| WO | 2015004490 A1 | 1/2015 |
| WO | 2018170505 A1 | 9/2018 |
| WO | 2019010394 A1 | 1/2019 |
| WO | 2020107055 A1 | 6/2020 |
| WO | 2021133996 A1 | 7/2021 |
| WO | 2021174088 A1 | 9/2021 |
| WO | 2021257865 A1 | 12/2021 |
| WO | 2023039543 A1 | 3/2023 |

OTHER PUBLICATIONS

European Patent Office, EP Extended Search Report, mailed Sep. 21, 2022, for European Application No. 20747607.8, 2 pages.

Netherlands Intellectual Property Office, Search Report and Opinion, issued Nov. 15, 2021, for Dutch Application No. 2027668, 24 pages.

Smurthwaite, James, Pinkbike, "Spotted: A New Commencal Supreme Breaks Cover at the Portugal Cup," published Mar. 7, 2022, 4 pages.

Roberts, Dan, Pinkbike, "What's Going On With Commencal's Prototype DH Race Bike?", published Jun. 9, 2021, 9 pages.

European Patent Office, "Communication Pursuant to Article 94(3) EPC," mailed Jul. 8, 2022, for European Application No. 18768549.0, 6 pages.

European Patent Office, "Extended European Search Report," mailed Oct. 4, 2022, for European Application No. 20747607.8, 6 pages.

German Patent Office, "Examination Notice and Search Report," mailed Apr. 13, 2022, for German Application No. 10 2020 134 843.6, 7 pages.

U.K. Intellectual Property Office, "Search Report," mailed Jul. 7, 2022, for U.K. Application No. GB2208682.1, 3 pages.

U.S. Patent and Trademark Office, "Non-Final Office Action," mailed Sep. 16, 2022, for U.S. Appl. No. 16/705,049, 10 pages.

Brown, "Preview: Nicolai Bikes Available in the U.S.: The belt-drive, big-hit bikes will be distributed by Nicolai USA," Bike Mag, Jun. 3, 2014, 9 pages.

Overholt, "Soc 14: Effigear Calls in the Cavalerie for new Gear Box Bikes in the US," Bike Rumor, Apr. 23, 2014, 16 pages.

U.S. Patent and Trademark Office, "International Search Report," mailed Jan. 20, 2023, for PCT Application No. PCT/US2022/076232, 2 pages.

U.S. Patent and Trademark Office, "Written Opinion," mailed Jan. 20, 2023, for PCT Application No. PCT/US2022/076232, 11 pages.

"Combined Search and Examination Report under Sections 17 and 18(3)", mailed by U.K. Intellectual Property Office on Aug. 25, 2021, for U.K. Application No. GB2102854.3, 8 pages.

"Extended European Search Report for EP 18768549.0", mailed Feb. 8, 2021.

"International Search Report & Written Opinion", mailed on Jul. 16, 2021, for PCT Application No. PCT/US2021/020034, 16 pages.

"International Search Report & Written Opinion mailed Apr. 13, 2021, in PCT Application No. PCT/US2020/066980, 16 pages".

"Netherlands Patent Office, Written Opinion and Search Report mailed Sep. 24, 2021", in Dutch and English, for Netherlands Application No. 2027223, 17 pages.

"U.K. Intellectual Property Office, "Combined Search and Examination Report under Sections 17 an 18(3),"", mailed Apr. 21, 2021, for U.K. Application No. GB2020235.4, 6 pages.

(56) References Cited

OTHER PUBLICATIONS

GB IPO, "Combined Search and Exam Report", App. No. 2020235.4, Apr. 21, 2021, 6 pages.
MTBR: Mountain Bike Review Forum, , "Jayem Discussion Starter #1—Knolly Suing Intense for Building Bikes with Seat-tubes in Front of the BB", https://www.mtbr.com/threads/knolly-suing-intense-for-building-bikes-with-seat-tubes-in-front-of-the-bb.1173867/, Jan. 2021, 16 pages.
Worsey, "Forbidden Druid Review—Are high pivots just for downhill?", Enduro, [online], Mar. 4, 2019 [retrieved on Jun. 16, 2021], From Internet: <url: https://enduro-mtb.com/en/fobidden-druid-review/>; 15 pages.
Netherlands Patent Office, "Written Opinion and Search Report," mailed Feb. 22, 2023, for Dutch Application No. 2029897, Dutch with partial English translation, 12 pages.
Aston, P., "Robot Bike Co R160 Custom—Review," Outside Magazine, Oct. 17, 2016, 46 pages.
Nicolai Maschinenbau, "History of Nicolai," Gesellschaft für Zweirad und Maschinenbau mbh, at least as early as 1995, 3 pages.
Nicolai, "Nicolai Trombone Frame," at least as early as 1995, 6 pages.

\* cited by examiner

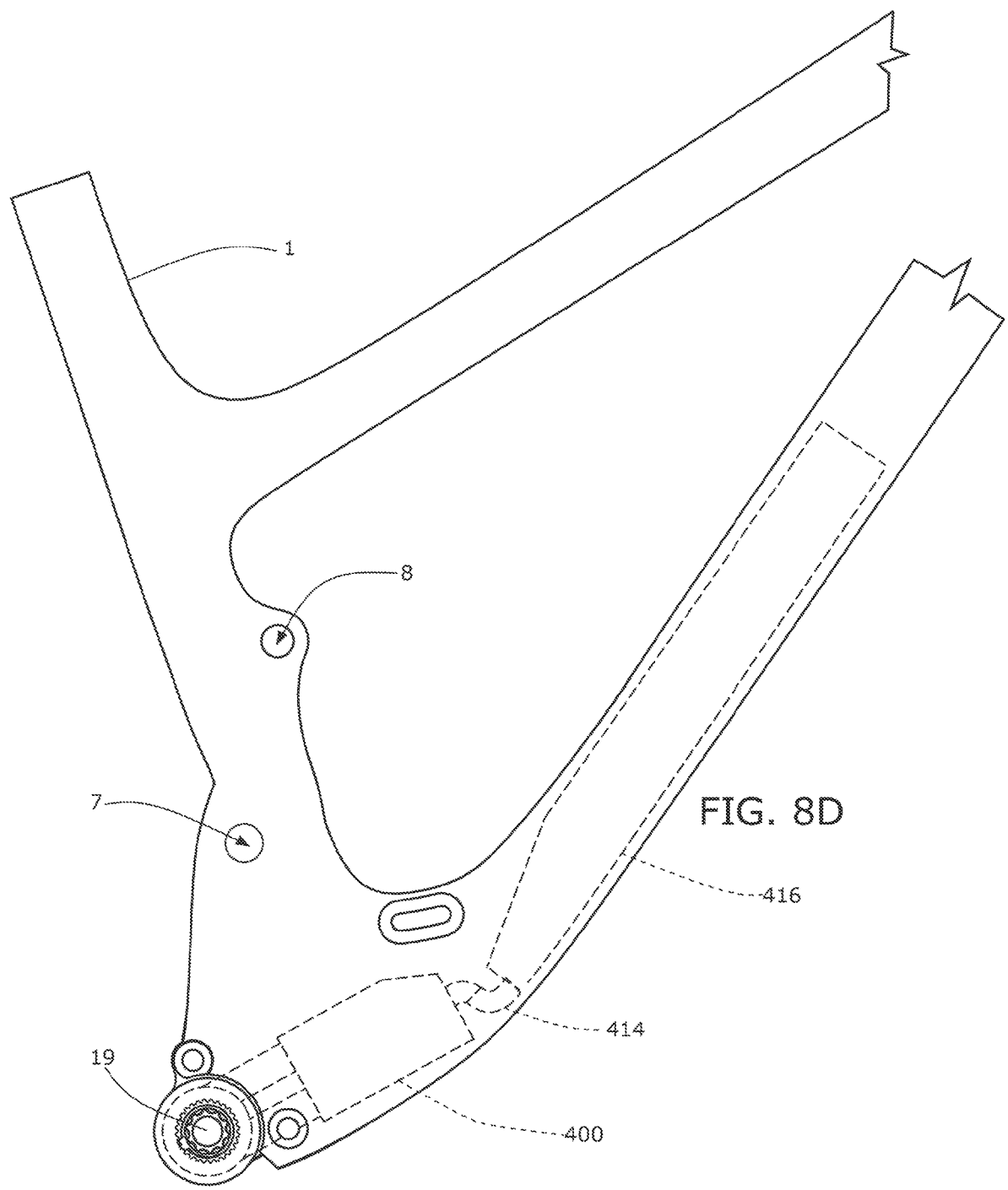

6-BAR VEHICLE SUSPENSION LINKAGE WITH DRIVE TRAIN IDLER

CROSS-REFERENCE TO RELATED APPLICATIONS

This application claims the benefit of priority pursuant to 35 U.S.C. § 119 (e) of U.S. provisional patent application No. 62/983,322, filed 28 Feb. 2020 and entitled "6-Bar Vehicle Suspension Linkage with Drive Train Idler," which is hereby incorporated by reference herein in its entirety.

TECHNICAL FIELD

The technology described herein relates to vehicle suspension systems, specifically, to linkages and drive trains within a vehicle suspension system.

BACKGROUND

Vehicle suspension terminology depends upon the reference frame considered. Consider a static vehicle that has two wheels, each of which are supported by the ground. Such vehicles can include a suspended body and a non-suspended body operatively coupled to each wheel. In a two-wheel vehicle, such as a bicycle, electric bicycle or pedelec or motorcycle, etc. there is typically one rear wheel known as the driven wheel, which includes a driven cog. The driven cog is often part of a group of cogs called a cassette wherein different cog sizes may be shifted into to alter the gear ratio. There is also one front wheel. The driving cog is typically coupled to the suspended body. A derailleur mechanism may be used to shift the driving chain or belt into various driven cogs of the cassette. The driving cog, which is connected to the driven cog via the driving chain/belt, is rotated by a crank under human power, or by a motor, or by combined motor and human power. The reaction of the driven wheel and the ground causes the vehicle to accelerate forward, or in the general direction from the rear wheel to the front wheel. Rearward is then defined as the general direction from the front wheel to the rear wheel.

A linkage operatively couples the suspended body and the driven wheel. A linkage may be composed of multiple bodies (often referred to as links or members) that are typically coupled to each other in a manner that allows the bodies the suspended body and the non-suspended body to move relative to one another, such as by flexing, camming, rotating, and/or translating relative to one another. The linkage constrains the movement of the suspended body and the non-suspended body relative to one another, during which movement of the driven wheel and brake on the non-suspended body may move relative to the suspended body. A combination of damper(s) and/or spring(s) is/are typically arranged to react to relative motion between the suspended body and the driven wheel. The linkage may be highly responsible for the vehicle's dynamic response to acceleration and deceleration as well as the mechanical advantage over the shock/damper. While the shock/damper may resist movement of the suspension linkage, the path of the driven wheel and/or driven wheel axis between extended and compressed positions of the suspension linkage is not affected by the presence or absence of the shock/damper. The shock/damper does not affect the degrees of freedom of the suspension linkage. The shock/damper does not affect the relative motion of the links making up the suspension linkage is not affected.

The information included in this Background section of the specification, including any references cited herein and any description or discussion thereof, is included for technical reference purposes and is not to be regarded subject matter by which the scope of the invention as defined in the claims is to be bound.

SUMMARY

The technology disclosed herein relates to vehicle suspension linkages. In one embodiment, a two-wheel vehicle suspension linkage is provided. The suspension includes a suspended body 1, a link body 2, a link body 3, a link body 4, a link body 5, and a link body 6 operatively coupled with one another and a idler cog 56 with rotation axis 75 that is pivotally connected to suspended body 1. Link body 2 is the wheel carrier and the brake carrier body in this embodiment. The link body 3 includes jointed connections with the suspended body 1 defining PIVC[1][3], the link body 4 defining PIVC[3][4], and the link body 6 defining PIVC[3][6]. Idler cog rotation axis 75 is coincident to PIVC[1][3]. The link body 4 includes an additional jointed connection with the link body 2 defining PIVC[2][4]. The link body 5 includes additional jointed connections with suspended body 1 defining PIVC[1][5], link body 2 defining PIVC[2][5], and the link body 6 defining PIVC[5][6]. The suspension may be coupled to a damper unit configured to resist movement between two or more of the suspended body 1, link body 2, link body 3, link body 4, link body 5, or link body 6. The damper unit may include an extension body or bodies to increase its effective length.

In yet another embodiment, a two-wheel vehicle suspension linkage is provided. The suspension includes a suspended body 1, a swingarm body 2, a link body 3, a link body 4, a link body 5, and a link body 6 operatively coupled with one another and a idler cog 56 with rotation axis 75 that is pivotally connected to suspended body 1. In various embodiments, the link body 2 is the wheel carrier and the brake carrier body. The link body 3 includes jointed connections with the suspended body 1 defining PIVC[1][3], the link body 4 defining PIVC[3][4], and the link body 6 defining PIVC[3][6]. Idler cog rotation axis 75 is not coincident to PIVC[1][3]. The link body 4 includes an additional jointed connection with the link body 2 defining PIVC[2][4]. The link body 5 includes additional jointed connections with suspended body 1 defining PIVC[1][5], link body 2 defining PIVC[2][5], and the link body 6 defining PIVC[5][6]. The suspension may be coupled to a damper unit configured to resist movement between two or more of the suspended body 1, link body 2, link body 3, link body 4, link body 5, or link body 6. The damper unit may include an extension body or bodies to increase its effective length.

In one aspect, a two-wheel vehicle suspension linkage includes: a suspended body 1, a wheel carrier body 2, a link body 3, a link body 4, a link body 5, and a link body 6 operatively coupled defining a primary instantaneous velocity center (PIVC) at each joint between link bodies; a wheel operatively connected to the rear wheel carrier body 2; a driven cog operatively connected to the rear wheel; a driving cog operatively connected to the suspended body 1; an idler operatively connected by an elongated flexible member to the suspended body 1, the wheel carrier body 2, the link body 3, the link body 4, the link body 5 or the link body 6, where the idler is rotatable about an idler rotation axis; an elongated flexible member disposed along a route between the driving cog and the driven cog, where the idler is disposed in the route between the driving cog and the driven cog; and a damper unit configured to resist movement between two or more of the suspended body 1, wheel carrier body 2, link body 3, link body 4, link body 5, or link body 6.

The two-wheel vehicle suspension linkage may also include where the idler is pivotally connected to the suspended body 1.

The two-wheel vehicle suspension linkage of any may also include, where the idler is rotatably connected to suspended body 1 concentrically with a linkage pivot with the wheel carrier body 2, the link body 3, the link body 4, the link body 5 or the link body 6.

The two-wheel vehicle suspension linkage may also include where the idler rotation axis is coincident to a PIVC defined by a combination of the suspended body 1, the wheel carrier body 2, the link body 3, the link body 4, the link body 5, or the link body 6.

The two-wheel vehicle suspension linkage may also include where the link body 3 has jointed connections with the suspended body 1 defining a PIVC[1][3], the link body 4 defining a PIVC[3][4], and the link body 6 defining a PIVC[3][6]. The two-wheel vehicle suspension linkage may also include the link body 4 with a jointed connection with wheel carrier body 2 defining a PIVC[2][4]. The two-wheel vehicle suspension linkage may also include the link body 5 with jointed connections with the suspended body 1 defining a PIVC[1][5], the wheel carrier body 2 defining a PIVC[2][5], and the link body 6 defining a PIVC[5][6], where the idler rotation axis is not coincident to the PIVC[1][3].

The two-wheel vehicle suspension linkage may also include where the idler is an idler cog.

The two-wheel vehicle suspension linkage may also include where at least one PIVC migration path reverses as the suspension linkage moves from an at least partially extended state to an at least partially compressed state.

The two-wheel vehicle suspension linkage may also include where the suspended body 1 has a motive power source compartment, and an energy storage compartment selectively coverable by a panel.

The two-wheel vehicle suspension linkage may also include where at least one PIVC migration path reverses as the suspension linkage moves from an at least partially extended state to an at least partially compressed state.

The two-wheel vehicle suspension linkage may also include where the driving cog axis is rotatable about a driving cog axis and the idler rotation axis is disposed above and forward of the driving cog axis.

The two-wheel vehicle suspension linkage may also include where a contact angle formed between a forward vertical tangent of the driving cog and line that is tangent to both the driving cog and the idler is greater than zero degrees.

The two-wheel vehicle suspension linkage may also include an instantaneous force center (IFC) located at an intersection of a force vector of the flexible member and a driving force vector, where, as the suspension linkage moves between an extended and compressed state, the IFC moves from an extended position rearward to an intermediate position and then forward to compressed position.

The two-wheel vehicle suspension linkage may also include where an anti-squat percentage of the suspension linkage increases as a vertical travel of the wheel increases to a first position, where, as the vertical wheel travel increases further to a second position, the anti-squat percentage falls.

The two-wheel vehicle suspension linkage may also include where a rate of change of a power transmitting length of the flexible member (dPTL) increases as a vertical travel of the wheel increases to a first position, where, as the vertical wheel travel increases further to a second position, the dPTL falls.

The two-wheel vehicle suspension linkage may also include where the idler is mounted to the suspended body 1. Other technical features may be readily apparent to one skilled in the art from the following figures, descriptions, and claims.

In one aspect, a two-wheel vehicle suspension linkage includes a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies. The two-wheel vehicle suspension linkage also includes a driving cog having a driving cog diameter and operatively connected to the suspended body 1, where the driving cog is rotatable in a driving cog center plane about a driving cog axis normal to the driving cog center plane, and a driving cog region is defined between a front driving cog plane tangent to a front of the driving cog diameter and parallel to the driving cog axis, and a rear driving cog plane tangent to a rear of the driving cog diameter and parallel to the driving cog axis, where at least a portion of one or more of the plurality of link bodies is located inside the driving cog region and extends transversely outward past the driving cog center plane.

In one aspect, a two-wheel vehicle suspension linkage includes a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies. The two-wheel vehicle suspension linkage also includes a driving cog operatively connected to the suspended body 1 defining a driving cog axis of rotation and a driving cog radius; where the link body 3 includes jointed connections with the suspended body 1 defining a PIVC[1][3], the link body 4 defining a PIVC[3][4], and the link body 6 defining a PIVC[3][6]. The two-wheel vehicle suspension linkage also includes the link body 4 has a jointed connection with wheel carrier body 2 defining a PIVC[2][4]. The two-wheel vehicle suspension linkage also includes the link body 5 has jointed connections with the suspended body 1 defining a PIVC[1][5], the wheel carrier body 2 defining PIVC[2][5], and the link body 6 defining an PIVC[5][6], where the driving cog radius is about 40%-65% of a distance from the PIVC [1][3] to the driving cog axis of rotation.

In one aspect, a two-wheel vehicle suspension linkage includes a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies. The two-wheel vehicle suspension linkage also includes a driving cog operatively connected to suspended body 1 defining a driving cog radius; where the link body 3 includes jointed connections with the suspended body 1 defining a PIVC[1][3], the link body 4 defining a PIVC[3][4], and the link body 6 defining a PIVC[3][6]. The two-wheel vehicle suspension linkage also includes the link body 4 has a jointed connection with wheel carrier body 2 defining a PIVC[2][4]. The two-wheel vehicle suspension linkage also includes the link body 5 has jointed connections with the suspended body 1 defining a PIVC[1][5], the wheel carrier body 2 defining a PIVC[2][5], and the link body 6 defining a PIVC[5][6], where the driving cog radius is about 40%-70% of a distance from the PIVC[3][6] to the PIVC[5][6].

In one aspect, a two-wheel vehicle suspension linkage includes a suspended body 1, a wheel carrier body 2, a wheel operatively connected to the rear wheel carrier body 2, a driven cog operatively connected to the rear wheel, a driving cog operatively connected to the suspended body 1, an idler operatively connected by an elongated flexible member to the suspended body 1, where the idler is rotatable about an idler rotation axis, and an elongated flexible member disposed along a route between the driving cog and the driven cog, where the idler is disposed in the route between the driving cog and the driven cog, where an instantaneous force center (IFC) is located at an intersection of a force vector of the flexible member and a driving force vector, where, as the suspension linkage moves between an extended and compressed state, the IFC moves from an extended position rearward to an intermediate position and then forward to compressed position.

The two-wheel vehicle suspension linkage may also include a damper unit configured to resist movement between two or more of the suspended body 1, wheel carrier body 2, link body 3, link body 4, link body 5, or link body 6 . . . . Other technical features may be readily apparent to one skilled in the art from the following figures, descriptions, and claims.

In one aspect, a two-wheel vehicle suspension linkage includes a suspended body 1, a wheel carrier body 2, a wheel operatively connected to the rear wheel carrier body 2, a driven cog operatively connected to the rear wheel, a driving cog operatively connected to the suspended body 1, an idler operatively connected by an elongated flexible member to the suspended body 1, where the idler is rotatable about an idler rotation axis, and an elongated flexible member disposed along a route between the driving cog and the driven cog, where the idler is disposed in the route between the driving cog and the driven cog, where a rate of change of a power transmitting length of the flexible member (dPTL) increases as a vertical travel of the wheel increases to a first position, where, as the vertical wheel travel increases further to a second position, the dPTL falls.

The two-wheel vehicle suspension linkage may also include a damper unit configured to resist movement between two or more of the suspended body 1, wheel carrier body 2, link body 3, link body 4, link body 5, or link body 6 . . . . Other technical features may be readily apparent to one skilled in the art from the following figures, descriptions, and claims.

The two-wheel vehicle suspension linkage may also include where the link body 3 has jointed connections with the suspended body 1 defining a PIVC[1][3], the link body 4 defining a PIVC[3][4], and the link body 6 defining a PIVC[3][6]. The two-wheel may also include the link body 4 has a jointed connection with the wheel carrier body 2 defining a PIVC[2][4]. The two-wheel may also include the link body 5 has jointed connections with the suspended body 1 defining a PIVC[1][5], the wheel carrier body 2 defining a PIVC[2][5], and the link body 6 defining a PIVC[5][6]; where the idler rotation axis is coincident to the PIVC[1][3].

The two-wheel vehicle suspension linkage may also include where the idler is mounted to an axle, where the axle is pivotally connecting a wheel carrier body 2, linkage body 3, linkage body 4, linkage body 5, or linkage body 6 to suspended body-1.

The two-wheel vehicle suspension linkage may also include where the link body 6 defines a longitudinal axis, and the longitudinal axis moves from a position behind the PIVC[1][5] when the suspension linkage is in an at least partially extended state to a position in front of the PIVC [1][5] when the suspension linkage is in an at least partially compressed state.

The two-wheel vehicle suspension linkage may also include a motive power source received in the motive power source compartment, an energy storage module received in the energy storage compartment and contained by the panel, an electrical conduit in electrical communication with the motive power source and the energy storage module and operative to supply electrical power from the energy storage module to the motive power source.

The two-wheel vehicle suspension linkage may also include where the idler rotation axis is coincident with a PIVC.

The two-wheel vehicle suspension linkage may also include where the idler rotation axis is not coincident with a PIVC.

The two-wheel vehicle suspension linkage may also include where the compressed position is forward of at least one of the extended position or the intermediate position.

The two-wheel vehicle suspension linkage may also include where the dPTL is maximized near a sag point of the rear suspension.

The two-wheel vehicle suspension linkage may also include where the dPTL is maximized at a first value of the vertical travel of the wheel, and where the link body 3 has an inflection point at a second value of the vertical travel of the wheel greater than the first value.

The two-wheel vehicle suspension linkage may also include a damper unit configured to resist movement between two or more of the suspended body 1, the wheel carrier body 2, the link body 3, the link body 4, the link body 5, or the link body 6.

The two-wheel vehicle suspension linkage may also include a damper unit configured to resist movement between two or more of the suspended body 1, the wheel carrier body 2, the link body 3, the link body 4, the link body 5, or the link body 6.

The two-wheel vehicle suspension linkage may also include a damper unit configured to resist movement between two or more of the suspended body 1, the wheel carrier body 2, the link body 3, the link body 4, the link body 5, or the link body 6.

The two-wheel vehicle suspension linkage may also include a link body 3, a link body 4, a link body 5, and a link body 6 operatively coupled with one another and the suspended body 1 and wheel carrier body 2 and defining a primary instantaneous velocity center (PIVC) at each joint between link bodies.

The two-wheel vehicle suspension linkage may also include a link body 3, a link body 4, a link body 5, and a link body 6 operatively coupled with one another and the suspended body 1 and wheel carrier body 2 and defining a primary instantaneous velocity center (PIVC) at each joint between link bodies. Other technical features may be readily apparent to one skilled in the art from the following figures, descriptions, and claims.

The two-wheel vehicle suspension linkage may also include where the PIVC [1][3] 7 is spaced apart from the idler rotation axis by a distance of less than or equal to 50-mm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 2B-1 shows a partial enlarged view of the embodiment of FIG. 2B.

FIG. 2D-1 shows a partial enlarged view of the embodiment of FIG. 2B.

FIG. 8D is a partial right elevation view of the suspended body of the suspension linkage of FIG. 8A.

DETAILED DESCRIPTION

Figure 1A:
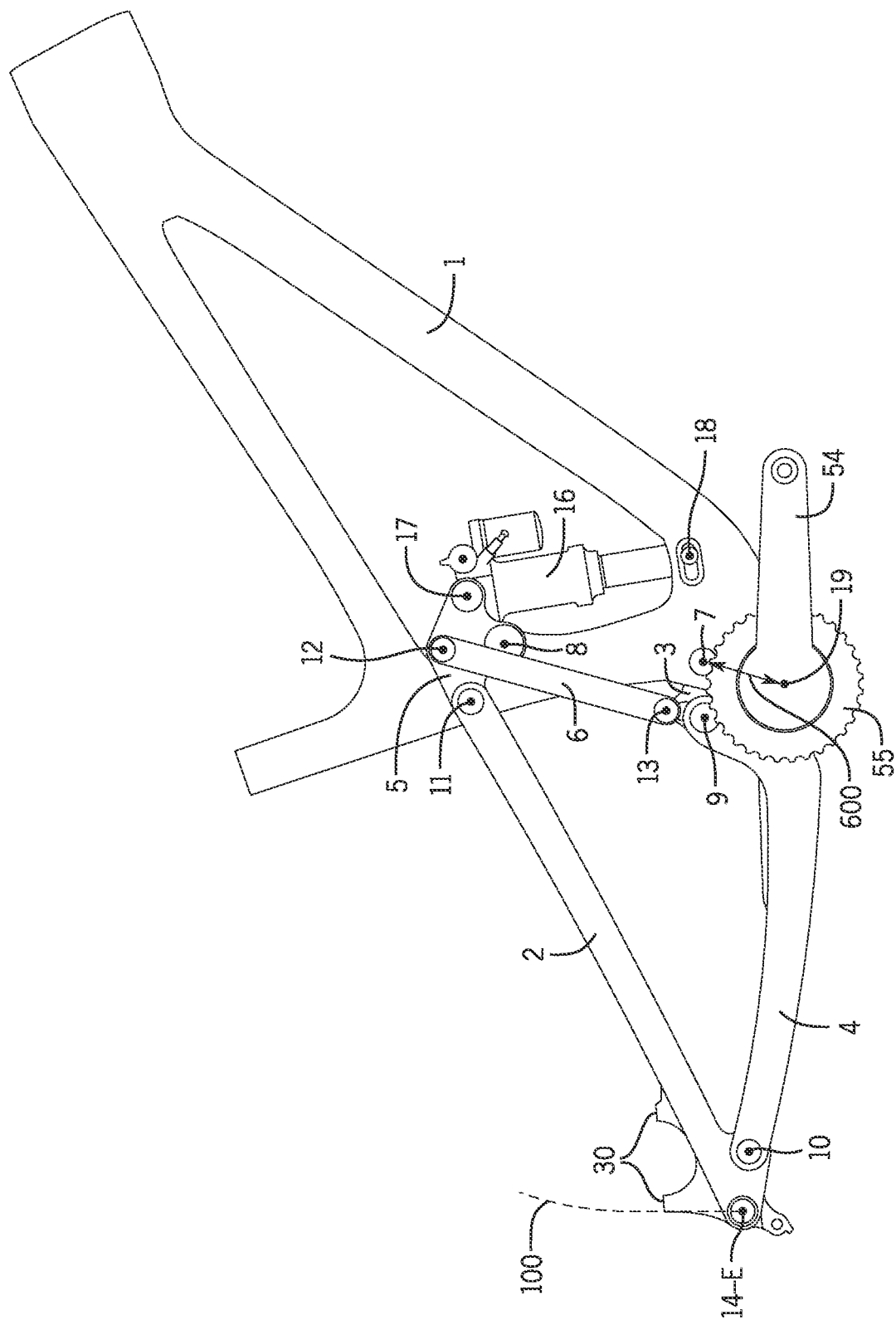
FIG. 1A shows a 6-bar suspension linkage system with a typical configuration in the extended state.

Disclosed herein is a system or linkage that operatively couples a suspended body to a driven wheel. The suspended body and non-suspended body may move relative to one another, as defined by the system or linkage that operably couples them. In some embodiments, the driven wheel is associated with the non-suspended body (e.g., a rear triangle, chain stay and/or seat stay). In some embodiments, the driven wheel may be associated with the suspended body (e.g., a front wheel drive vehicle). In accordance with the various embodiments provided herein, the suspension system linkage improves suspension performance based on the interrelationships of its linkage bodies and the related instantaneous velocity centers (IVCs). In one example, the linkage has 15 IVCs. In particular, the linkage may be a 6-bar linkage. The 6-bar linkage may define a suspended body portion and a non-suspended body portion. Moreover, an additional idler may be operatively coupled to the suspended body or the non-suspended body. In this case, a driving chain or belt is routed in a loop around the driven mechanism (e.g. driven cog), the idler and the driving mechanism (e.g. driving cog). Either or both of the driven mechanism or the driving mechanism may be a respective single member (e.g., a single cog, pulley, or ring), or the driving and driven mechanisms may include a cassette with a plurality of members (e.g., cogs, pulleys, or rings). The idler may be located between the driving mechanism and the driven mechanism so that the driving mechanism transmits the force to the driven mechanism via the idler. In various embodiments, the idler is specifically located with respect to physical IVCs, or PIVCs that are unique to a 6-bar linkage.

Various theories, methods, algorithms or analysis systems are provided herein. These systems are provided for better understanding of the structures and configurations described. Unless specifically claimed, the systems are not limiting regardless of current accuracy or subsequent clarifications or understandings of the structures and configurations that may be determined by persons of ordinary skill in the art.

Accordingly, the positions of IVCs may change depending on the configuration of the system. A particular IVC may be in a different position depending on whether the system is in a compressed or extended state defining an IVC migration path. Thus, the interrelationships between IVCs can be analyzed, allowing for a mathematical analysis of the movement of the linkage subsystem. Additionally, methods to calculate anti-squat, anti-rise, and leverage rate is detailed. While support is provided herein, Pat. Pub. No. US2018-0265165A1 provides additional detailed support of these methods, algorithms and analysis systems and the 6-bar linkage suspension and is hereby incorporated by reference in its entirety.

It is understood that throughout this disclosure the relationship of various linkages are described with respect to characteristics and structures of those linkages. One analysis system useful for assessing these relationships is the Mobility Analysis of Mechanisms. The Mobility Analysis of Mechanisms (Kutzbach (or Grübler) mobility criterion) may be used to describe the mobility, or output degree of freedom of a linkage. This system may be used to describe the mobility m of a planar linkage composed of n links that are coupled with p flexible joints/pivots. In the various embodiments, discussed herein, the links can be connected via these flexible joints/pivots allowing some degree of freedom between one another. Additionally, the relationship of the links via the joints define various characteristics such as instantaneous velocity centers (IVCs). In various examples as applied to the various embodiments discussed herein, the flexible joints/pivots can include revolute, slider, cam joints, or any other suitable flexible joints or pivots that allow one degree of freedom movement between the two links they connect. Notably, flexible joints may include intermediary devices connecting the linkages. Depending on the types of joints, quality of joints, or the tolerances in the joints, characteristics (e.g. the IVCs or other characteristics discussed herein) may have small variances between joints due to real world engineering constraints and calculations. Terminology such as generally, substantially, or other similar terms may be used to account for the expected, calculated, or otherwise real-world accuracy of the characteristics discussed herein while allowing for real world variance in the characteristics. Note that if bodies are coupled as one and not considered rigid, a specific joint (e.g. a revolute joint) may be assumed theoretically for analysis near the point of flexure in the flexible joint. Also, note that although the linkage is considered planar kinematically, the assembly of the mechanism may be 3-dimensional.

The following equation is used for analysis of the various systems herein:

$$\text{mobility} = m = 3(n-1-p)+p$$

n=number of bodies (or links or members)
p=number of joints
Σf=sum of the kinetic variables in the mechanism As an example, this equation may be applied to a 4-bar linkage. The following solves the equation for a 4-bar linkage:

$$p=n=4$$

$$m=3(n-1-p)+p$$

$$m=3(4-1-4)+4$$

$$m=3(-1)+4$$

$$m=-3+4$$

$$m=1$$

As another example, this equation may be applied to a 6-bar linkage. The following solves the equation for a 6-bar linkage:

$$n=6$$

$$p=7$$

$$m=3(n-1-p)+p$$

$$m=3(6-1-7)+7$$

$$m=3(-2)+7$$

$$m=-6+7$$

$$m=1$$

In both noted 4-bar and 6-bar linkages, m=1, or there is one degree of freedom of motion. Therefore, the path of the axis of the driven wheel, known as the driven wheel axis path (DWAP) may be constrained to planar motion along a defined path or curve relative to the suspended body. This path or curve includes one end-point defined as the extended state, and another end-point as the compressed state. Any point on this curve or path between the extended and compressed points is known as an intermediate state. An intermediate state on an IVC migration curve or path correlates to an intermediate state of the linkage positions.

Additionally, methods of analyzing vehicle suspension linkages design for its dynamic response is also disclosed. In one example, this method of analysis includes a collection of the system instantaneous velocity centers (IVCs), which can be determined graphically. An IVC is a point common to two linkage bodies where there is zero relative velocity. These IVCs change location instantaneously as the suspension is cycled from its extended to compressed state. The path of each IVC migration may then be plotted graphically as a path, curve, or spline from the extended to the compressed state. These IVC curves depend upon the reference frame considered. In various embodiments, the suspended body is considered fixed as the driven wheel moves from the extended to the compressed state. Total suspension travel (VWT [T]) is then defined as the perpendicular distance relative to the ground line at the extended state as measured between the extended suspension state point and the compressed suspension state point on the driven wheel axis path.

It is possible for an IVC, known as a stationary IVC (SIVC), to have little to no migration from the extended to the compressed state. One example would be an IVC where a link body is operatively connected to the suspended body. This is a result of the front-triangle remaining fixed in the reference frame chosen for suspension analysis.

For reference herein, specific instantaneous velocity centers of a linkage are denoted as IVC[Body-A][Body-B]. Body-A and Body-B being the relevant bodies in the relationship. For example, IVC[1][2] is the instantaneous velocity center relative to a body 1 and a body 2. Additionally, IVC[1][2] is equivalent to IVC[2][1].

The structure surrounding the suspension system may include several bodies. In various examples, the structure may include a suspended body. In various embodiments, the suspended body can be suitable to be supported by suspension and support a user over the suspension. In various examples, the structure may include a "wheel carrier" body, which is operatively coupled to the driven wheel, a "brake carrier" body, which is operatively coupled to the driven wheel brake, or a "dynamic body" (DB), which is any combination of a wheel carrier and a brake carrier body (e.g., DB=wheel carrier body, or DB=brake carrier body, or DB=wheel and brake carrier body).

Specific IVC migrations called dynamic IVCs (DIVCs) may be utilized to determine the vehicle's dynamic response. The DIVCs depend upon the specific linkage layout but also depend upon suspended body-1 since this is the body in which a passenger or rider will be included. Suspended body-1 may be referenced herein as the front triangle of a bicycle.

As used herein DIVC[AD] can define both the acceleration and deceleration response of the vehicle; DIVC[A] can define the acceleration response of the vehicle; and DIVC[D] can define the deceleration response of the vehicle. As used herein DIVC[C] is defined as a DIVC that includes an acceleration component. As such, in certain embodiments, DIVC[C] can be equal to DIVC[A] or DIVC[AD]. As used herein DIVC[E] is defined as a DIVC that includes a deceleration component. As such, in certain embodiments, DIVC[E] can be equal to DIVC[D] or DIVC[AD].

As used herein DIVC is a general term that may generically cover a DIVC[AD] or a DIVC[A] or a DIVC[D] or a DIVC[C] or a DIVC[E] or any combination thereof. As used herein DIVC[L] is the length of the DIVC migration path, spline or curve.

In accordance with various embodiments, the body-X can be both a wheel carrier and a brake carrier body. In such an embodiment, there is a single DIVC[AD] migration, DIVC[AD][1][X].

In accordance with various embodiments, wheel carrier body-Y can be separate from the brake carrier body-Z. In such an embodiment, there are two DIVCs, DIVC[A][1][Y] and DIVC[D][1][Z].

Finally, in accordance with various embodiments, the wheel carrier body-Y is pivotally concentric to a brake carrier body-Z. In this case, again there are two DIVCs, DIVC[A][1][Y] and DIVC[D][1][Z].

Each of these various embodiments can be variously applied to the embodiments and examples of the various systems discussed in more detail below.

For purposes of understanding, but not to be limiting, it can be noted that the point in which the force of gravity acts on the sum of the suspended vehicle mass (also known as the sprung mass) and any additional mass such as a passenger or cargo that is supported by the suspension is known as the center of gravity (COG). In the static case, with both wheels on the ground, the force due to the suspended mass through the COG is supported by the vehicle's two wheels. Depending on the COG location and the wheelbase of the vehicle, the distribution of force between the two wheels may vary. When the vehicle accelerates, load transfer occurs and the force distribution between the two wheels changes. The rear wheel load is increased while the front wheel load is decreased. Thus, the rear suspension tends to compress or squat. Driving forces of the vehicle such as a chain or belt may be utilized to counteract the tendency to squat during acceleration. This is known in vehicle dynamics as anti-squat.

Anti-squat is typically described as a percentage value. 100% anti-squat is when the anti-squat force is equal and opposite to the load transfer force due to acceleration. As a result, the system is in equilibrium and no suspension squat occurs. Over 100% anti-squat is when the anti-squat force is both opposite and greater than the load transfer force and therefore the suspension extends during acceleration. Anti-squat of 0% is when there is zero anti-squat force to counteract the load transfer and therefore suspension squats during acceleration. Anti-squat between 0-100% is when the anti-squat force is both opposite and less than the load transfer force and therefore the suspension squats during acceleration but to a lesser degree than with 0% anti-squat. A negative anti-squat percentage is when the anti-squat force acts in the same direction on the rear wheel as the load transfer force and therefore the squat due to load transfer is magnified. Anti-squat is directly related to the DIVC[C] migration of the suspension linkage. Anti-squat around or slightly above 100% is ideal where pedaling occurs typically around the first half of travel to improve pedaling efficiency. After this point, an anti-squat below 100% is preferred so that the driving force is reduced, and the suspension can be utilized later in the travel where pedaling typically does not occur. This may also reduce feedback from the driving force to the rider. Too high of an anti-squat is less than ideal because it results in high feedback from the driving force to the rider and is detrimental to pedaling efficiency because the load transfer and anti-squat force are far from equilibrium.

When the vehicle decelerates, the force distribution changes and the front wheel load is increased while the rear wheel load is decreased. As a result, the rear suspension tends to extend or rise. This is known in vehicle dynamics as anti-rise. The magnitude of anti-rise is directly related to the DIVC[E] migration.

100% anti-rise is when the anti-rise force is equal and opposite to the load transfer force due to deceleration. As a result, the system is in equilibrium and no suspension rise occurs. Over 100% anti-rise is when the anti-rise force is both opposite and greater than the load transfer force and therefore the suspension squats during deceleration. Anti-rise of 0% is when there is zero anti-rise force to counteract the load transfer and therefore suspension rises during deceleration. Anti-rise between 0-100% is when the anti-rise force is both opposite and less than the load transfer force and therefore the suspension rises during deceleration but to a lesser degree than with 0% anti-rise. A negative anti-rise percentage is when the anti-rise force acts in the same direction on the rear wheel as the load transfer force and therefore the rise due to load transfer is magnified. Anti-rise less than 100% may help improve traction while anti-rise greater than 0% may help stabilize geometry during deceleration. Therefore, an anti-rise in the 50-100% can be a suitable range for an improved ride.

Another suspension characteristic is the leverage rate (LR), which is the ratio of the change in vertical wheel travel to the change in shock stroke. A plot can be generated to represent the instantaneous leverage rate from the fully extended to the fully compressed state. The motion ratio (MR) is the inverse of the LR. Generally, the higher the leverage rate the greater the mechanical advantage on the shock/damper and the lower the force that compresses the shock. Generally, the lower the leverage rate the lesser the mechanical advantage on the shock/damper and the higher the force that compresses the shock.

The direction of the DWAP is also a suspension performance metric. The ability of the rear suspension to absorb bumps when the vehicle is moving forward increases the more rearward the path from the extended state to the compressed state. The rearward path allows the rear wheel to move with the impact improving performance.

Anti-squat, rate of change of the power transmitting length (dPTL), described below, anti-rise, leverage rate and DWAP direction are four performance metrics or suspension characteristics pertinent to suspension designs. Anti-squat and DWAP are directly related to the driving cog axis location. As the suspension linkage arrangement is altered so that the DWAP direction is more rearward, DIVC[A] typically is raised the anti-squat percentage will increase. This is discussed in further detail below during the discussion of the chain/belt and frame components of anti-squat. This increase may result in poor suspension performance due to excessive extension of the wheel carrier body under acceleration, stiffening the suspension and reducing traction and comfort.

As the DIVC[D] is moved higher above the ground, the DWAP direction will tend to move rearward. As a result, the anti-rise percentage will increase. This increase may result in poor suspension performance due to excessive compression of the wheel carrier body under deceleration, stiffening the suspension and reducing traction and comfort.

In order to manipulate the magnitudes of the anti-squat and/or anti-rise percentages and simultaneously increase the rearward direction of the DWAP, a drive train vector adjustment mechanism may be utilized with a 6-bar linkage. In one example, the drive train vector adjustment mechanism may be a drive train idler positioned between the driving portion of the drive train and the driven portion of the drive train. In a more particular example, the idler may be an idler cog that is located between the driving cog and the driven cog. This idler cog may change the chain force vector angle. Changing this chain force vector angle can manipulate the anti-squat percentage. For example, incorporating the idler cog may reduce the anti-squat percentage as compared to a system that does not include an idler cog. Additionally, or alternatively, this 6-bar layout also allows the DIVC[D] to be located further forward than conventional designs allowing for lower anti-rise percentages. These concepts and further derivations are discussed below. The various embodiments discussed below are discussed using an idler cog. It is however understood that other vector adjustment mechanisms can also be used in place of the idler cog for the respective systems. For example, simple pulleys may be used for belt driven systems or cable driven systems. In some examples, a pin or other vector adjustment device may be used to offset the drive mechanism, so the force vector of the drive mechanism is moved away from the driving member (e.g. the driven gear, cog, etc.)

Based upon the number of bodies present in the structure, the total number of instantaneous velocity centers (IVCs) can be determined. The following equation can be used:

$$\text{Number of Instance Centers} = N = \frac{n(n-1)}{2}$$

$n$ = number of bodies moving relative to one another $N$ = total number of instantaneous velocity centers of the linkage As an example, this equation may be applied to a 4-bar linkage. In this example, n=4. The following solves the equation for a 4-bar linkage:

$$N_4 = \frac{4(4-1)}{2} = \frac{12}{2} = 6$$

This example shows that there are 6 total instantaneous velocity centers for a 4-bar linkage.

As another example, this equation may be applied to a 6-bar linkage. In this example, n=6. The following solves the equation for a 6-bar linkage:

$$N_6 = \frac{6(6-1)}{2} = \frac{30}{2} = 15$$

This example shows that there are 15 total instantaneous velocity centers for a 6-bar linkage.

In accordance with various embodiments, the suspension system can include a suspension setup having more than four links. It may be noted that while some of the concepts discussed herein might be accomplished with four links, in some of the embodiments discuss herein, as shown herein by example, six links are used. As is suitable, more or few links can also be used to accomplish the various concepts as discussed herein.

As noted above, there are 15 IVCs in a 6-bar linkage.

$$N_6 = \frac{6(6-1)}{2} = \frac{30}{2} = 15$$

A selection of the 15 total IVCs can be determined visually without being derived using other IVCs as further described below. As used herein, these IVCs are known as physical IVCs, or PIVCs. PIVCs are defined at the pivotal axes or virtual pivotal axes of jointed linkage body members. There are four PIVCs in a 4-bar linkage while there are seven PIVCs in a 6-bar linkage.

FIG. 1A shows a bicycle frame having an example of a 6-bar suspension. This drive train layout has a direct drive from the drive cog to the driven cog without an idler in-between. Here, crank arm 54 and driving cog 55 rotate about driving cog axis 19. The suspension includes a suspended body 1, a link body 2, a link body 3, a link body 4, a link body 5, and a link body 6 operatively coupled with one another. Link body 2 is the wheel carrier and the brake carrier body in this embodiment. In other embodiments, the wheel carrier and the brake carrier body may differ. The link body 3 includes jointed connections with the suspended body 1 defining PIVC[1][3] 7, the link body 4 defining PIVC[3][4] 9, and the link body 6 defining PIVC[3][6] 13. The link body 4 includes an additional jointed connection with the link body 2 defining PIVC[2][4] 10. The link body 5 includes additional jointed connections with suspended body 1 defining PIVC[1][5] 8, link body 2 defining PIVC[2][5] 11, and the link body 6 defining PIVC[5][6] 12. The suspension includes a damper unit 16 pivotally connected to link body 5 at joint 17 and suspended body 1 at joint 18. The damper unit 16 is configured to resist movement between the two bodies. FIG. 1A also illustrates the brake caliper mounts 30 and rear wheel axis positioned in the extended state 14-E. Both the brake caliper mounts 30 and the rear wheel axis are also shown as being located on link body 2. Link body 2 may be referred to the seatstay in this embodiment, however the seatstay may be a different link body in other embodiments. Link body 4 may be referred to the chainstay in this embodiment, however the chainstay may be a different link body in other embodiments. Also shown is offset 600, which is the distance between the driving cog axis and PIVC[1][3] 7. This offset is pertinent to and manipulative of the magnitude of rearward direction of DWAP 100.

Figure 1B:
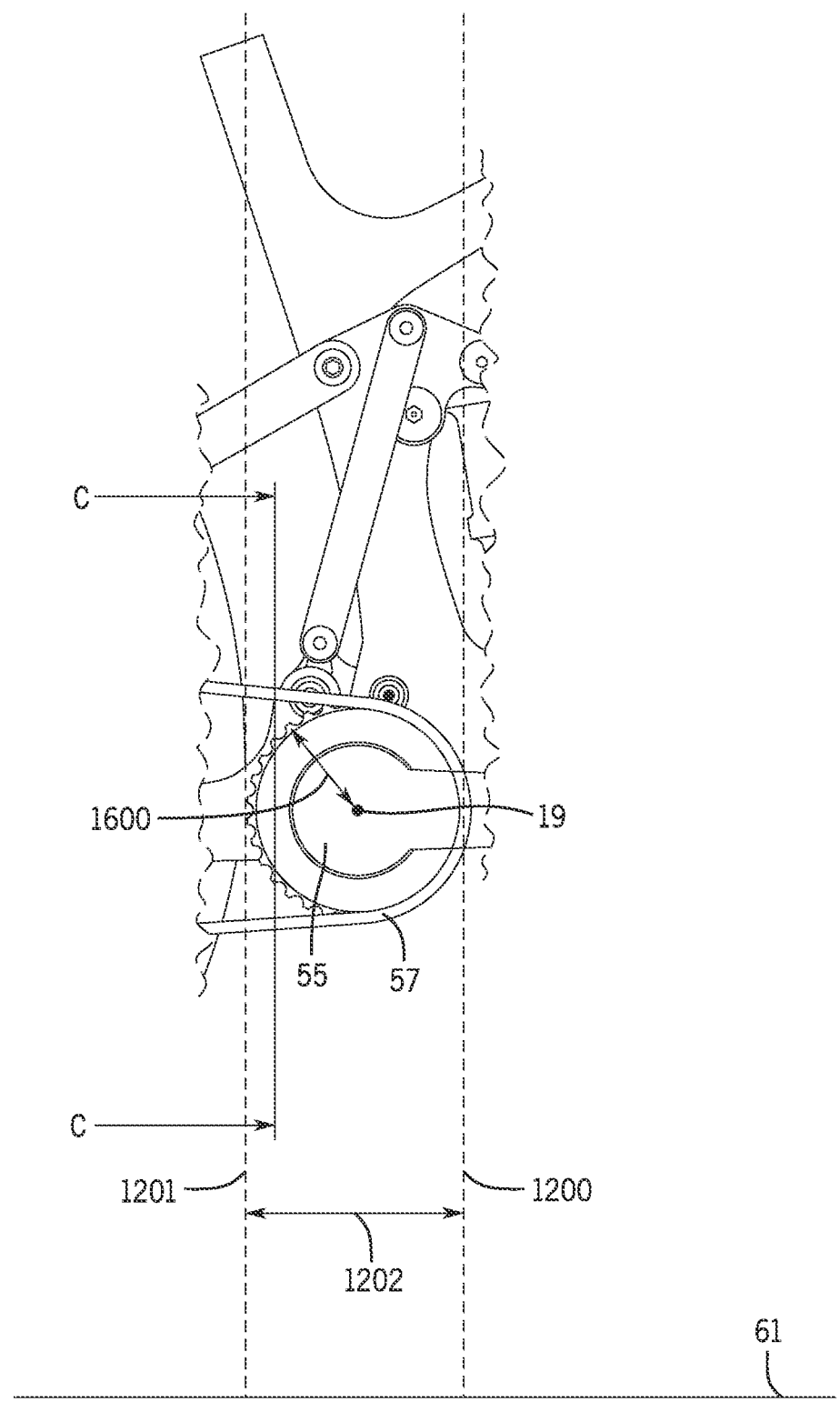
FIG. 1B is a section of the embodiment of FIG. 1A with cross section C-C.

FIG. 1B shows a portion of the embodiment of FIG. 1A with the location of cross section C-C denoted. Here the following are shown: Driving cog axis 19; driving cog 55; chain/belt 57; ground 61; front driving cog plane 1200 which is parallel to driving cog axis 19, perpendicular to the ground, and tangent to the diameter of driving cog 55; rear driving cog plane 1201 which is parallel to driving cog axis 19, perpendicular to the ground, and tangent to the diameter of driving cog 55; driving cog region width 1202 which is equivalent to the driving cog diameter; driving cog radius 1600 which is equivalent to half of the driving cog diameter; and cross section line C. Cross section line C is located within the region defined by the ground 61, front driving cog plane 1200, and rear driving cog plane 1201.

Figure 1C:
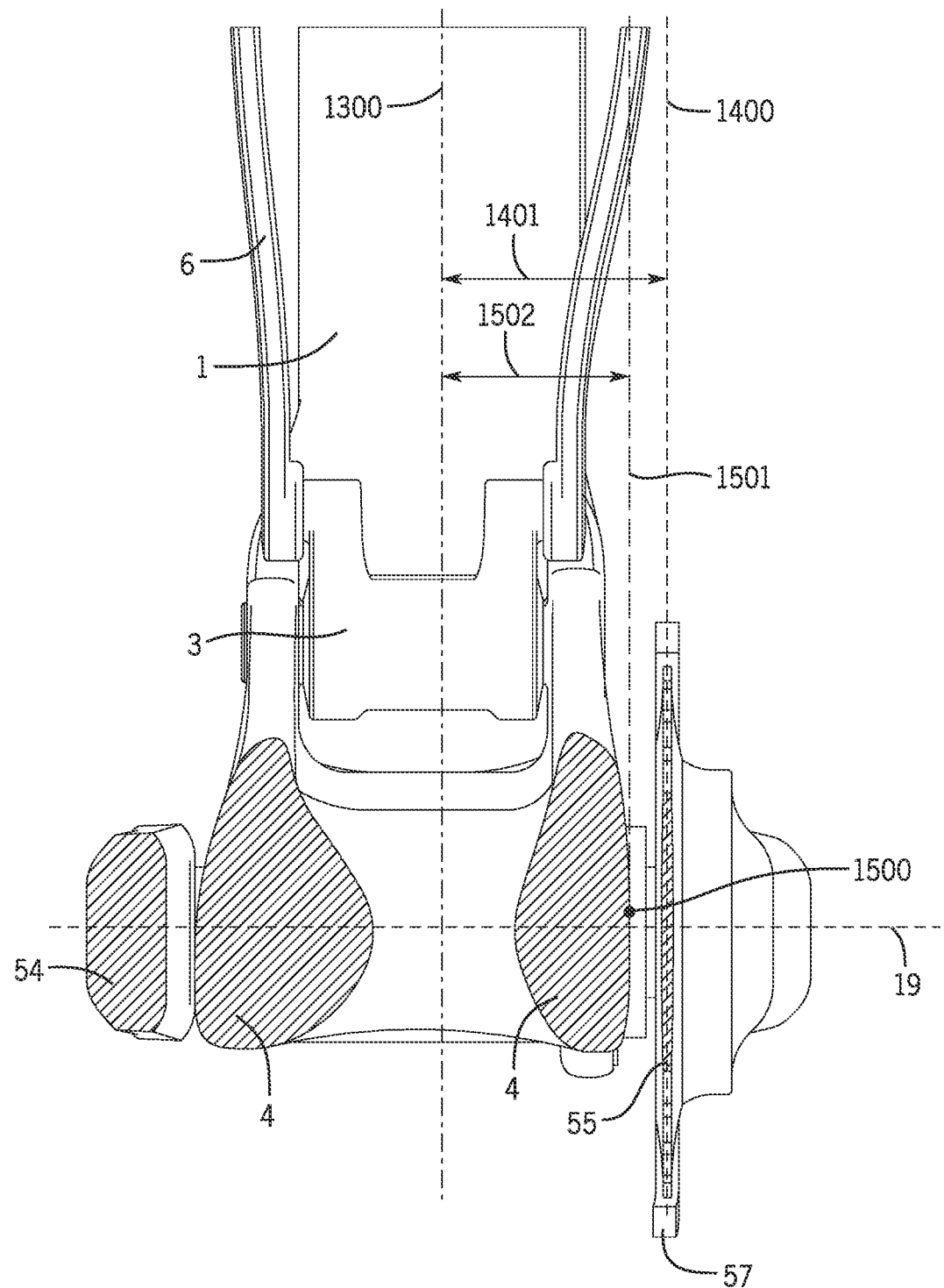
FIG. 1C shows cross-section C-C of the embodiment of FIG. 1B.

FIG. 1C shows cross-section C-C of the embodiment of FIG. 1B. Here the following are shown: Driving cog axis 19; driving cog 55; driving cog center plane 1400; chain/belt 57; crank arm assembly 54; suspended body-1; link body-3; link body-6; link body-4; point 1500 located on link body-4; link body-4 reference plane 1501 that is normal to driving cog axis 19 and coincident to point 1500; frame center plane 1300; chain/belt-line 1401 which is the distance from frame center plane 1300 to driving cog center plane 1400; and link body-4 reference distance 1502 which is the distance from frame center plane 1300 to link body-4 reference plane 1501. Here it is clear that chain/belt-line distance 1401 is greater than link body-4 reference distance 1502. Therefore, no portion of link body-4 is located outside ("outside" being the direction, relative to the plane, away from the vehicle frame/suspension) of driving cog center plane 1400.

Figure 2A:
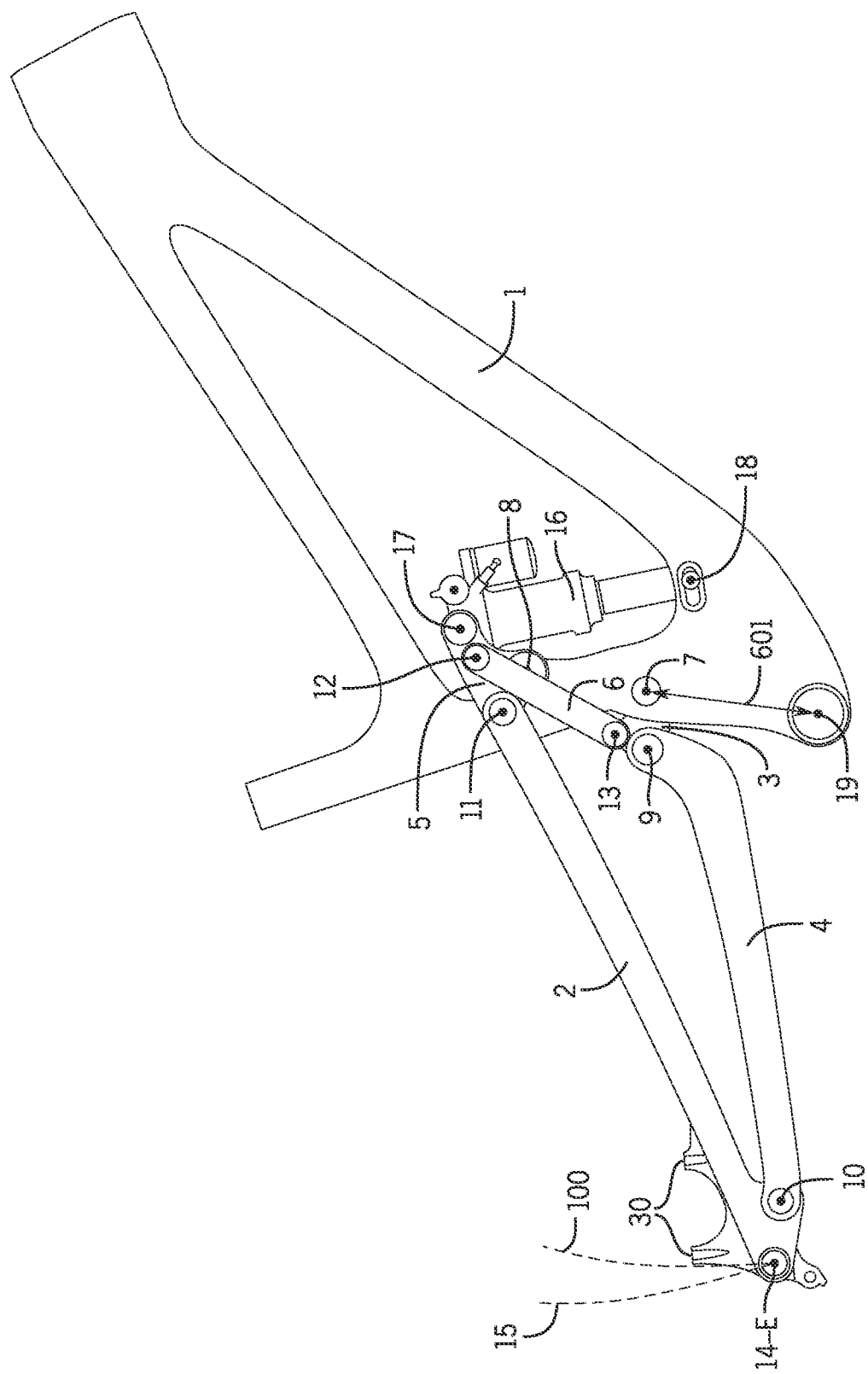
FIG. 2A shows an embodiment of a 6-bar suspension linkage system in the extended state.
Figure 2B:
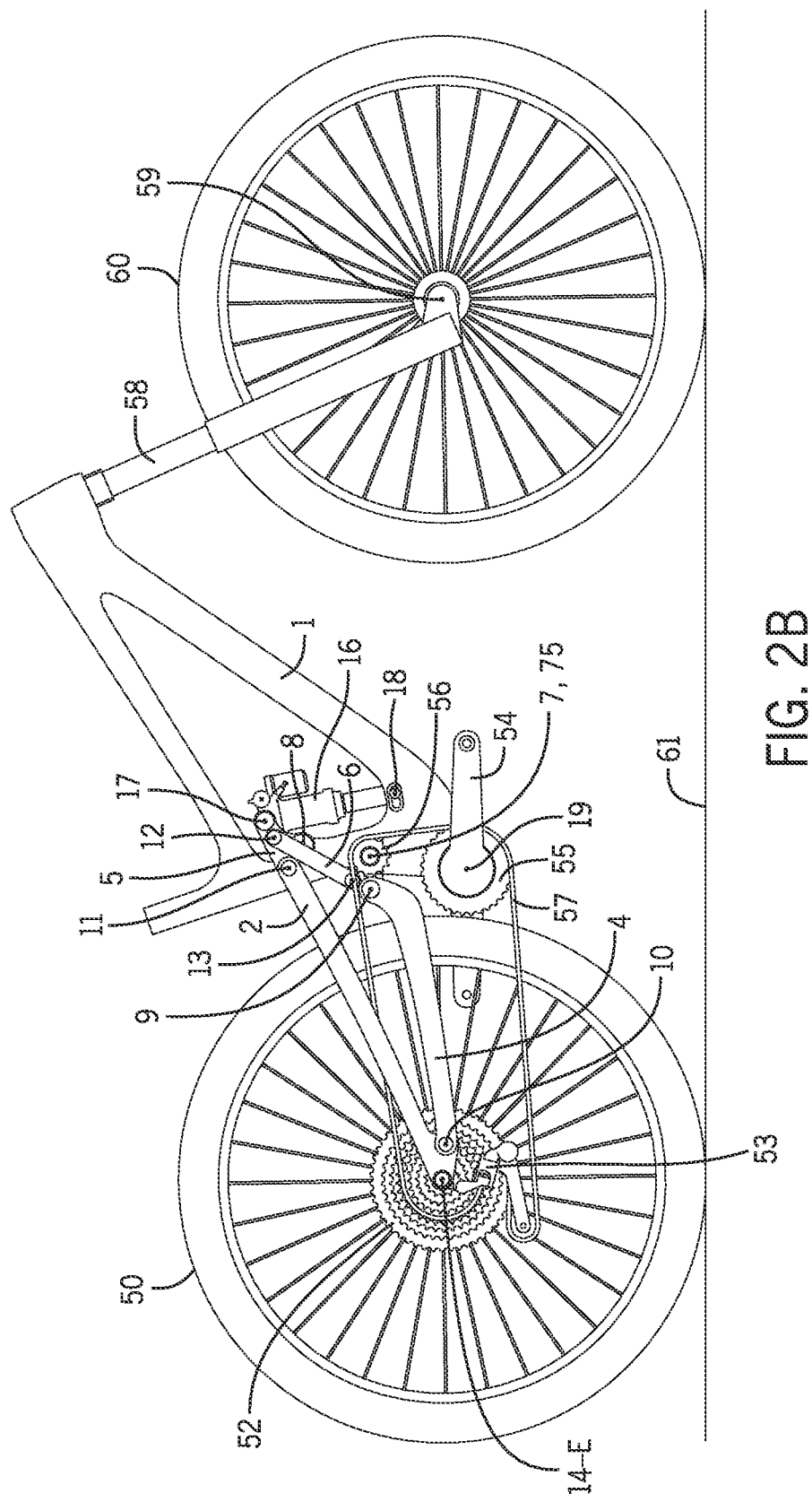
FIG. 2B shows the embodiment of FIG. 2A of a bicycle with the disclosed 6-bar suspension linkage system in the extended state.
Figures 1, 2B:
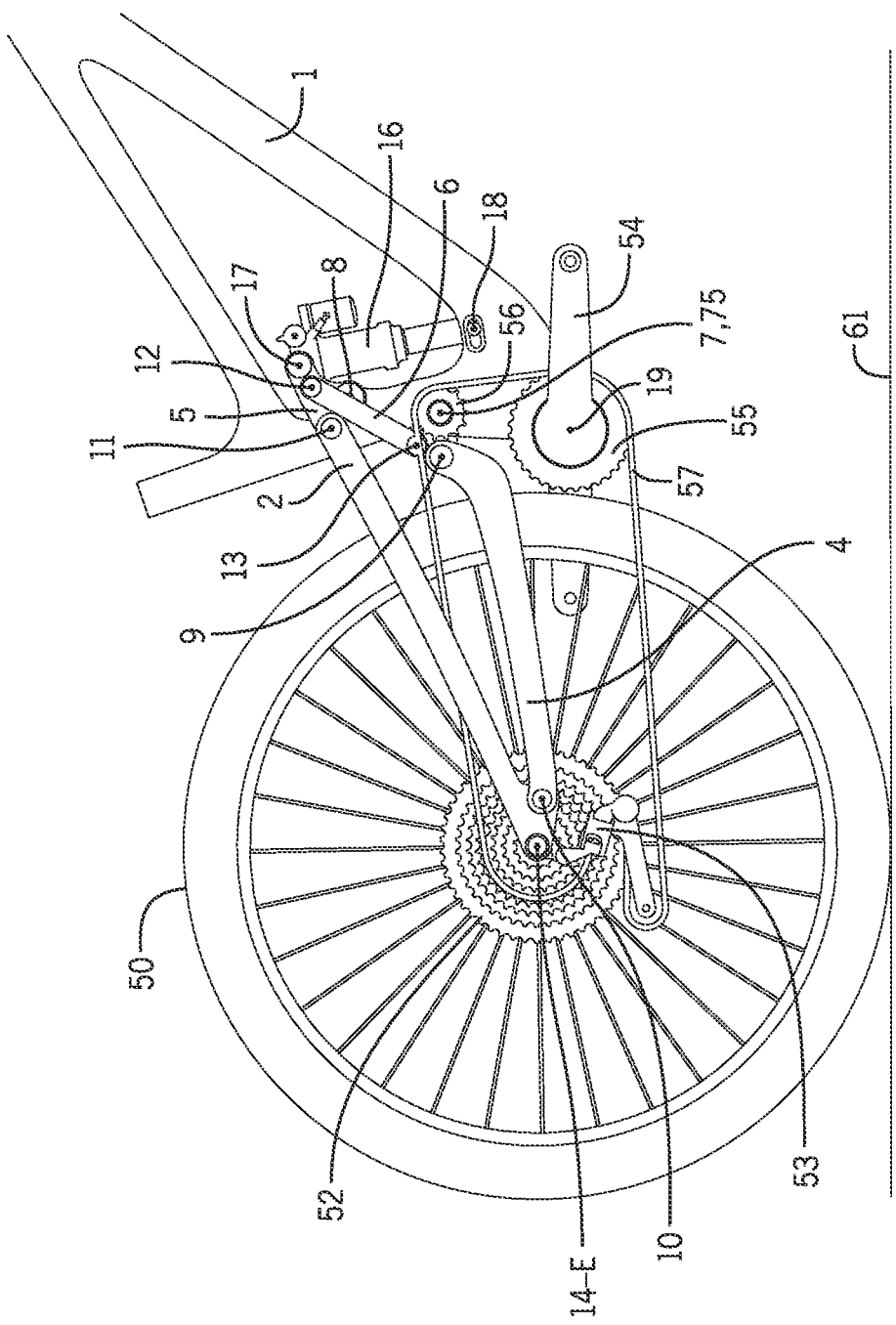

In accordance with various embodiments, the suspension system includes a 6-bar linkage and an idler cog. FIG. 2A shows a bicycle frame with a 6-bar suspension having an idler cog 56. Note, an example of the idler is not shown in FIG. 2A for clarity. The idler cog 56 is shown in FIG. 2B. As discussed above the idler is shown as an idler cog as used with a chain drive. As illustrated, the crank arm 54 and driving cog 55 rotate about driving cog axis 19. The suspension includes a suspended body 1, a link body 2, a link body 3, a link body 4, a link body 5, and a link body 6 operatively coupled with one another. In this embodiment, the link body 3 includes jointed connections with the suspended body 1 defining PIVC[1][3] 7, the link body 4 defining PIVC[3][4] 9, and the link body 6 defining PIVC[3][6] 13. The link body 4 includes an additional jointed connection with the link body 2 defining PIVC[2][4] 10. The link body 5 includes additional jointed connections with suspended body 1 defining PIVC[1][5] 8, link body 2 defining PIVC[2][5] 11, and the link body 6 defining PIVC[5][6] 12. The suspension includes a damper unit 16 pivotally connected to link body 5 at 17 and suspended body 1 at 18 configured to resist movement between the two bodies. Brake caliper mounts 30 and rear wheel axis at the extended state 14-E are located on link body 2 which is also the wheel carrier and brake carrier body in this embodiment.

FIG. 2A also illustrates the PIVC[1][3] 7 and offset 601. The offset 601 is the distance between the driving cog axis and PIVC[1][3] 7. This distance is pertinent and manipulative of the magnitude of rearward direction of DWAP 15. Note that offset 601 (of FIG. 2A) is greater than offset 600 (FIG. 1A), and as a result, DWAP 15 is more rearward compared to DWAP 100.

FIG. 2B shows the bicycle frame from FIG. 2A with additional components for clarity. As illustrated, the rear wheel 50 can be pivotally connected to link body 2 and rear wheel axis 14-E. A rear cassette 52 is a group of various driven cog sizes that chain/belt 57 can be shifted across mechanically via rear derailleur mechanism 53. Also shown are front suspension fork 58 wherein front wheel 60 is pivotally connected at front wheel axis 59. Rear wheel 50 and front wheel 60 contact the surface 61. Note that the surface 61 (e.g., the ground) is depicted as a line, but represents a plane/surface in 3d-space.

As shown in this particular embodiment, idler cog 56 includes an axis 75 that is coincident to IVC[1][3] 7. In other embodiments, these axes may be different (see embodiments, below). Chain/belt 57 is routed from driving cog 55, which is rigidly connected to crank arm assembly 54, to idler cog 56 to a driven cog of cassette 52 through the cogs of rear derailleur 53 and back to the driving cog 55 in a continuous loop. When the crank arm assembly 54 is rotated, power is transmitted from driving cog 55 to a driven cog of cassette 52 via the idler cog 56. As a result, the chain force vector is along the top part of the chain/belt from the tangent connection point of the driven cog of cassette 52 to the tangent connection point of idler cog 56. Note that the cassette 52 with multiple driven cogs and derailleur mechanism 53 may be absent in other embodiments. In other embodiments, a single driven cog may be used.

Figure 2C:
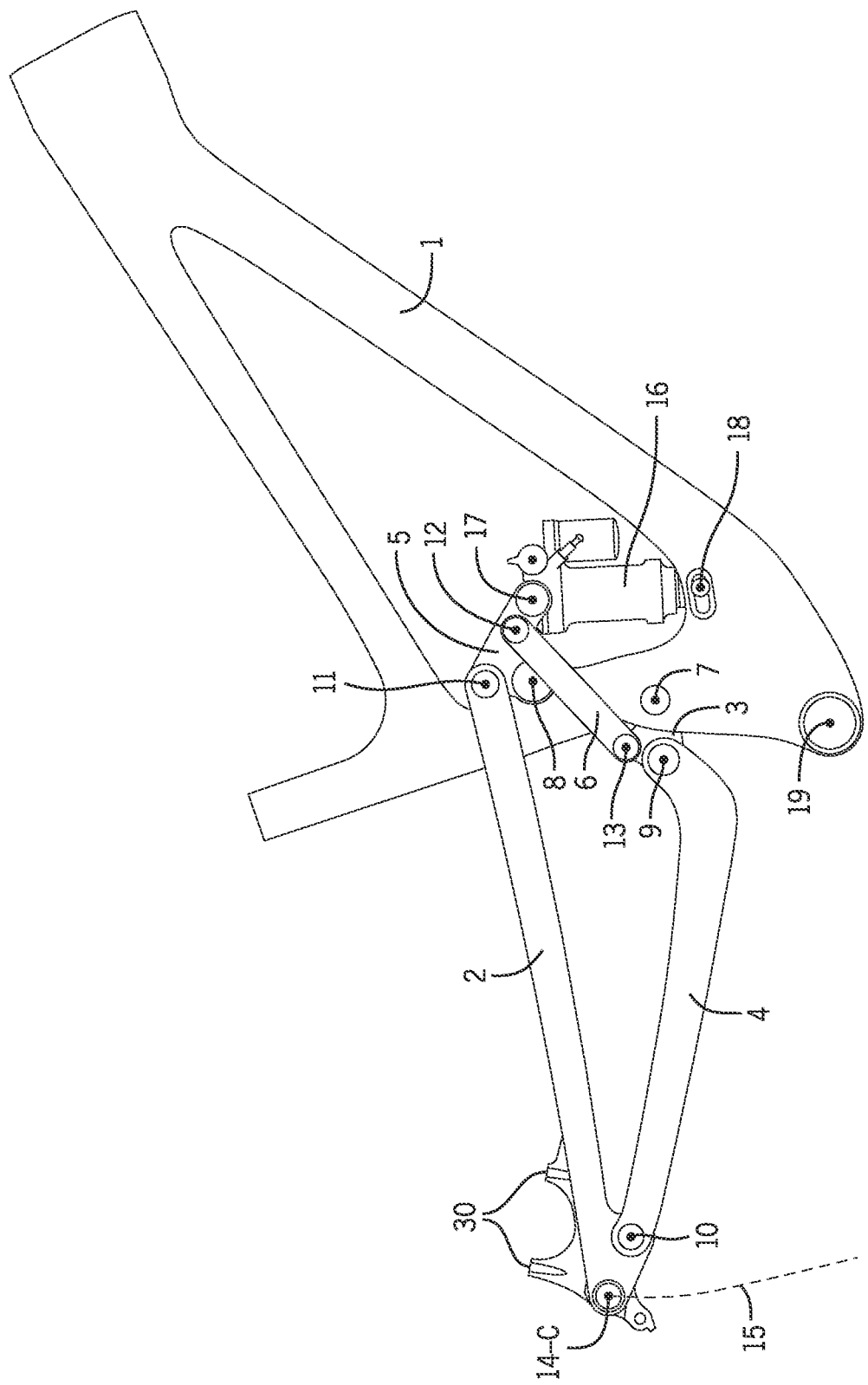
FIG. 2C shows the embodiment of FIG. 2A of a 6-bar suspension linkage system in the compressed state.
Figure 2D:
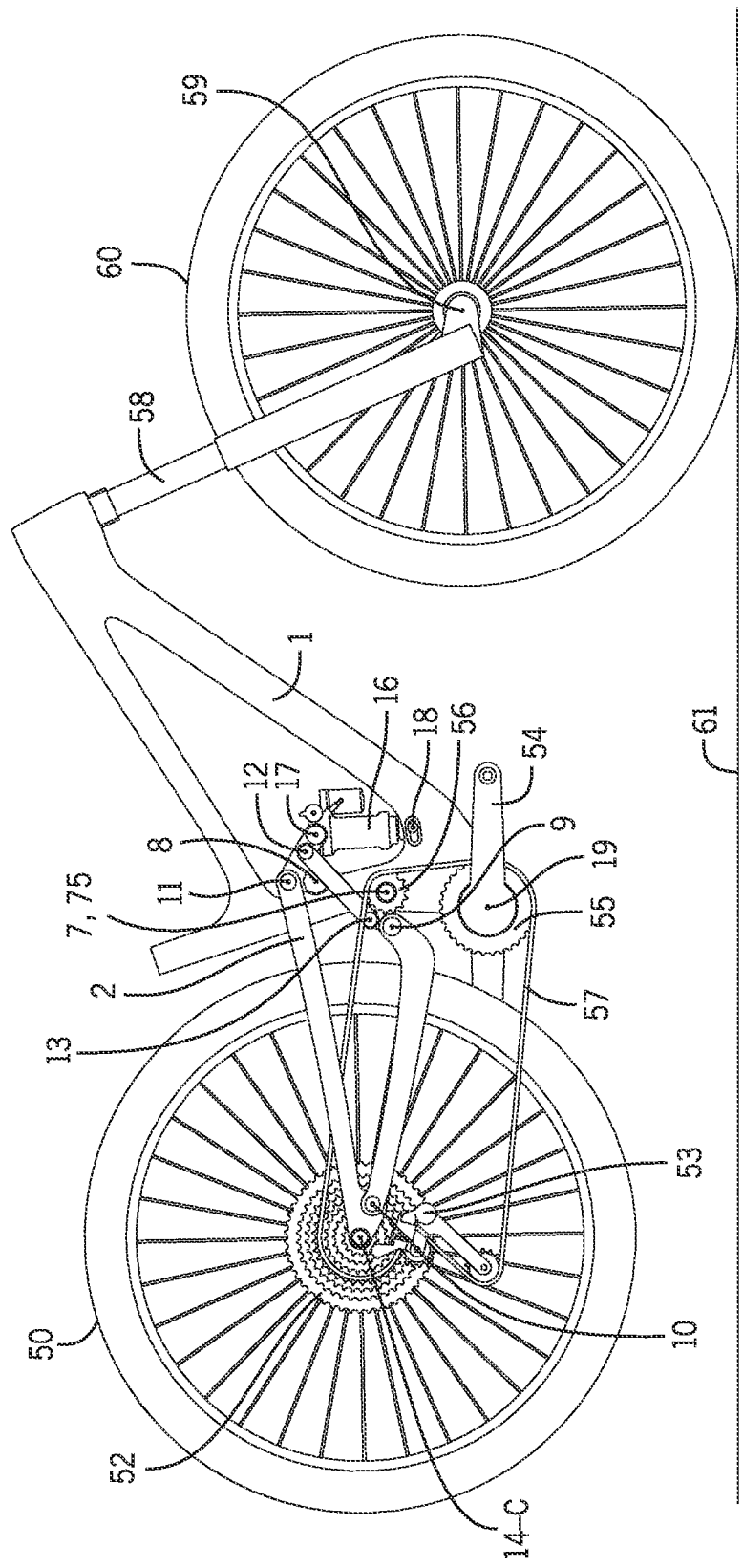
FIG. 2D shows the embodiment of FIG. 2A of a bicycle with the disclosed 6-bar suspension linkage system in the compressed state.
Figures 1, 2D:
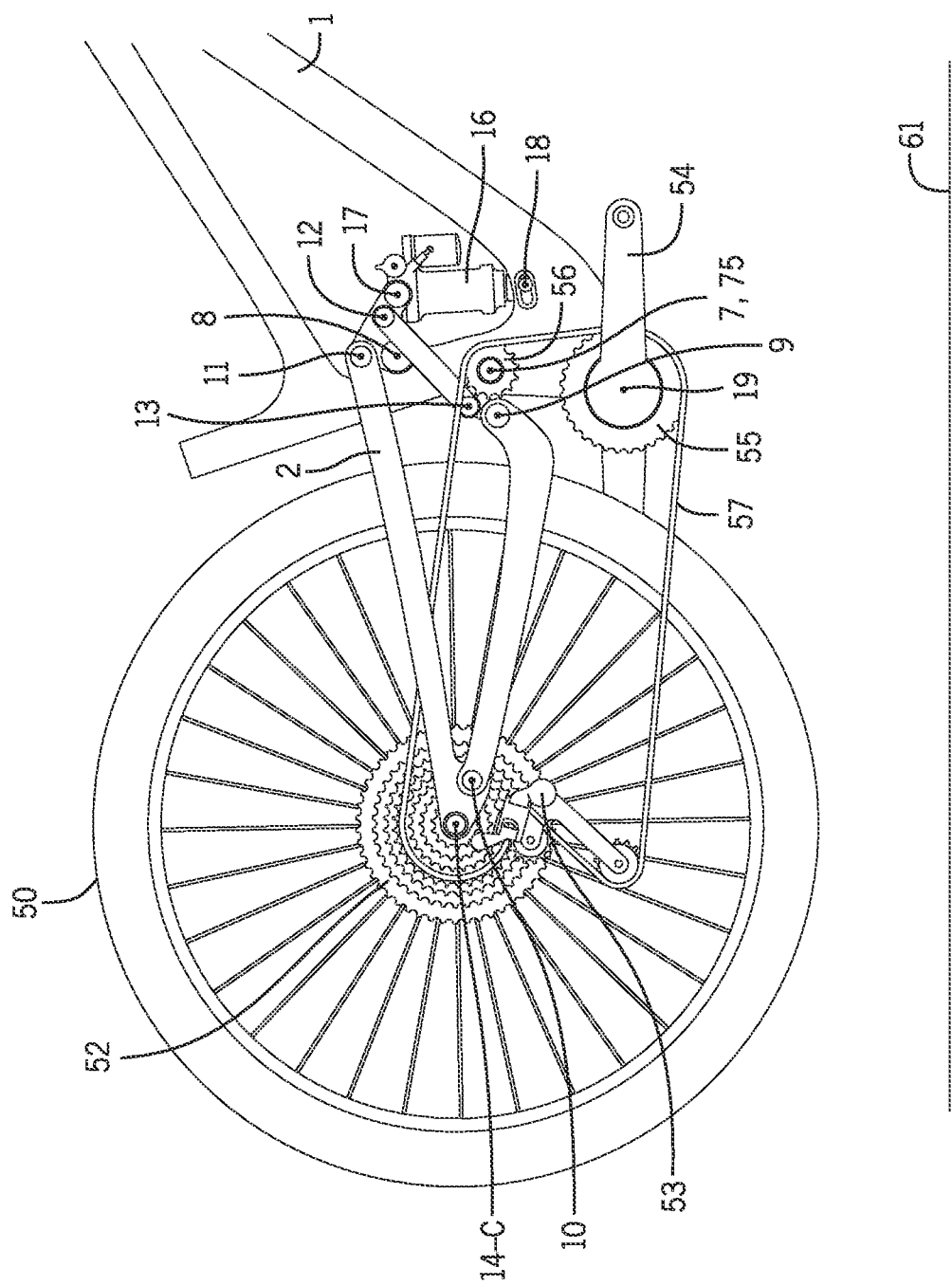
Figure 2E:
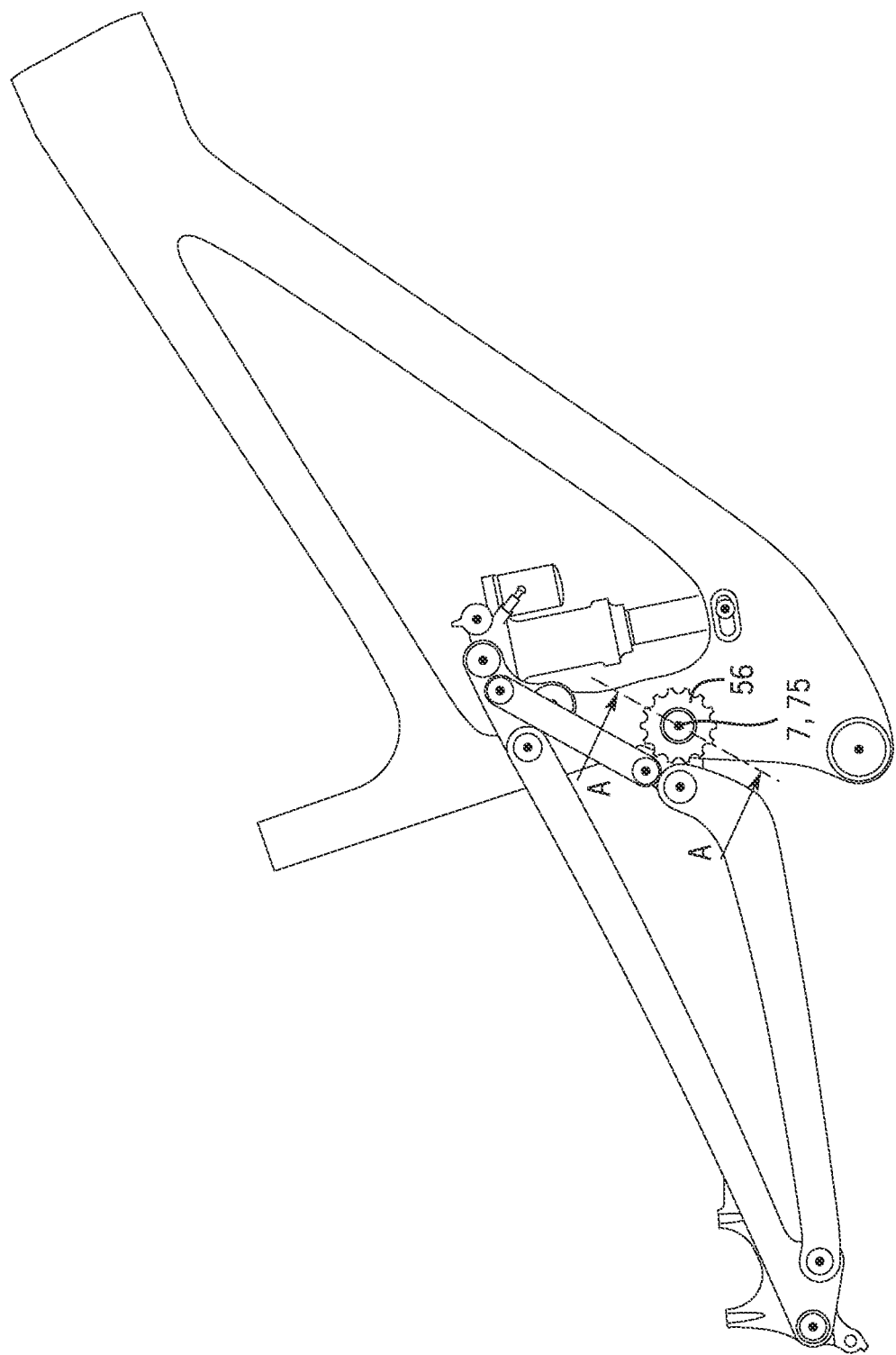
FIG. 2E shows the embodiment of FIG. 2A of a 6-bar suspension linkage system in the extended state with cross-section A.

FIG. 2C shows the bicycle frame from FIG. 2A in the compressed state. Here, rear wheel axis 14-C is shown. FIG. 2D shows the bicycle frame from FIG. 2B in the compressed state. FIG. 2E shows the 6-bar suspension linkage system of FIG. 2A in the extended state with cross-section line A-A passing through the idler cog 56.

Figure 2F:
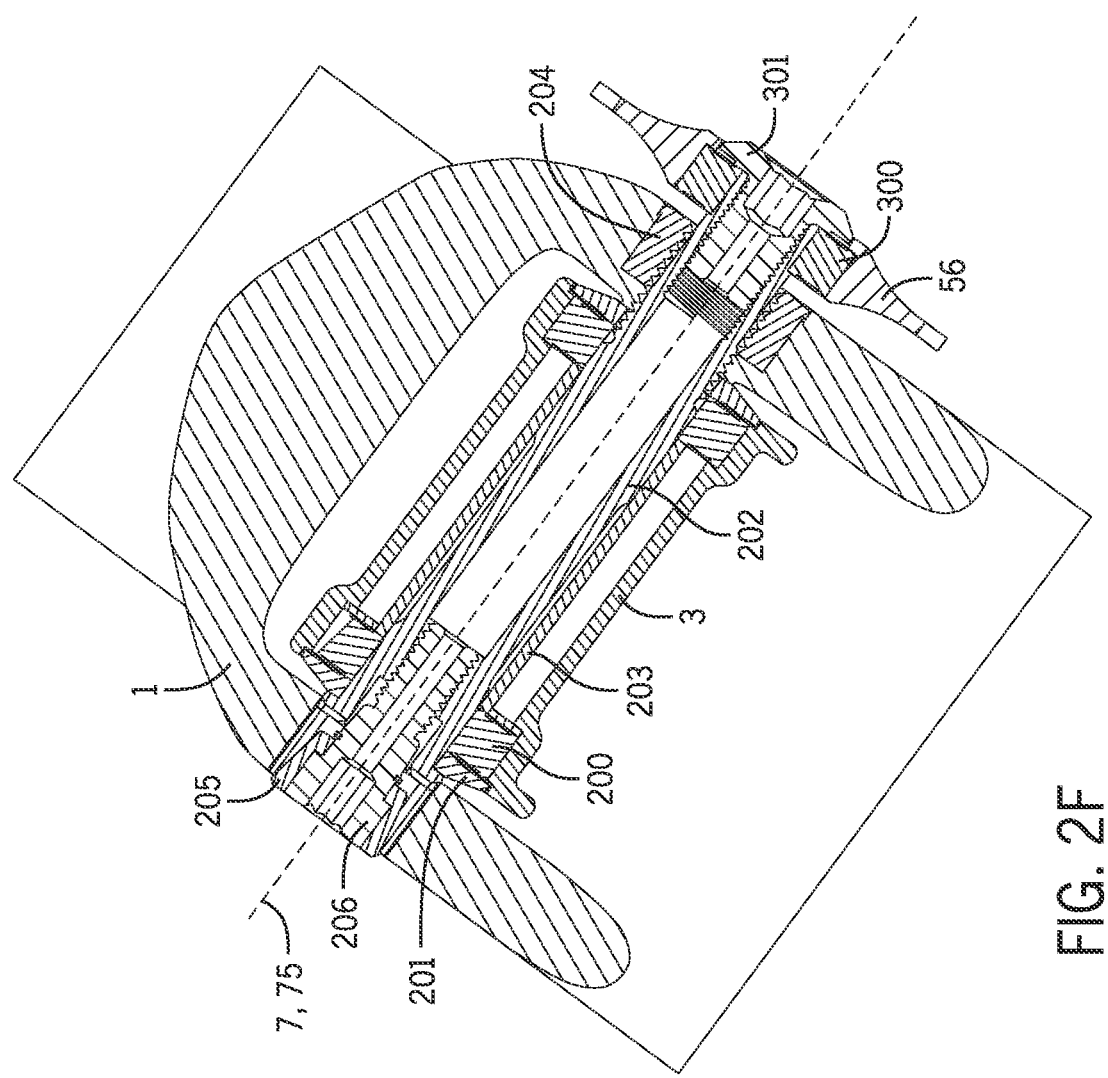
FIG. 2F shows cross-section A-A of the embodiment of FIG. 2A.

FIG. 2F illustrates a cross sectional view taken at cross-section A-A of FIG. 2E showing details of idler cog 56 assembly. For example, link body 3 can be pivotally mounted to is suspended body 1 about PIVC[1][3] axis 7. In various embodiments, the link body 3 includes a pivotable joint mechanism. For example, a set of bearings 200 can be pressed into link body 3 with bearing sleeve 203 in-between, and inner race extensions 201 to the exterior. While a bearing mechanism is described herein as an example, other joints can also be utilized (e.g. torsion joints). Axle 202 pins link body 3 to suspended body 1 and threads into a nut housed in suspended body 1. Axle 202 has an expanding collet head feature so that when wedge 205 is compressed axially by bolt 206, the head of axle 202 expands against suspended body-1 preventing axle 202 from loosening. Bearing 300 is pressed into idler cog 56 and bolt 301 secures the idler cog and bearing to axle 202 so that both PIVC[1][3] 7 and idler cog axis 75 are coincident.

When idler cog axis 75 is coincident to PIVC[1][3] 7, the assembly can be optimized for weight since the idler assembly can be integrated into the pivot assembly of link body 3. This also provides fewer machined interfaces simplifying manufacturing and potentially lower costs. The chain force about idler cog 56 due to the driving cog 55 can be of high magnitude and the axle 202 provides adequate strength.

In accordance with various embodiments, the transverse envelope of the link body 4 is not limited by the chain ring 55. For example, some or all of the link body 4 is positioned above the chain ring 55. In the case of FIG. 1A, link body 4 is lower in the assembly and is positioned behind driving cog 55 in this view. As a result, the link body 4 structure must be sufficiently narrow when viewed from the top view (normal to the ground) in order to limit or prevent interference with the chainring 55 and rear wheel/tire 50. With embodiment 1, link body 4 is located higher on the frame and is above driving cog 55. As a result, link body 4 can be much wider from the back view which is illustrated further in FIGS. 1B-1C and 2G-2H. This allows for a stronger structure with the ability to provide additional tire clearance which allows for a greater range of tire size compatibility and a greater ability to shed mud, dirt and other trail debris.

Figure 2G:
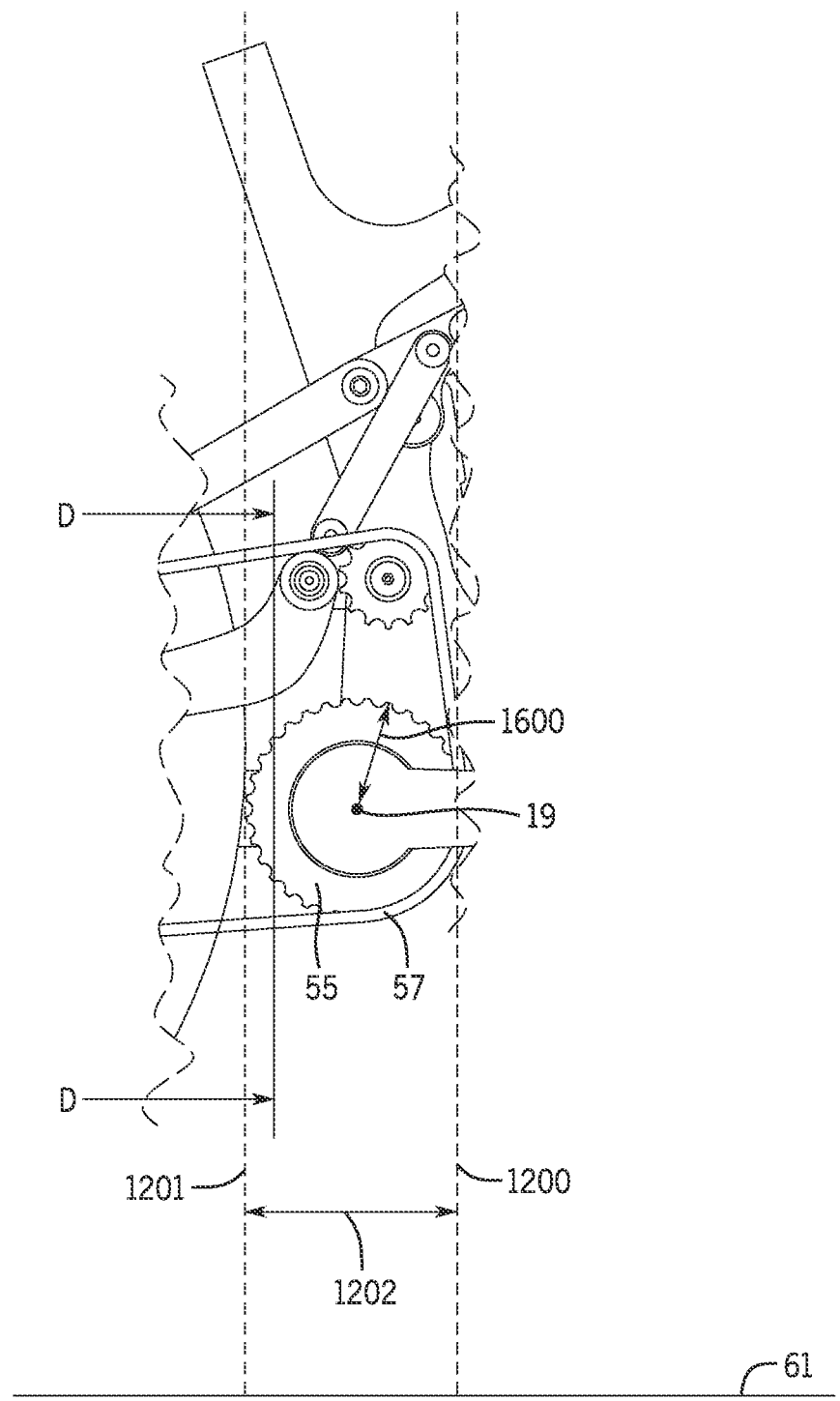
FIG. 2G is a section of the embodiment of FIG. 2B with cross section D-D.

FIG. 2G shows a section of the embodiment of FIG. 2B with cross section D-D. Here the following are shown: Driving cog axis 19; driving cog 55; chain/belt 57; ground 61; front driving cog plane 1200 which is parallel to driving cog axis 19, perpendicular to the ground, and tangent to the diameter of driving cog 55; rear driving cog plane 1201 which is parallel to driving cog axis 19, perpendicular to the ground, and tangent to the diameter of driving cog 55; driving cog region width 1202 which is equivalent to the driving cog diameter; driving cog radius 1600 which is equivalent to half of the driving cog diameter; and cross section line D-D. Cross section line D-D is located within the region defined by the ground 61, front driving cog plane 1200, and rear driving cog plane 1201.

Figure 2H:
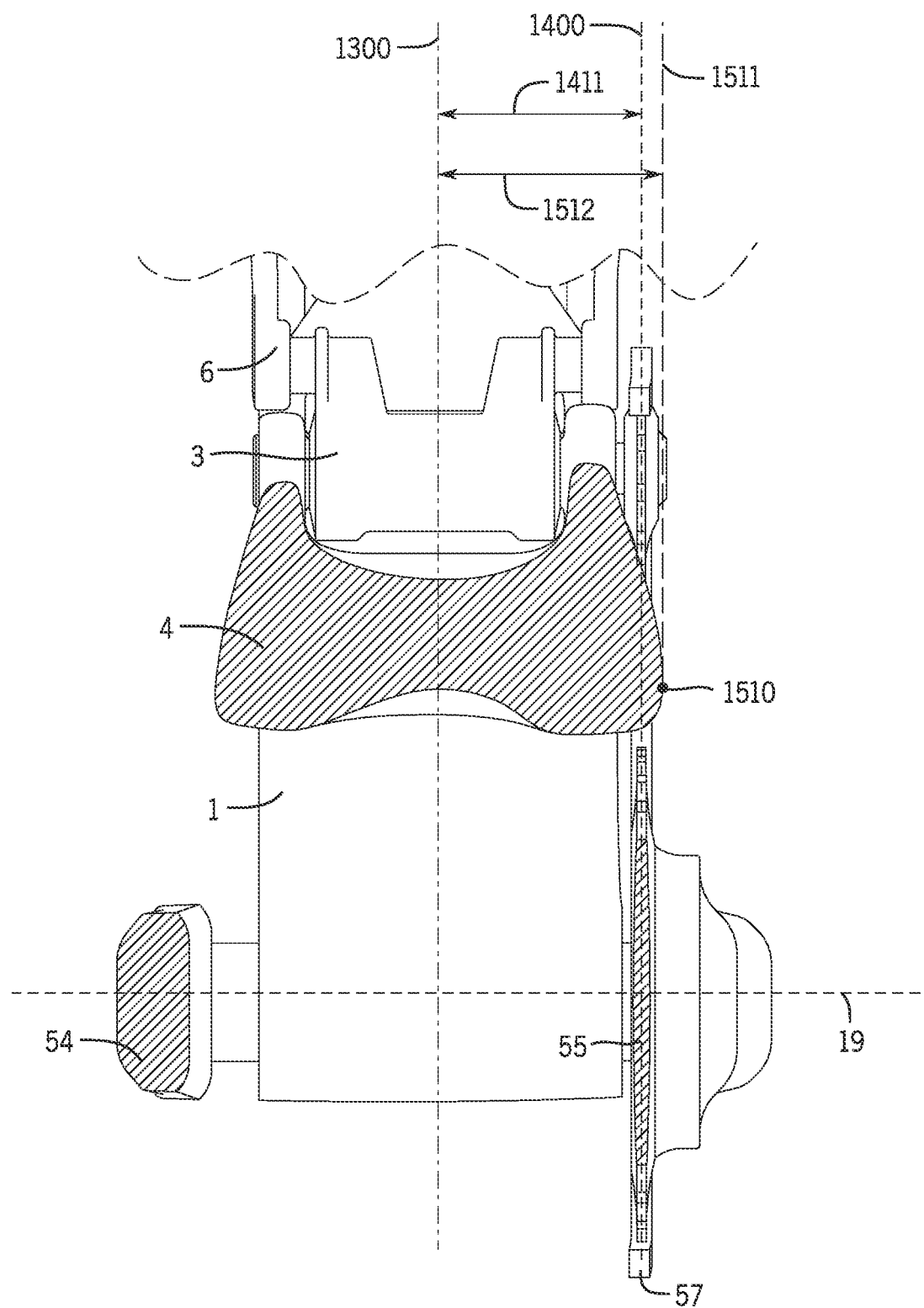
FIG. 2H shows cross-section D-D of the embodiment of FIG. 2G.

FIG. 2H shows cross-section D-D of the embodiment of FIG. 2G. Here the following are shown: Driving cog axis 19; driving cog 55; driving cog center plane 1400; chain/belt 57; crank arm assembly 54; suspended body 1; link body 3; link body 6; link body-4; point 1510 located on link body 4; link body 4 reference plane 1511 that is normal to driving cog axis 19 and coincident to point 1510; frame center plane 1300; chain/belt-line 1411 which is the distance from frame center plane 1300 to driving cog center plane 1400; and link body 4 reference distance 1512 which is the distance from frame center plane 1300 to link body 4 reference plane 1511. Here it is clear that chain/belt-line distance 1411 is less than link body 4 reference distance 1512. Therefore, a portion of link body 4 is located outside ("outside" being the direction, relative to the plane, away from the vehicle frame/suspension) of driving cog center plane 1400. The ability to extend link body 4 outward of driving cog center plane 1400 increases the strength of link body 4 by allowing for a larger cross section while maintaining clearance to driving cog body 55. It also allows for greater clearance between link body 4 and rear wheel/tire 50 which allows for more clearance for trail debris such as mud and dirt.

In accordance with various embodiments, the link body 6 length is minimized with the addition of idler cog 56. As link body 4, and link body 3 are moved upwards and dimension of 601 is greater than that of 600, the size of link body 6 decreases. This decreases the weight of link body 6 aiding in the overall performance of the machine.

In accordance with various embodiments, the anti-squat percentage can be adjusted by increasing or decreasing the diameter of idler cog 56. However, the efficiency of the chain/belt force transfer from idler cog 56 may decrease with decreased cog diameter. In accordance with various embodiments, alternative tuning can be performed by changing the relationship between idler cog axis 75 and PIVC[1][3] 7. For example, idler cog axis 75 can be moved so that it is not coincident to PIVC[1][3] 7. This alternative structure is discussed in more detail in the disclosure of FIGS. 3A-3F.

Figure 3A:
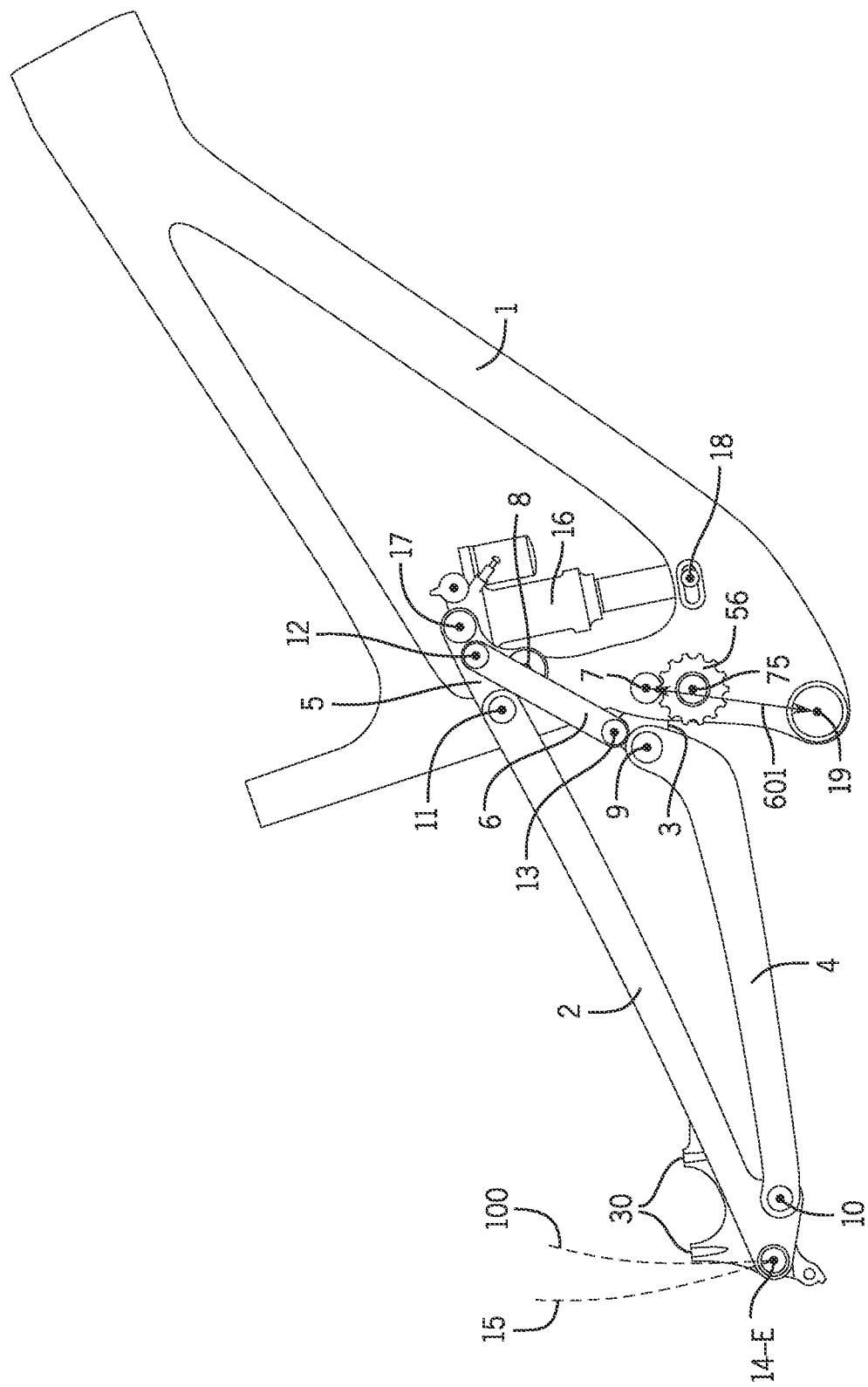
FIG. 3A shows another embodiment of a 6-bar suspension linkage system in the extended state.

With regards to FIGS. 3A-3F and in accordance with various embodiments, the suspension system includes a 6 bar linkage. FIG. 3A shows a bicycle frame with a 6 bar suspension with idler cog 56 with axis 75. Here, crank arm 54 and driving cog 55 rotate about driving cog axis 19. The suspension includes a suspended body 1, a link body 2, a link body 3, a link body 4, a link body 5, and a link body 6 operatively coupled with one another. In accordance with various embodiments, the link body 2 is the wheel carrier and the brake carrier body. In other embodiments, the wheel carrier and the brake carrier body may differ. The link body 3 includes jointed connections with the suspended body 1 defining PIVC[1][3] 7, the link body 4 defining PIVC[3][4] 9, and the link body 6 defining PIVC[3][6] 13. The link body 4 includes an additional jointed connection with the link body 2 defining PIVC[2][4] 10. The link body 5 includes additional jointed connections with suspended body 1 defining PIVC[1][5] 8, link body 2 defining PIVC[2][5] 11, and the link body 6 defining PIVC[5][6] 12. The suspension includes a damper unit 16 pivotally connected to link body-5 at 17 and suspended body 1 at 18 configured to resist movement between the two bodies. Brake caliper mounts 30 and rear wheel axis at the extended state 14-E are located on link body 2 which is also the wheel carrier and brake carrier body in this embodiment. In accordance with various embodiments, the link body 2 is the seatstay. Alternatively, the seatstay may be a different link body in other embodiments. In accordance with various embodiments, the link body 4 may be referred to the chainstay. Alternatively, the chainstay may be a different link body in other embodiments. Note that idler cog axis 75 is offset from (i.e. not coincident with) PIVC[1][3] 7. Also shown is distance 601, which is the distance between the driving cog axis and PIVC[1][3] 7. This distance is pertinent to the magnitude of rearward direction of DWAP 15. Note that offset 601 is greater than offset 600, and as a result, DWAP 15 is more rearward compared to DWAP 100.

Figure 3B:
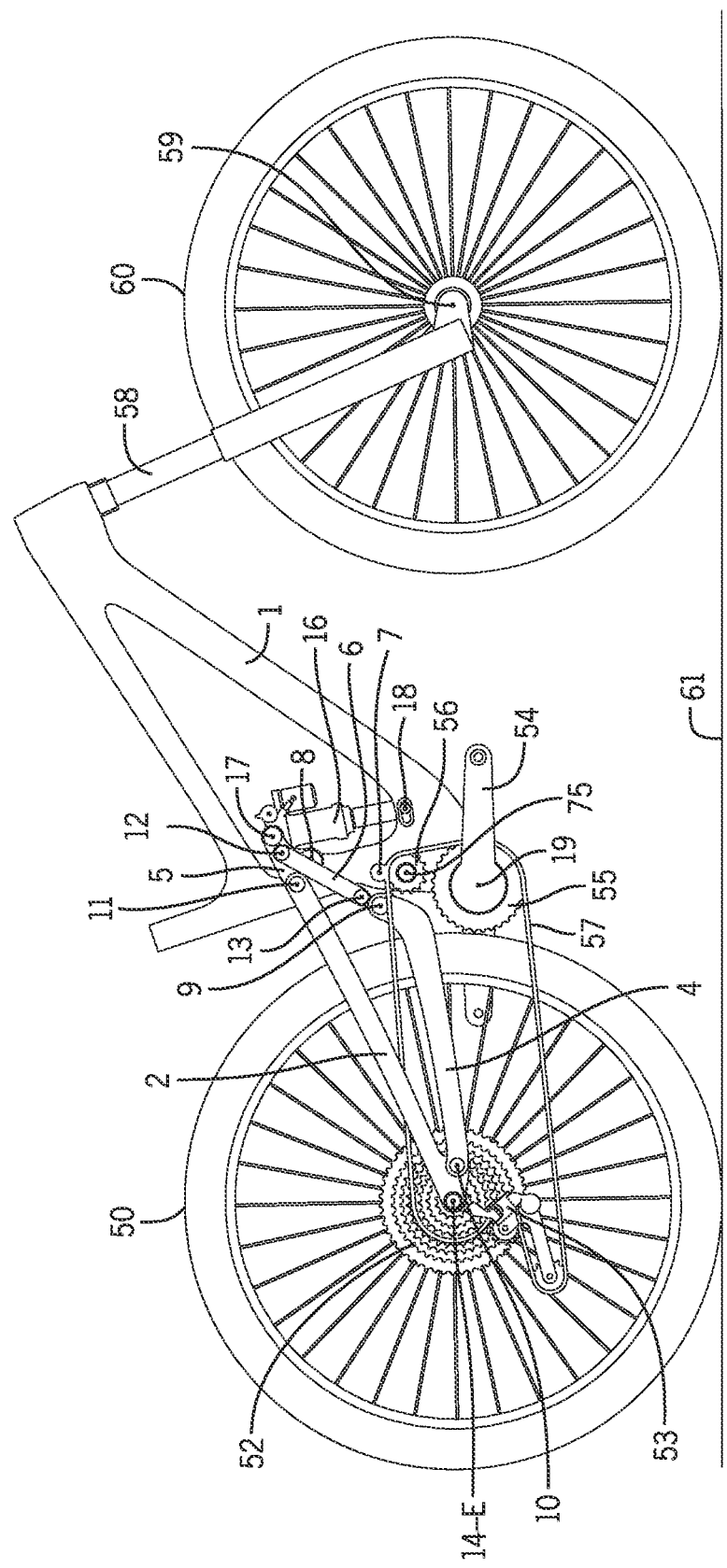
FIG. 3B shows the embodiment of FIG. 3B of a bicycle with the disclosed 6-bar suspension linkage system in the extended state.

FIG. 3B shows the bicycle frame from FIG. 3A with additional components for clarity. Here rear wheel 50 is pivotally connected to link body 2 and rear wheel axis 14-E. A rear cassette 52 is a group of various driven cog sizes. The chain/belt 57 can be shifted into mechanically via rear derailleur mechanism 53 moving between the various driven cogs. Idler cog 56 includes axis 75. Axis 75 is offset from IVC[1][3] 7. Chain/belt 57 is routed from driving cog 55, which is rigidly connected to crank arm assembly 54, to idler cog 56 to a driven cog of cassette 52 through the cogs of rear derailleur 53 and back to the driving cog 55 in a continuous loop. When the crank arm assembly 54 is rotated, power is transmitted from driving cog 55 to a driven cog of cassette 52 via the idler cog 56. As a result, the chain force vector is along the top part of the chain/belt from the tangent connection point of the driven cog of cassette 52 to the tangent connection point of idler cog 56. Note that the cassette 52 with multiple driven cogs and the derailleur mechanism 53 may be absent in other embodiments. In other embodiments, a single driven cog may be used. Also shown is a front suspension fork 58 wherein front wheel 60 is pivotally connected at front wheel axis 59. Rear wheel 50 and front wheel 60 contact the ground 61.

Figure 3C:
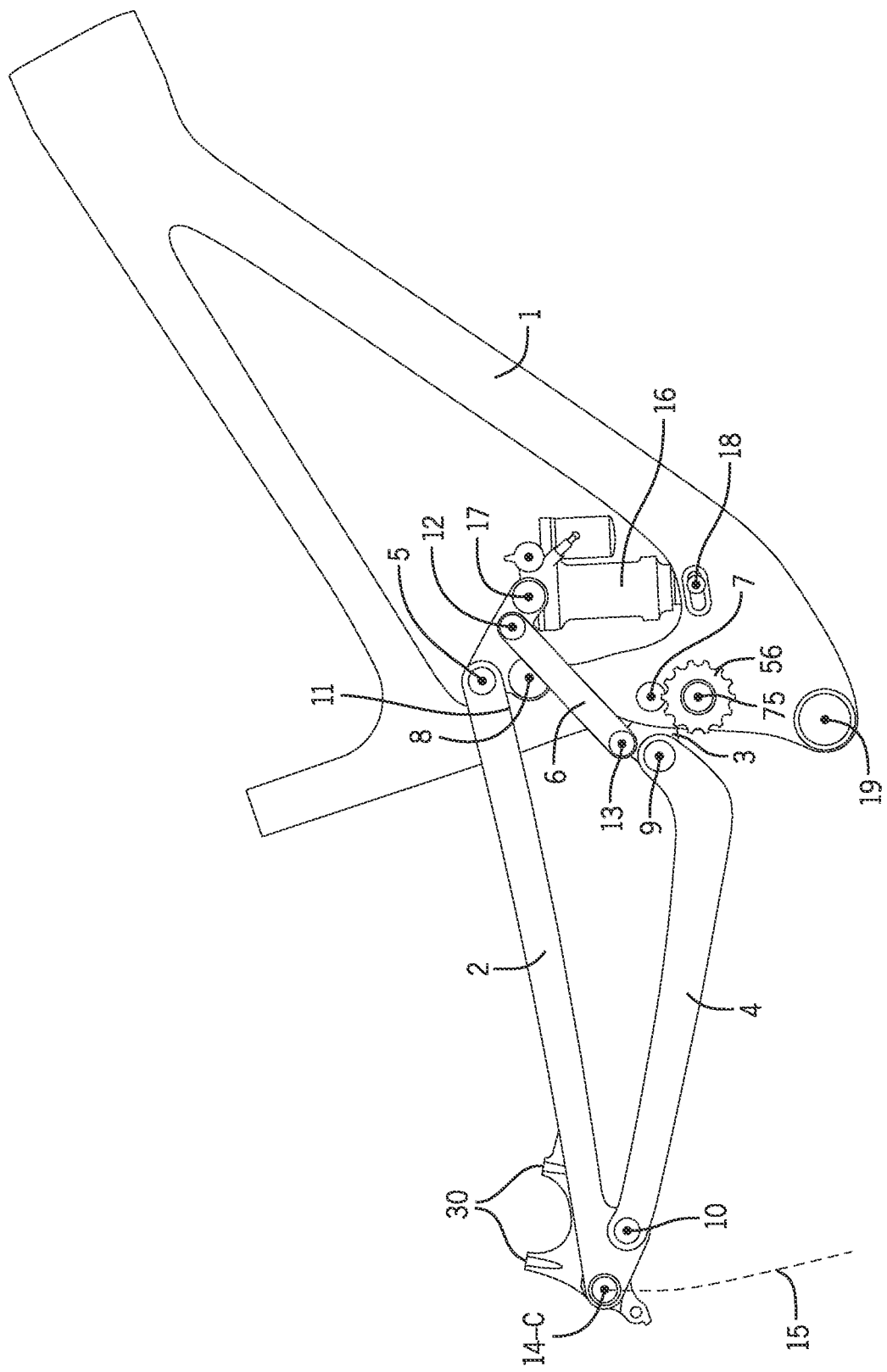
FIG. 3C shows the embodiment of FIG. 3B of a 6-bar suspension linkage system in the compressed state.
Figure 3D:
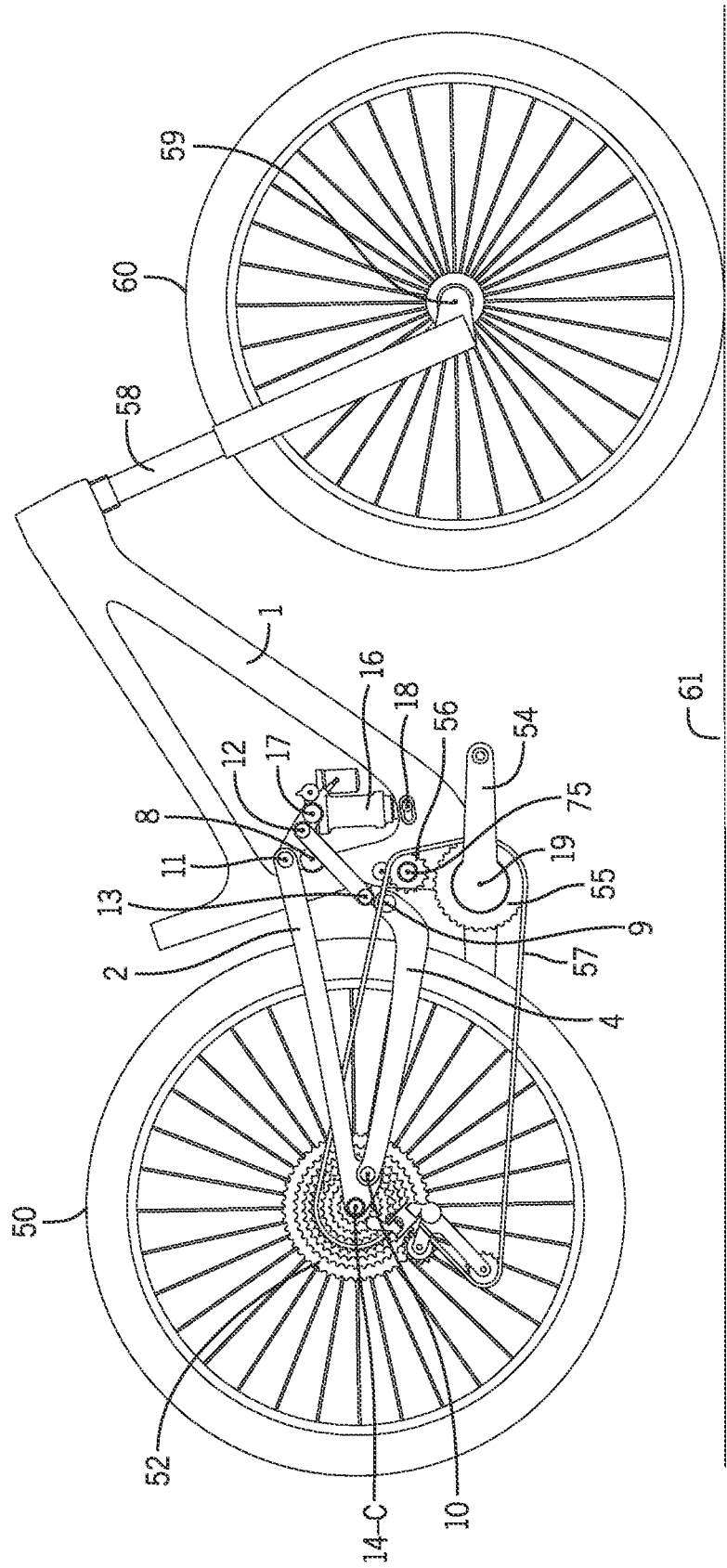
FIG. 3D shows the embodiment of FIG. 3B of a bicycle with the disclosed 6-bar suspension linkage system in the compressed state.
Figure 3E:
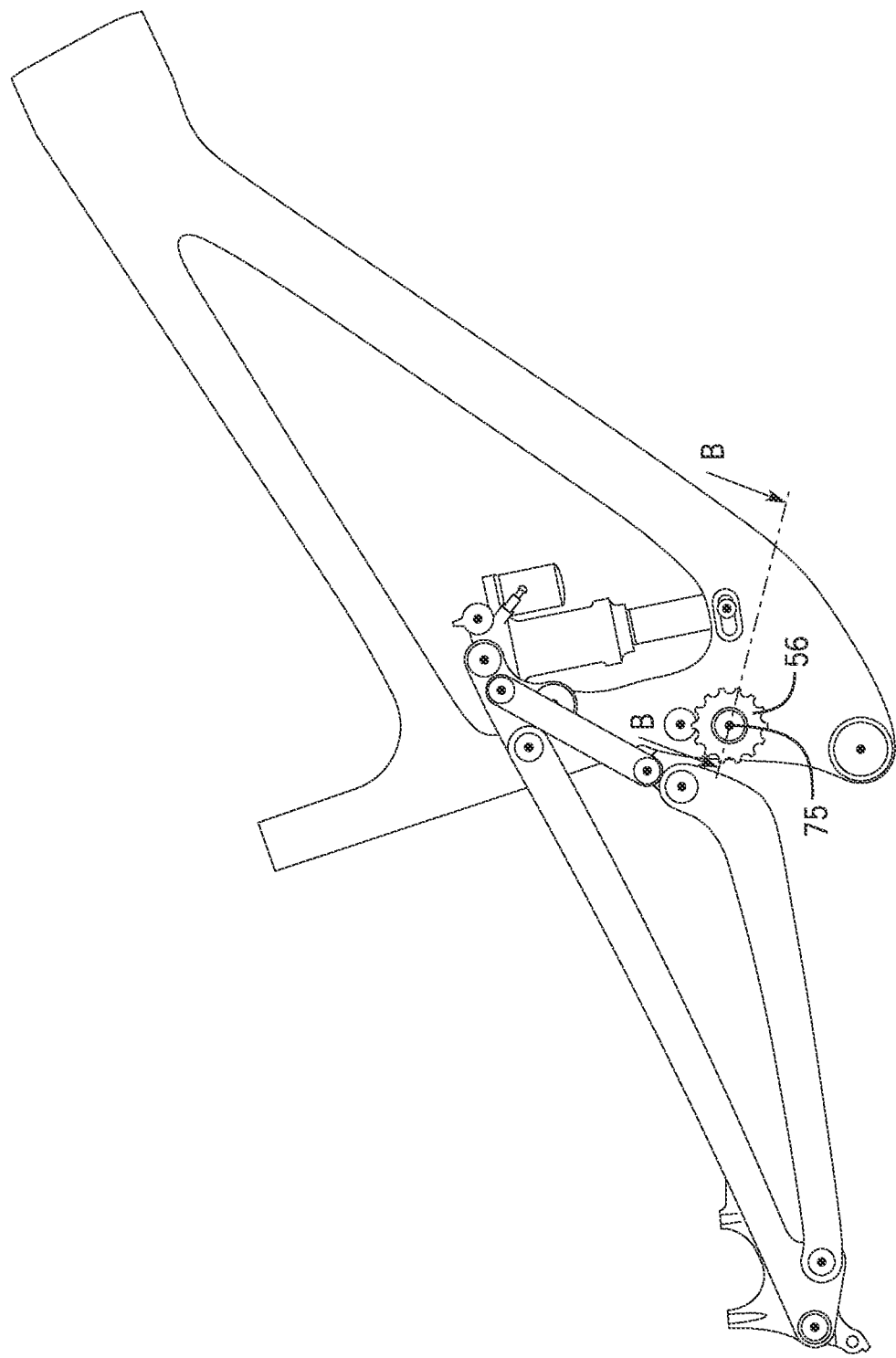
FIG. 3E shows the embodiment of FIG. 3B of a 6-bar suspension linkage system in the extended state with cross-section B.

FIG. 3C shows the bicycle frame from FIG. 3A in the compressed state. Here, rear wheel axis 14-C is shown. FIG. 3D shows the bicycle frame from FIG. 3B in the compressed state. FIG. 3E shows the 6-bar suspension linkage system of FIG. 3A in the extended state with cross-section line B-B through idler cog 56.

Figure 3F:
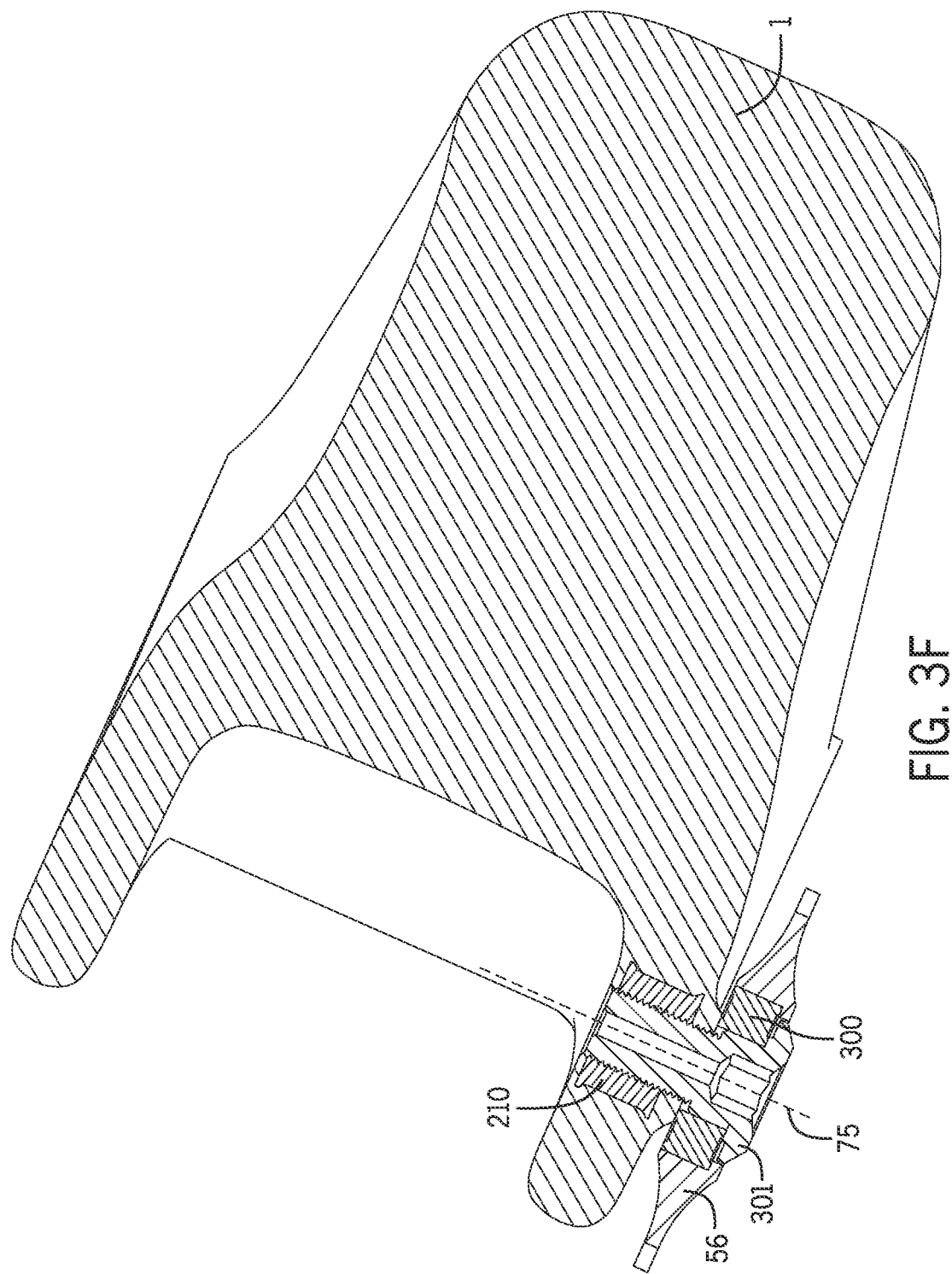
FIG. 3F shows cross-section B-B of the embodiment of FIG. 3B.

FIG. 3F shows the cross-section taken along line B-B of FIG. 3E showing details of the idler cog 56 assembly. Here bearing 300 is pressed into idler cog 56 and bolt 301 secures the idler cog and bearing to threaded insert 210 housed within suspended body-1.

When idler cog axis 75 is offset from PIVC[1][3] 7, a greater range of anti-squat percentages are possible. The idler cog diameter can remain the same, while a large change in anti-squat is possible depending upon the location of idler cog axis 75. The anti-squat percentage can be fine-tuned by increase or decreasing the diameter of idler cog 56.

Tony Foale (Foale, Tony. *Motorcycle Handling and Chassis Design the Art and Science. Second Edition.* Spain: Tony Foale Designs by Tony Foale, 2002. PDF accessed 2011.) incorporated herein by reference in its entirety, details a simple graphical method to determine anti-squat and anti-rise percentages by using a side view of a belt or chain-driven two-wheel vehicle.

Figure 4:
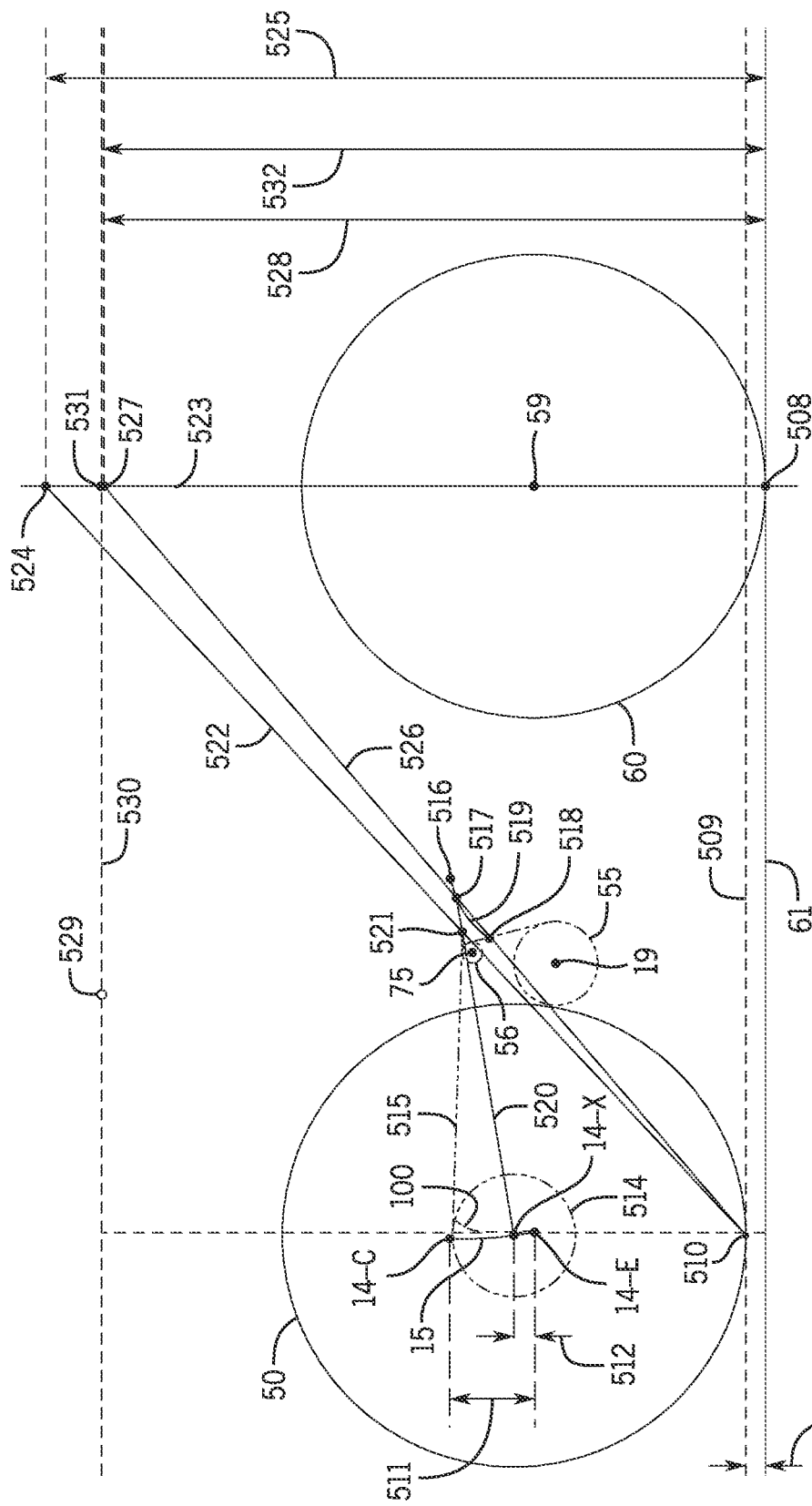
FIG. 4 is a schematic illustrating an anti-squat and anti-rise analysis of a 6-bar suspension with an idler.

The method described in Tony Foale is used in the analysis shown in FIG. 4. Shown in FIG. 4 are the following: Driven wheel 50; front wheel 60; Front wheel axis 59; Driven wheel axis at the extended state 14-E; Driven wheel axis at an intermediate state 14-X; Driven wheel axis at the compressed state 14-C; Driven wheel axis path (DWAP) 15 and DWAP 100 for comparison. Ground line 61 tangent to driven wheel at extended state and perpendicular to gravity; Tangent point 508 of front wheel 60 to ground line 61; Ground line at an intermediate state 509 is parallel to 61; Driven wheel tire to ground tangent point at an intermediate state 510; Total driven wheel suspension travel distance perpendicular to the ground line known as the total vertical wheel travel 511; Intermediate driven wheel suspension travel distance perpendicular to the ground line known as the intermediate vertical wheel travel 512; Driving cog 55 and driving cog axis 19; Driven cog 514; Chain force vector 515 that is tangent to the tops of idler cog 56 and the driven cog 514; Idler cog 56 rotates about idler cog axis 75; DIVC[AD] at the extended state 516; DIVC[AD] at an intermediate state 517; DIVC[AD] at the compressed state 518; DIVC[AD] migration path 519; Driving force vector 520 drawn through the driven wheel axis at an intermediate state 14-X and the DIVC[AD] at an intermediate state 517; Instantaneous Force Center (IFC) 521 located at the intersection of chain force vector 515 and driving force vector 520; Anti-Squat force vector 522 drawn through the driven wheel tire to ground tangent point at an intermediate state 510 and the Instantaneous Force Center (IFC) 521; Squat layout line 523 which is perpendicular to the ground and passes through front wheel axis 59; Anti-Squat definition point 524 where Anti-Squat force vector 522 intersects with Squat layout line 523; Anti-Squat measured distance 525 is the perpendicular distance from the ground line 61 to the Anti-Squat definition point 524; Anti-Rise force vector 526 is drawn through driven wheel tire to ground tangent point at an intermediate state 510 and DIVC[AD] at an intermediate state 517; Anti-Rise definition point 527 where Anti-Rise force vector 526 intersects the Squat layout line 523; Anti-Rise measured distance 528 is the perpendicular distance from the ground line 61 to the Anti-Rise definition point 527; Center of Gravity (COG) 529 is the mass of the suspended body of the vehicle including the rider, passengers and any cargo; COG horizontal 530 is a line drawn parallel to the ground through COG 529; COG definition point 531 is the point in which the COG horizontal 530 intersects the Squat layout line 523; COG measured distance 532 is the perpendicular distance from the ground line 61 to the COG horizontal 530.

Anti-Squat may be defined as:

$$\text{Anti-Squat} = \left(\frac{\text{Anti-Squat measured distance}}{\text{COG measured distance}}\right) 100\%$$

Anti-Squat in this example is then equal to:

$$\text{Anti-Squat} = \left(\frac{\text{Anti-Squat measured distance (525)}}{\text{COG measured distance (532)}}\right) 100\%$$

Anti-Rise may be defined as:

$$\text{Anti-Rise} = \left(\frac{\text{Anti-Rise measured distance}}{\text{COG measured distance}}\right) 100\%$$

Anti-Rise in this example is then equal to:

$$\text{Anti-Rise} = \left(\frac{\text{Anti-Rise measured distance (528)}}{\text{COG measured distance (532)}}\right) 100\%$$

Anti-squat and anti-rise may be calculated at all points from the extended state to the compressed state to generate anti-squat and anti-rise curves. These curves are typically plotted as a function of "vertical wheel travel" which is equivalent to the total driven wheel suspension travel distance 511 perpendicular to the ground line 61 in FIG. 4. The anti-squat curve will change depending upon the sizes of idler cog 56 and driven cog 514 since this will change the location of the Instantaneous Force Center (IFC) 521. Note that in this example the DIVC[AD] is considered. As a result, both the anti-squat and anti-rise may be calculated using the DIVC[AD] migration. If the suspension linkage was arranged so that the DIVC[A] was separate from the DIVC[D], the DIVC[A] migration would be used to calculate the anti-squat, while the DIVC[D] migration would be used to calculate the anti-rise using the same methodology.

When the suspended body is loaded with a rider, passenger or cargo the suspension will compress or sag to a desired vertical wheel travel at sag point between the extended and compressed state. The preferred sag point varies depending upon desired ride characteristics but typically ranges between 15-45%. The suspension will be positioned near this sag point as the vehicle accelerates from a static position.

The sag percentage is defined as the following:

$$Sag = \left(\frac{\text{Vertical wheel travel value at } sag \text{ point}}{\text{Total vertical wheel travel value}}\right) 100\%$$

Figure 5:
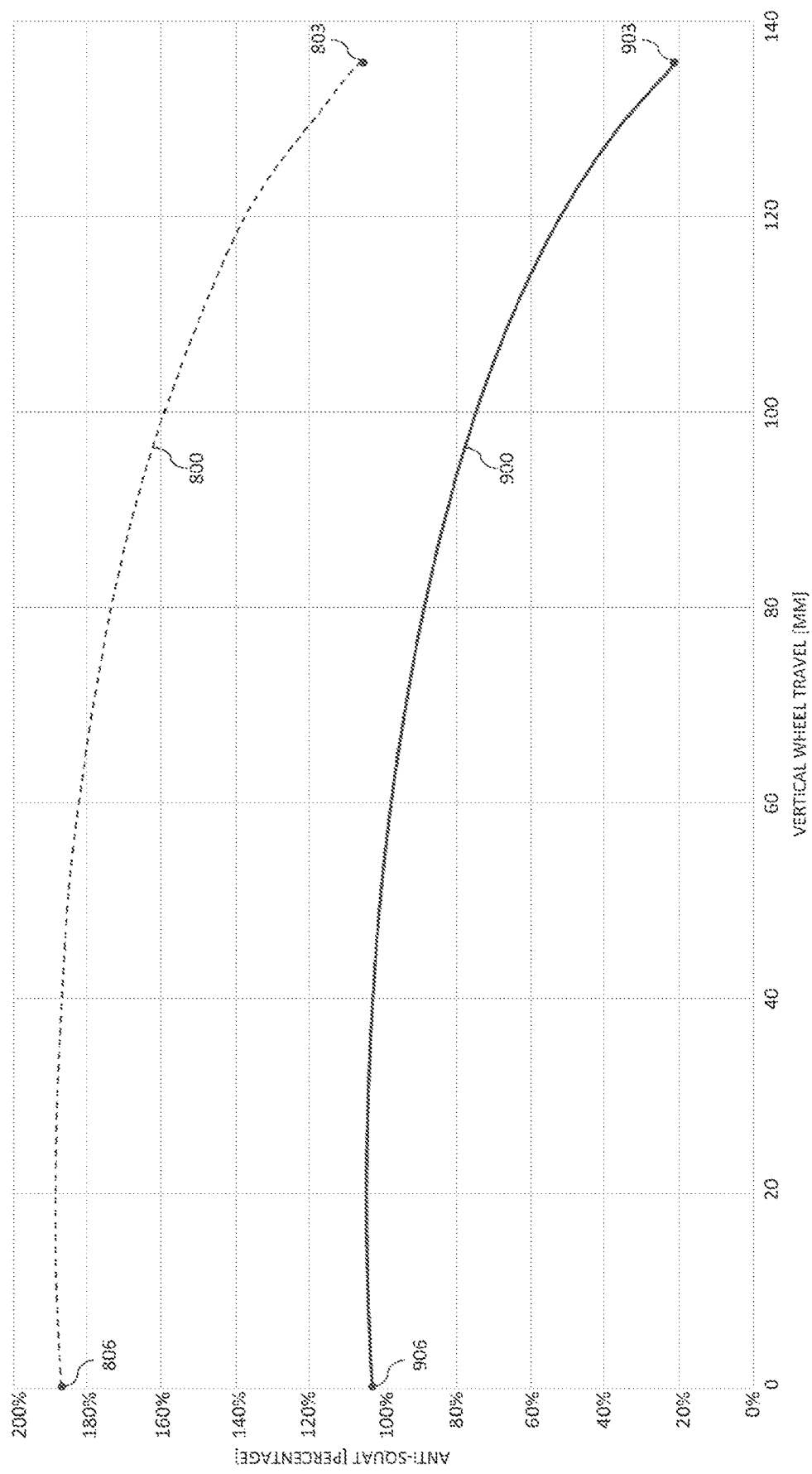
FIG. 5 is a graph depicting expected/exemplary anti-squat curves of a 6-bar suspension linkage system with a typical configuration and an expected/exemplary anti-squat curve of the embodiments illustrated in FIGS. 2A and 3A.

If the suspension linkage geometry/layout is altered, (number of linkage bodies, link body lengths and PIVC locations), the anti-squat, anti-rise, and leverage rate curves may vary. Suspension performance is therefore directly related to the suspension linkage layout. For example, FIG. 5 shows two anti-squat curves as a comparison. Anti-squat curve 900 is an example from the embodiment of FIG. 2A where an idler cog is implemented. In this example, the dimension of 601 is about 136 mm. 906 is the anti-squat percentage of the embodiment of FIG. 2A at the extended state, while 903 is the anti-squat percentage of the embodiment of FIG. 2A at the compressed state. Anti-squat curve 800 is that of linkage layout of the embodiment of FIG. 1A where no idler cog is used. In this example, dimension 600 is ~70 mm. In this case the chain force vector is tangent to the tops of driving cog 55 and the driven cog 514. 806 is the anti-squat percentage of at the extended state, while 803 is the anti-squat percentage at the compressed state in this case. The addition of the idler cog of the embodiment of FIG. 2A greatly reduces the anti-squat percentage, but the general curve form may remain. The same may be true with the embodiment of FIG. 3B. Anti-squat curves 600 and 800 have a generally stable and higher anti squat values initially creating an efficient pedaling platform that prevents bobbing when accelerating. This results in efficient power transfer during acceleration since energy is not being wasted to compress the shock/damper. There is then a non-linear drop-off towards the compressed state. This is beneficial because continuing a similar high anti-squat percentage in this portion of the travel since it would inhibit suspension compression from absorbing impacts.

Figure 19:
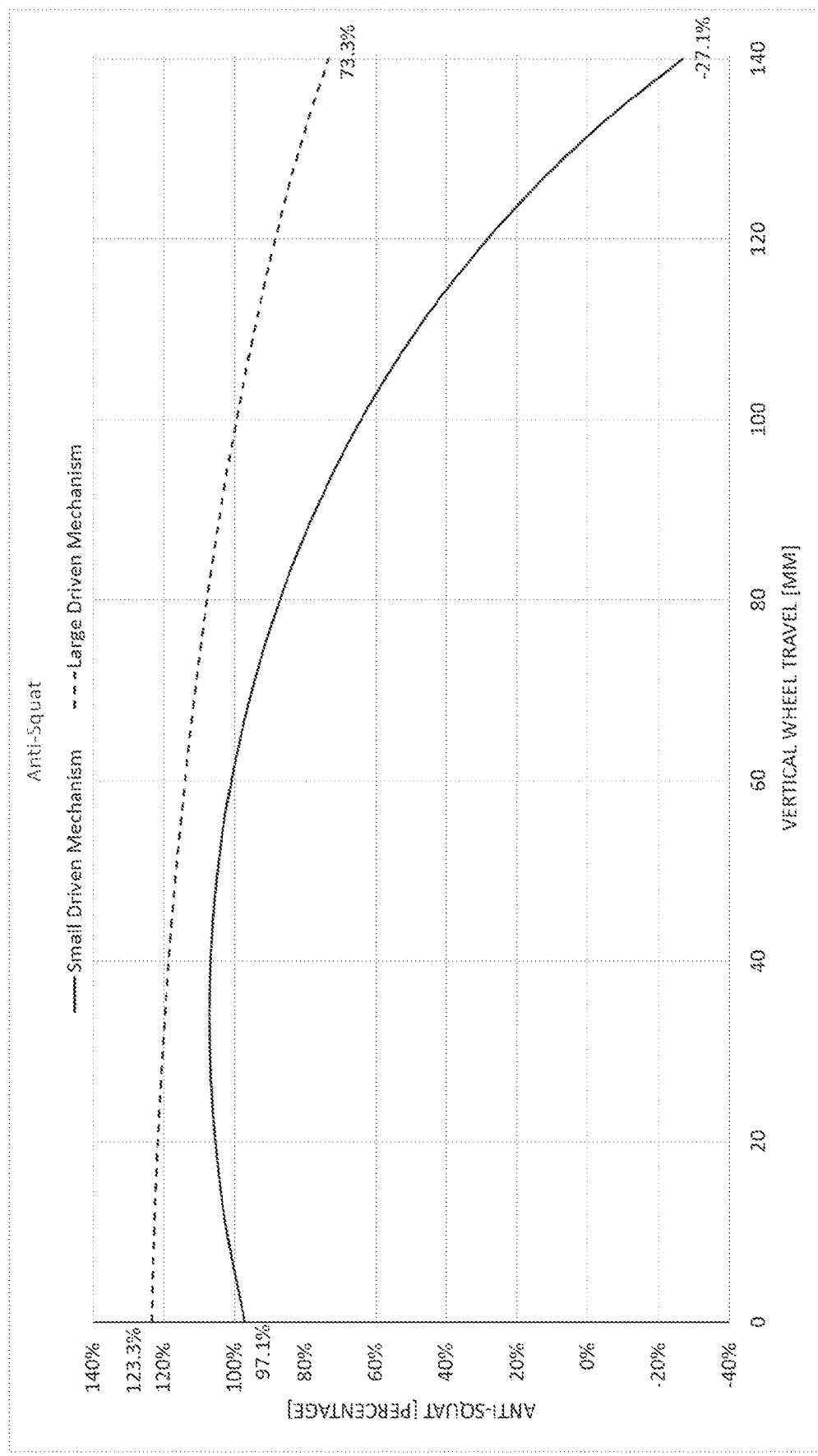
FIG. 19 is a graph depicting expected/exemplary anti-squat curves of a 6-bar suspension linkage system of the present disclosure with relatively smaller and larger driven mechanisms (e.g., differently sized cogs of a rear cassette).

FIG. 19 depicts expected/exemplary anti-squat curves of a 6-bar suspension linkage system of the present disclosure with relatively smaller and larger driven mechanisms (e.g., differently sized cogs of a rear cassette). For example, as the chain/belt 57 is moved between differently sized driven mechanisms (e.g., between differently sized cogs 514 of a rear cassette 52), the anti-squat behavior of the suspension linkage may change. For example, when the belt/chain 57 drives a relatively larger cog 514 (i.e., the bike is in a relatively lower gear), the anti-squat may initially increase as the vertical wheel travel increases (e.g., between about 0-mm and about 35-mm). As the vertical wheel travel increases further, the anti-squat may fall. The relationship between anti-squat and vertical wheel travel may have a maximum point between the minimum and maximum vertical wheel travel. When the belt/chain 57 drives a relatively smaller cog 514 (i.e., the bike is in a relatively higher gear), the anti-squat may fall between the minimum and maximum vertical wheel travel. The anti-squat may have a maximum value at a minimum value of vertical wheel travel and a minimum value at a maximum value of vertical wheel travel. Other driven mechanisms may exhibit other suitable anti-squat behavior.

Figure 20:
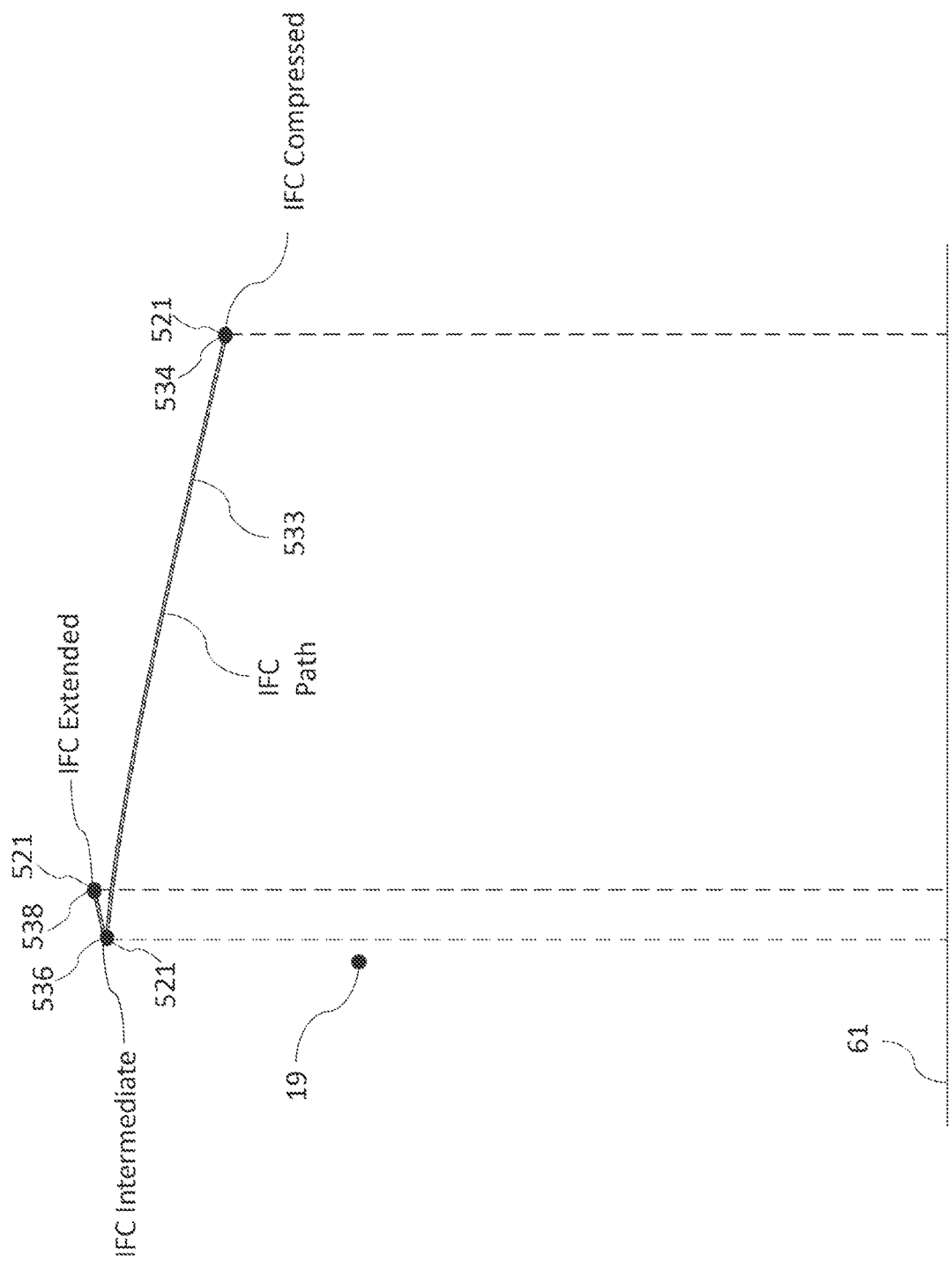
FIG. 20 is a graph depicting an expected/exemplary migration path of an instantaneous force center as a suspension linkage moves between extended and compressed states.

FIG. 20 is a graph depicting an expected/exemplary migration path 533 of an IFC 521 of any suspension linkage of the present disclosure. The migration path is shown relative to the driving cog axis 19 and the ground line 61, for reference. As the suspension linkage moves between an extended and compressed state, the IFC 521 may move rearward to an intermediate position 536 and then forward to compressed position 534. For example, when a suspension linkage is in an extended state, the IFC 521 may be in an extended position 538. As the suspension linkage is compressed, the IFC may move rearward along the migration path 533 to an intermediate position 536. As the suspension is further compressed, the IFC 521 may move forward along the migration path 533 to a compressed position 534. The compressed position 534 may be forward of one or both of the extended position 538 and/or the intermediate position 536. This reversing motion of the IFC along the path 522 influences the increasing/decreasing behavior of the anti-squat in certain driven mechanism (e.g., the anti-squat of the relatively larger driven mechanism in FIG. 19).

The anti-squat includes (e.g., is the sum of) two components, often referred to as "frame" anti-squat and "chain/belt" anti-squat. Chain/belt anti-squat is related to the lengthening of the Power Transmitting (PT) portion of the chain/belt (e.g., the top portion of the chain/belt 57 between to the tops of idler cog 56 and the driven cog 514), as the suspension is moved from the extended to the compressed state. Note that the lengthening of the PT portion of the chain/belt 57 may result in counter clockwise ("CCW") rotation of the crank arm 54 when viewed as in FIG. 1A. This CCW rotation is opposite of the clockwise ("CW") direction when the rider inputs a force on the pedals during acceleration and can be detrimental to suspension performance.

The amount of lengthening of the power transmitting portion may vary depending on the diameter of driven cog 514 (e.g., as shown and described with respect to FIG. 19), which may vary depending upon which gear is chosen within the cassette 52, chain/belt anti-squat may vary as well. Thus, a "family" of anti-squat curves per driven cog diameter may be generated.

Figure 21A:
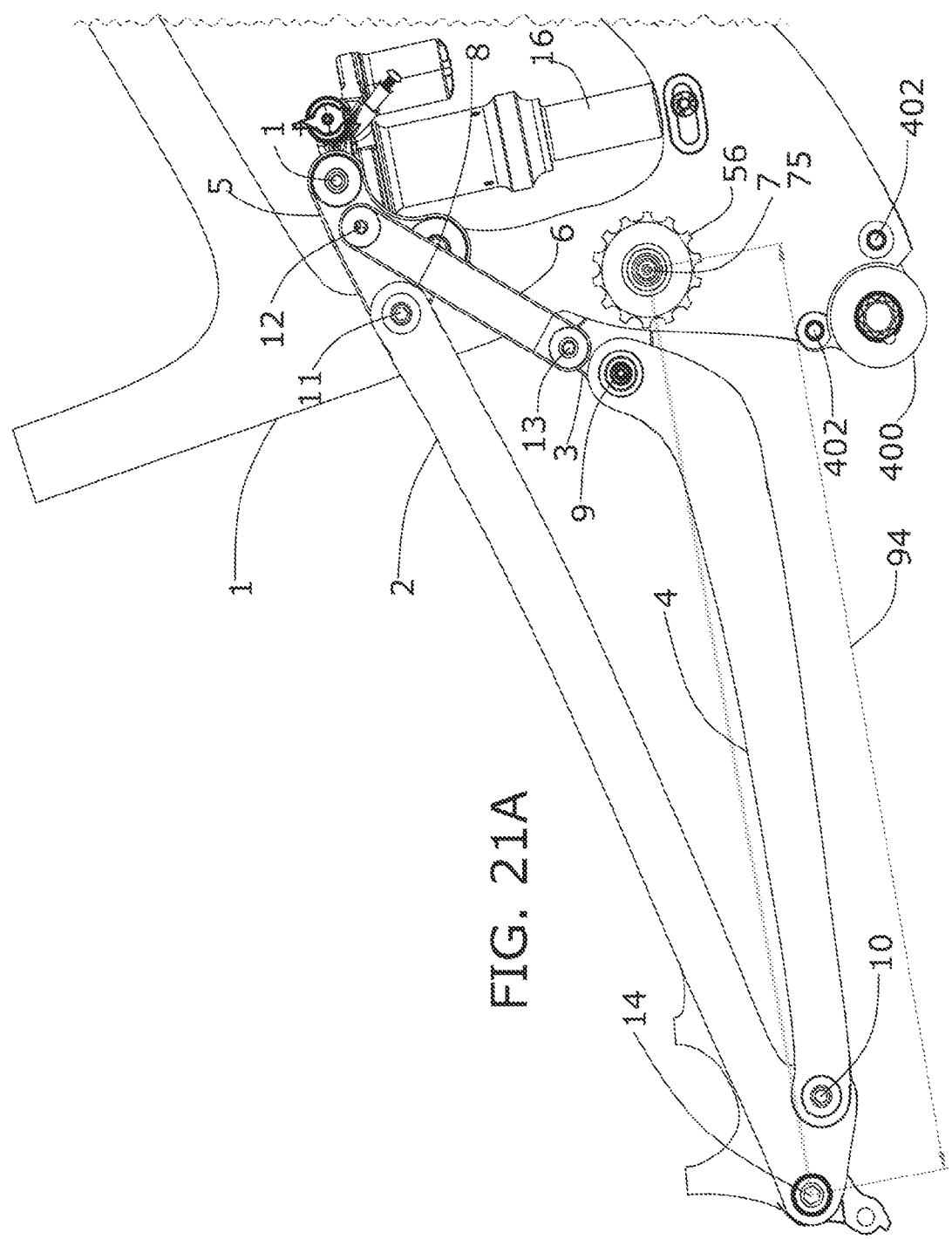
FIG. 21A shows an example of a suspension linkage of an electric bike in an at least partially extended position.
Figure 21B:
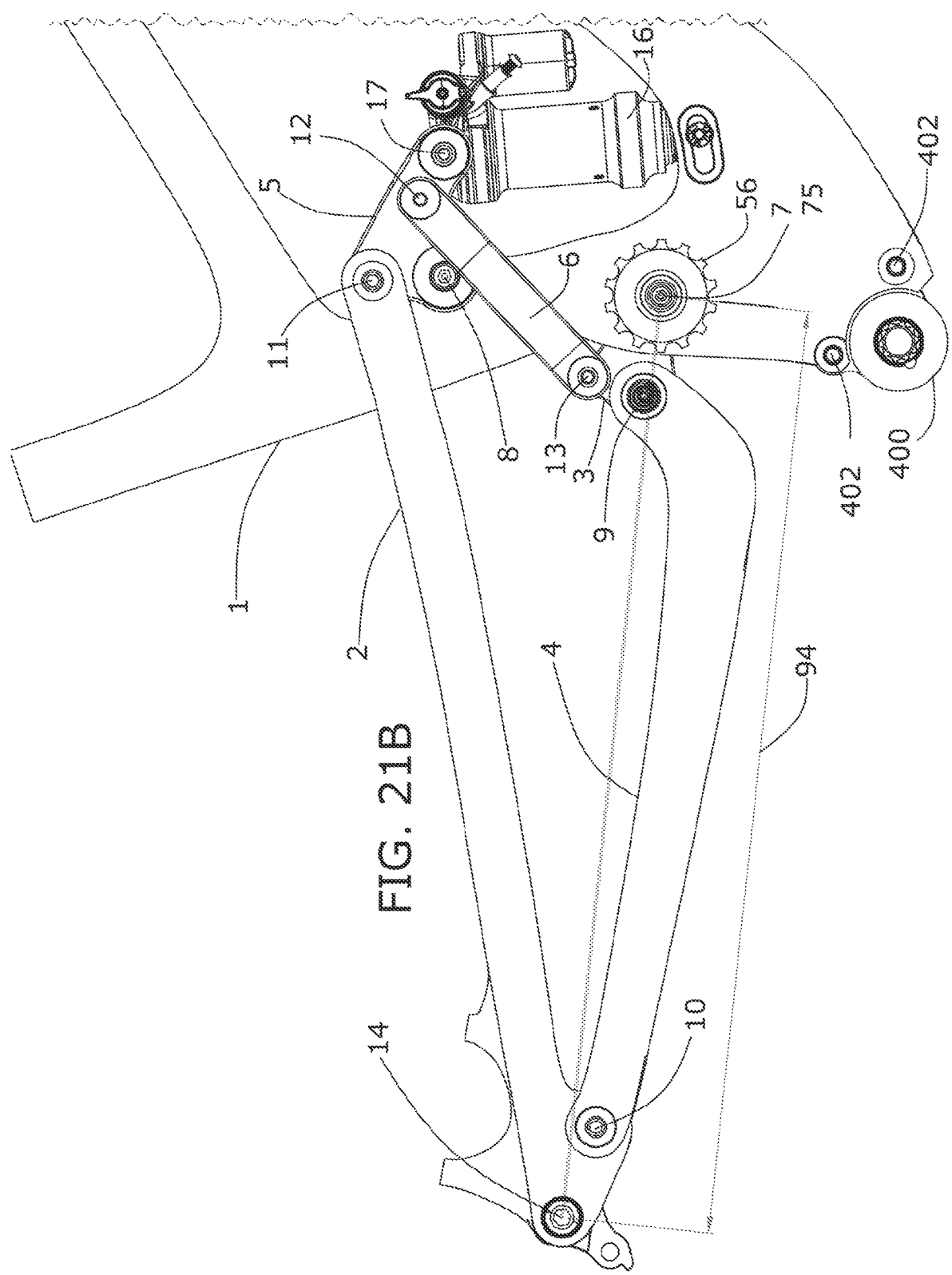
FIG. 21B shows the suspension linkage of FIG. 22A in an at least partially contracted position.

To simplify the analysis of chain/belt anti-squat behavior into one approximated parameter, the Power Transmitting Length "PTL" is introduced. As shown in FIGS. 21A-B, the PTL 94 is the distance between driven wheel axis 14 and idler axis 75. The diameter of the driven or driving cogs are not considered. This PTL 94 may vary as the suspension moves from the extended state to the compressed state. FIG. 21A shows PTL 94 when the suspension in the extended state, while FIG. 21B shows the PTL 94 when the suspension in the compressed state. The PTL may be computed as a function of the vertical wheel travel "VWT".

"dPTL" is the rate of change of the PTL or the slope of the f(VWT)=PTL curve. Given a set of VWT and corresponding PTL data points, dPTL may be calculated as:

$$dPTL = \frac{\Delta PTL}{\Delta VWT}$$

dPTL may then be plotted as a function of VWT. The magnitude of the dPTL represents the chain/belt anti-squat component that has been simplified and does not consider the driven or driven cog diameters. This is useful for understanding the overall chain/belt anti-squat behavior, and to aid in tuning of this variable with respect to sag.

Figure 22:
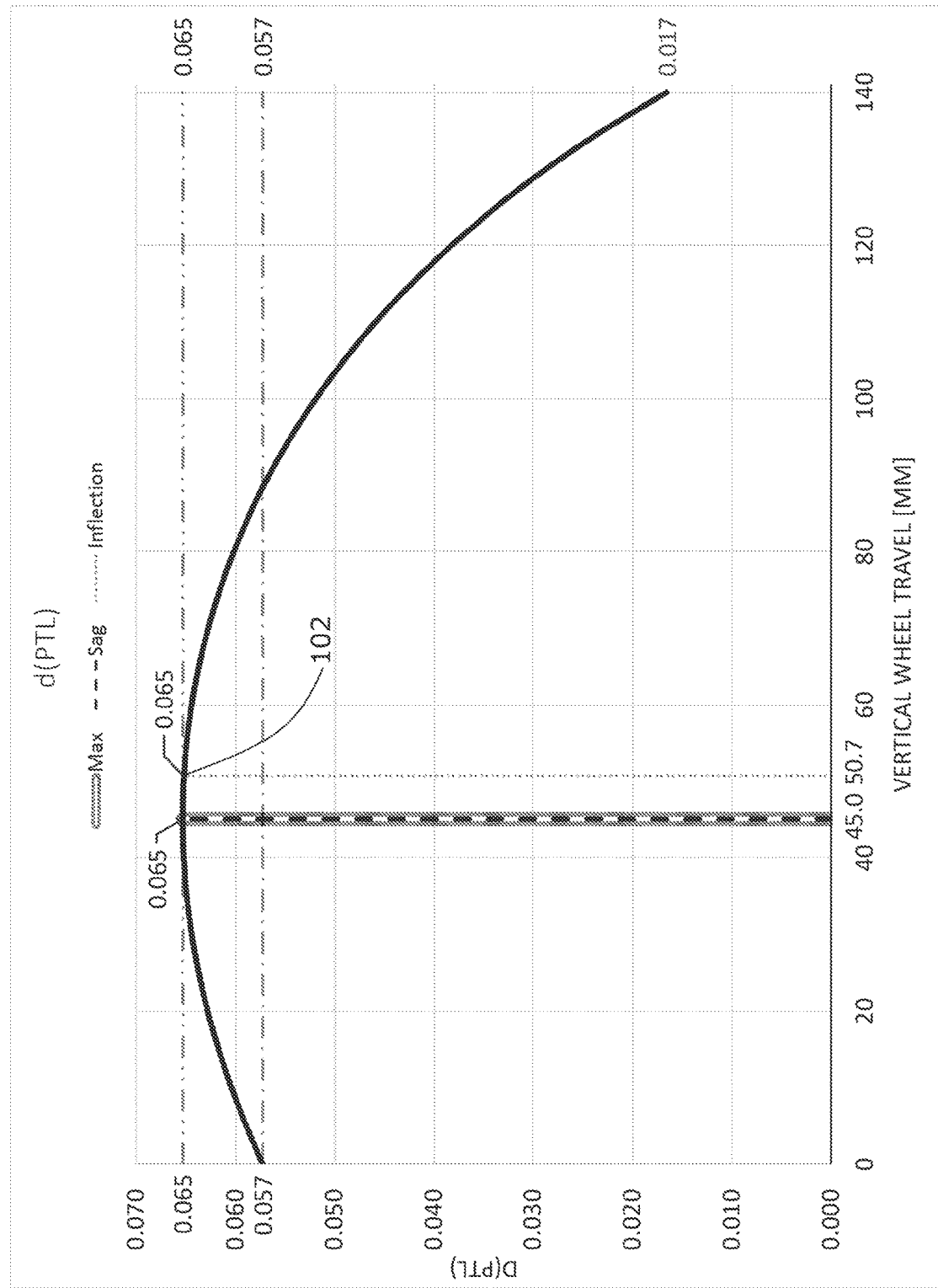
FIG. 22 is a graph depicting an expected/exemplary rate of change of the power transmitting length of the suspension linkages of FIGS. 1A, 2A, 3A, 8A, 9A, 14, and/or 18A as it relates to vertical wheel travel.

FIG. 22 shows an example of a possible dPTL curve capable of being generated with the disclosed suspension system plotted as a function of VWT. The dPTL curve has a non-linear behavior where the dPTL first increases as the VWT increases and then decreases as the VWT is increased further. In this example, at the extended state, VWT (0 mm), the dPTL may have a value of about 0.057. The dPTL increases to a max value of about 0.065 at VWT (45 mm), and then decreases to a value of 0.017 at the compressed state or VWT (140 mm). It also may be noted that the maximum dPTL is maximum at the sag point in this example. In addition, as DWAP 15 moves from the extended state to the compressed state, link body 3 initially rotates clockwise until it reaches inflection point position 102, it then reverses direction and rotates counter clockwise until the compressed state.

This behavior of increasing and decreasing dPTL may translate to similar behavior for an anti-squat, depending upon the driven and driving cog diameters. Maximizing dPTL at the sag point may translate to an anti-squat peak near sag depending upon the driven and driving cog diameters. FIG. 19 shows two possible anti-squat curves one with a small, and one with a large driven dog diameter given the dPTL plot in FIG. 22. As discussed above, the relatively smaller driven cog diameter curve increases and then decreases similar to the dPTL, while the large driven cog diameter curve decreases throughout the VWT.

The frame anti-squat component is that which would occur should the Power PT portion of the chain/belt not lengthen as the suspension moves between extended and compressed states. This is not typical, and this component is typically used to aid in the theoretical understanding of which component, (i.e., chain/belt or frame) anti-squat contributes more greatly to the anti-squat percentage. This is useful for explaining the benefits of implementing an idler 56.

In a traditional chain/belt driven two-wheeled vehicle without the use of an idler, the chain/belt anti-squat component is larger than that of the frame component. This is typically done to keep the lengthening of the PT portion of the chain/belt at low levels to reduce the amount of CCW crank arm rotation described above. This is achieved by keeping the DIVC[A] migration relatively low, and therefore resulting in a DWAP that is less rearward. As the DIVC[A] migration is raised, the frame anti-squat typically increases, the chain/belt anti-squat typically increases and the DWAP becomes more rearward. The lengthening of the PT portion of the chain/belt also increases keeping the driven and driving cogs constant.

An idler 56 may be introduced to achieve the optimum anti-squat and magnitude of the lengthening of the PT portion of the chain/belt while simultaneously tuning the rearward magnitude of the DWAP. The suspension linkages of the present disclosure allow even further variable independence of anti-squat, anti-rise, dPTL, and/or leverage rate compared to existing designs. For example, the 15 IVCs that can be manipulated vs the 6 IVCs with a traditional 4-bar system. In addition, within the 6-bar layout, relationships of the IVC migrations discussed allow for fine-tuning and manipulation of these dynamic performance variables to achieve specific and improved dynamic responses.

Figure 6:
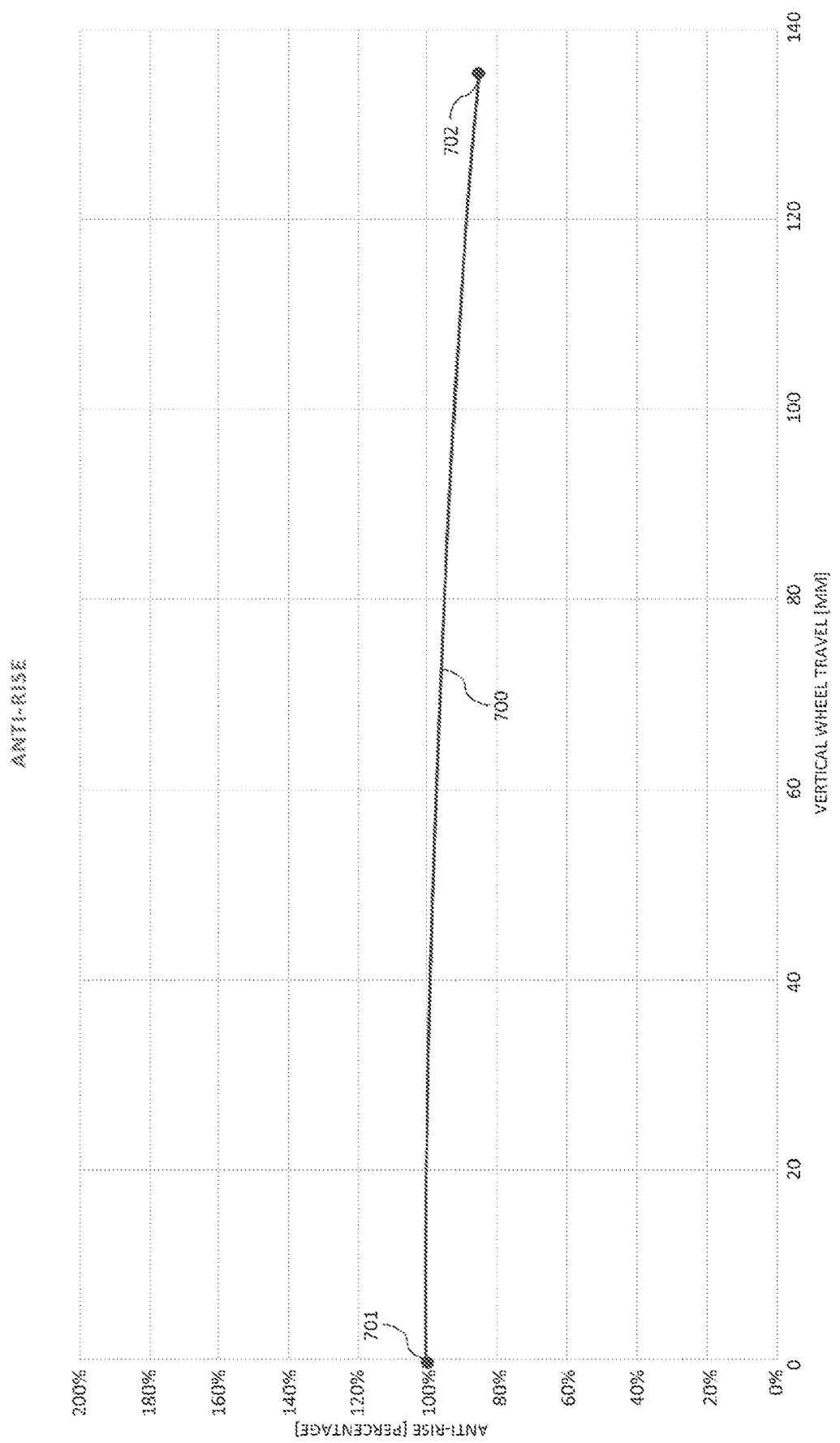
FIG. 6 is a graph of an expected/exemplary anti-rise curve of the embodiments illustrated in FIGS. 2A and 3A.

FIG. 6 shows a possible anti-rise curve 700 using this embodiment where 701 is the extended state of the suspension and 702 is the compressed state of the suspension. The anti-squat remains around 100% range which is ideal. Anti-rise less than 100% may help improve traction while anti-rise greater than 0% may help stabilize geometry during deceleration.

Figure 7:
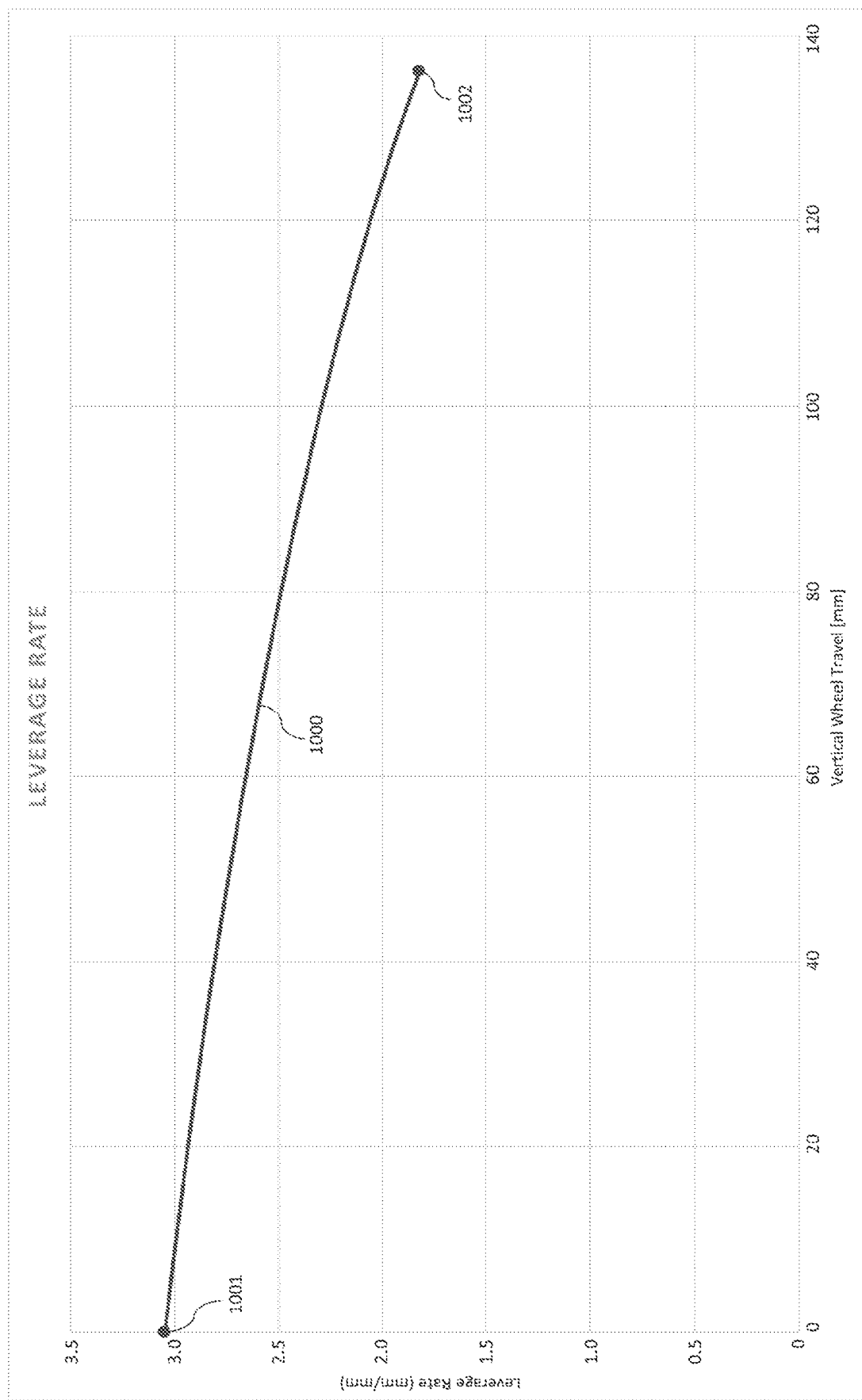
FIG. 7 is a graph of an expected/exemplary leverage rate curve of the embodiments illustrated in FIGS. 2A and 3A.

FIG. 7 shows a possible leverage rate curve 1000 using this embodiment where 901 is the extended state of the suspension and 1002 is the compressed state of the suspension. The LR falls generally linearly from 1001 to 1002. This is preferable because the higher LR in the beginning of the travel helps improve small bump sensitivity, and the lower leverage rate at the end of the travel helps prevent harsh bottom outs. In addition, the general linear trend of the LR curve provides a supported mid-stroke and the aids in shock tuning as there are no dramatic changes in the LR.

Note that anti-squat, anti-rise, leverage rate and DWAP direction are typically dependent variables in a typical 4-bar linkage or other suspension designs. As a result, the behavior of these three variables is limited with these designs. The disclosed 6-bar linkage with the addition of an idler cog 56 allows for greater separation of these variables so that each can be adjusted or optimized as discussed above to improve the ride quality.

The addition of idler cog 56 to the 6-bar linkage configuration allows for both the anti-squat and anti-rise percentages to be more finely controlled resulting in improved magnitudes, while simultaneously manipulating the rearward direction of the DWAP.

FIGS. 8A-8H illustrate an example of an electric bicycle, or e-bike frame including the idler 56 as described with respect to the suspension linkage of FIGS. 2A-2H. As used herein, an e-bike means any two-wheeled vehicle powered at least in part by a motive power source. For example in the embodiment shown in FIGS. 8A-8H, the idler cog 56 axis 75 is coincident with the PIVC[1][3] 7. The suspension linkage and idler cog 56 of FIGS. 8A-8H may be substantially similar to those of FIGS. 2A-2H, applied to an e-bike frame. Further description of the suspension linkage of FIGS. 8A-8H is therefore omitted for brevity. An advantage of using an idler cog 56 with an e-bike may be that such an e-bike may resemble a pedal bike, which may have marketing appeal. Without an idler cog 56, an e-bike may look very different than a pedal bike due to packaging constraints of an e-bike. Such a different bike may be disfavored by buyers.

Figure 8A:
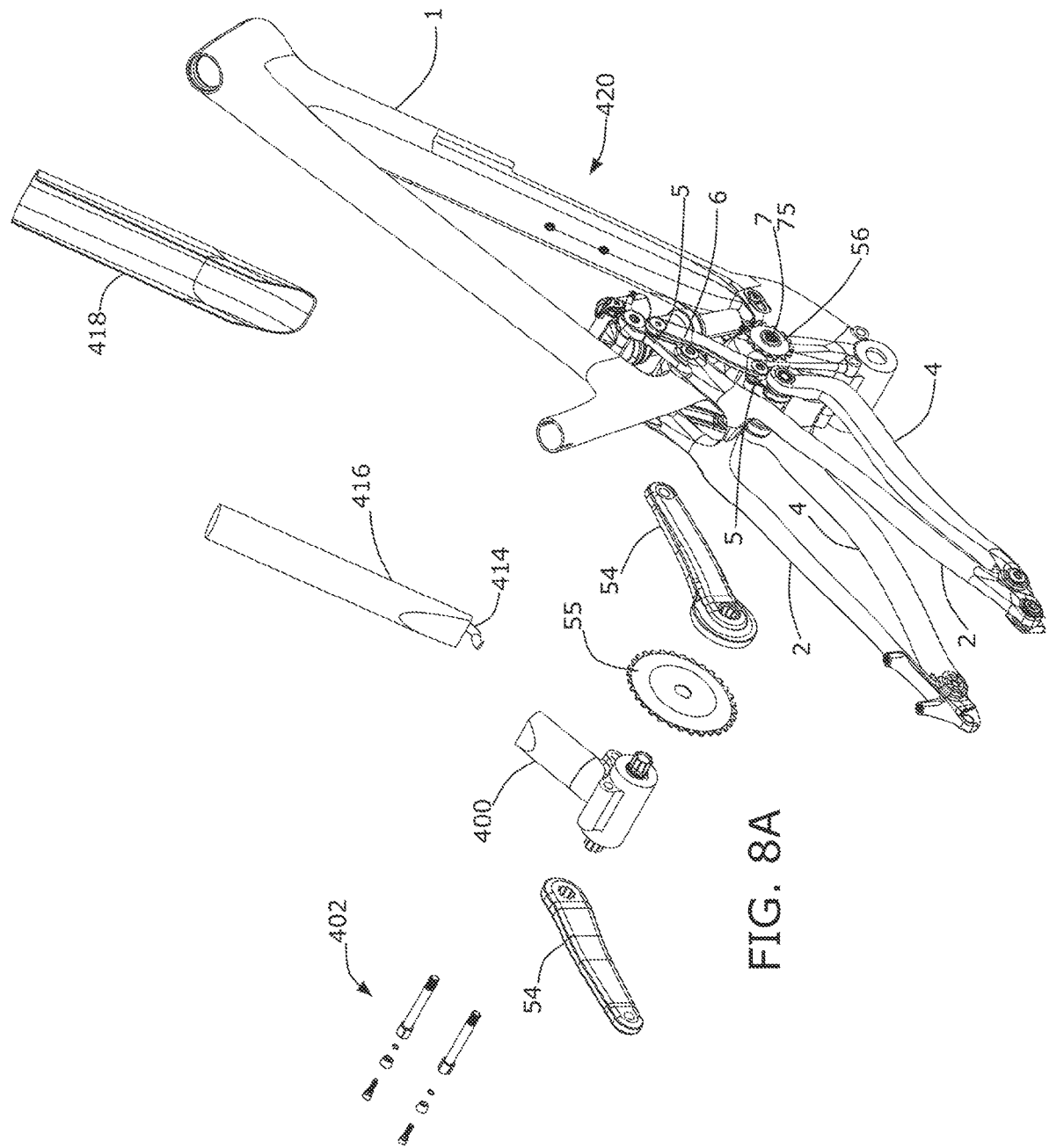
FIG. 8A is an exploded isometric view of a 6-bar suspension linkage for an electric bike.
Figure 8B:
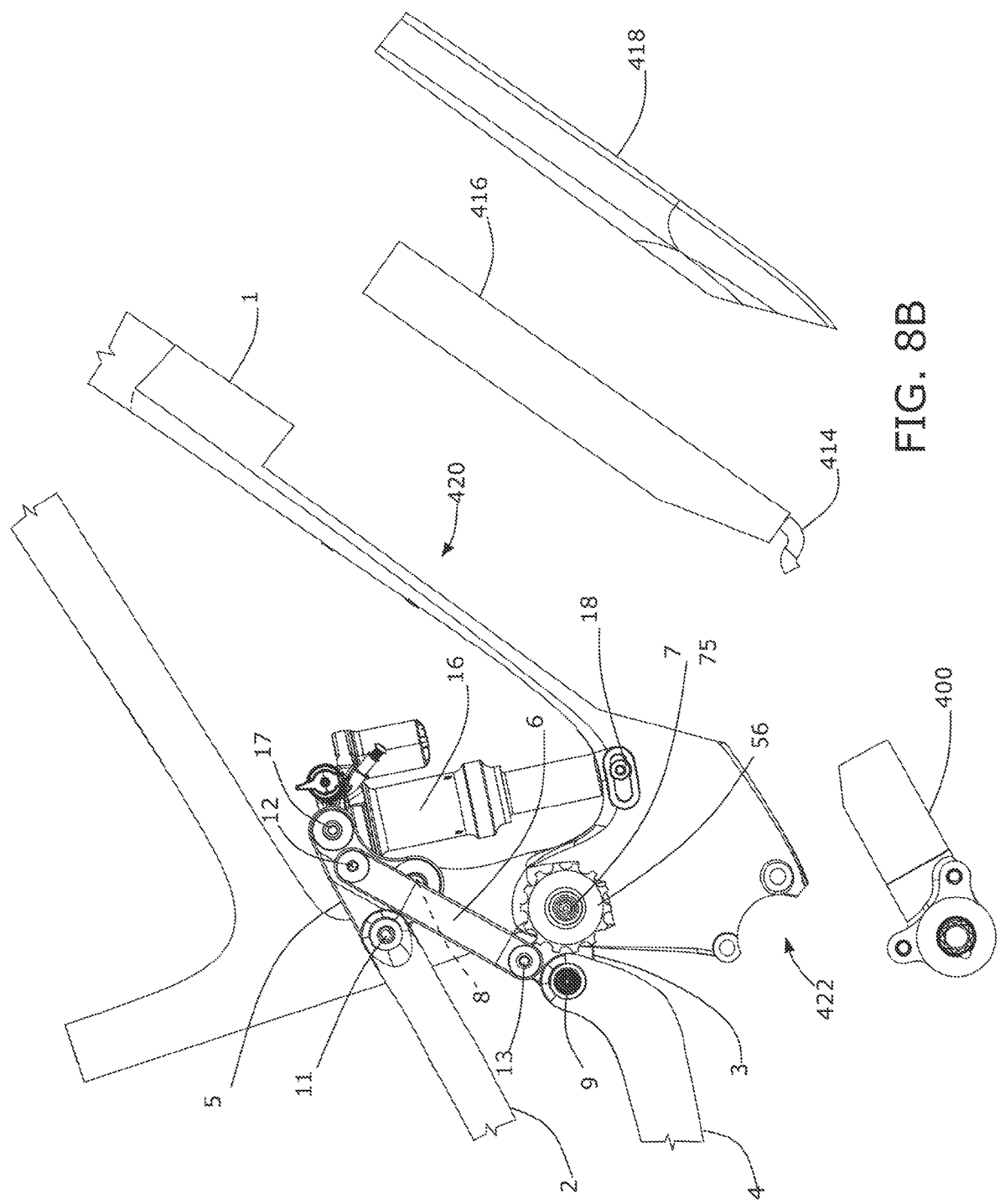
FIG. 8B is a partial exploded elevation view of the suspension linkage of FIG. 8A.
Figure 8C:
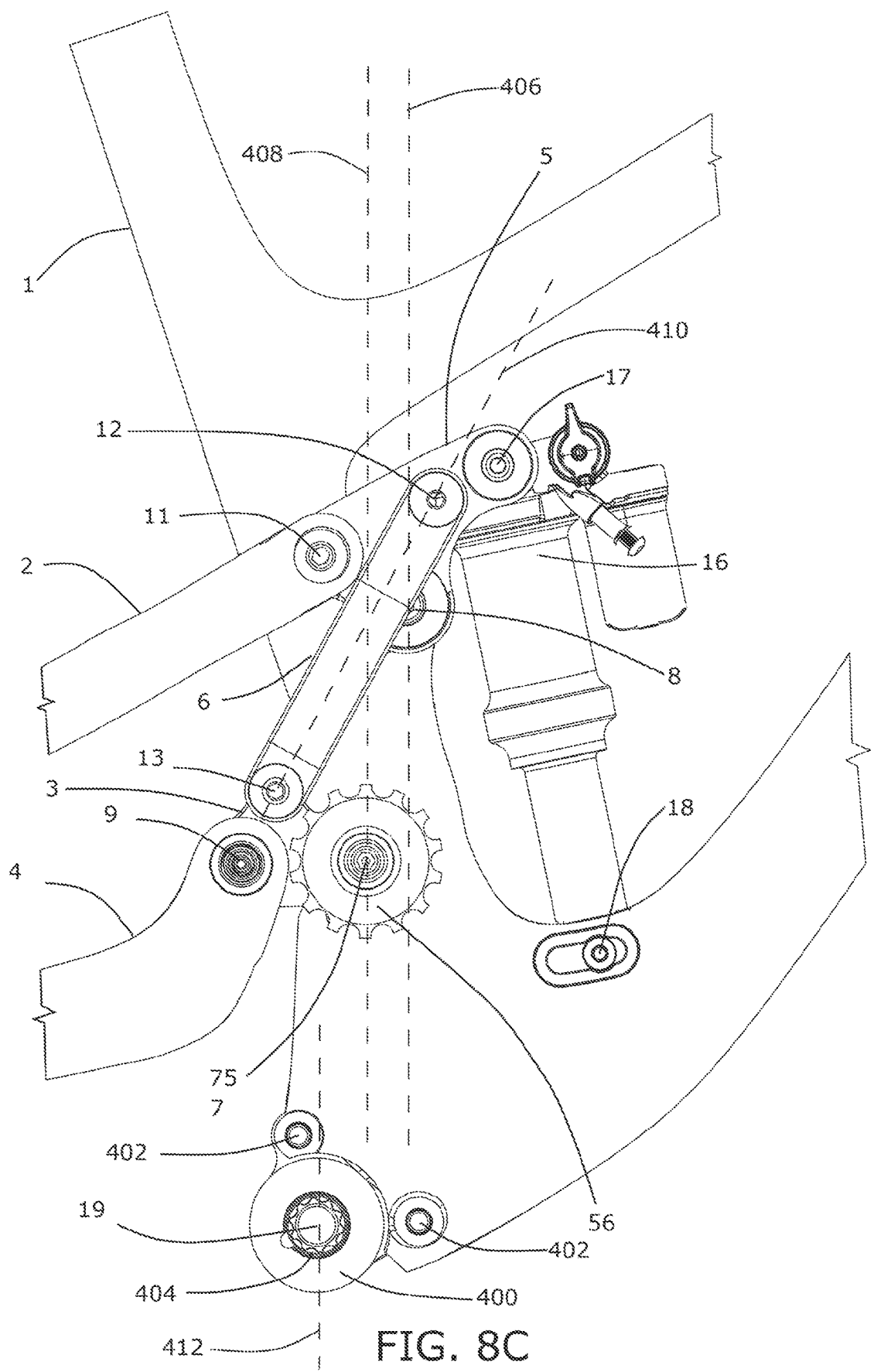
FIG. 8C is a partial right elevation view of the suspension linkage of FIG. 8A.
Figure 8E:
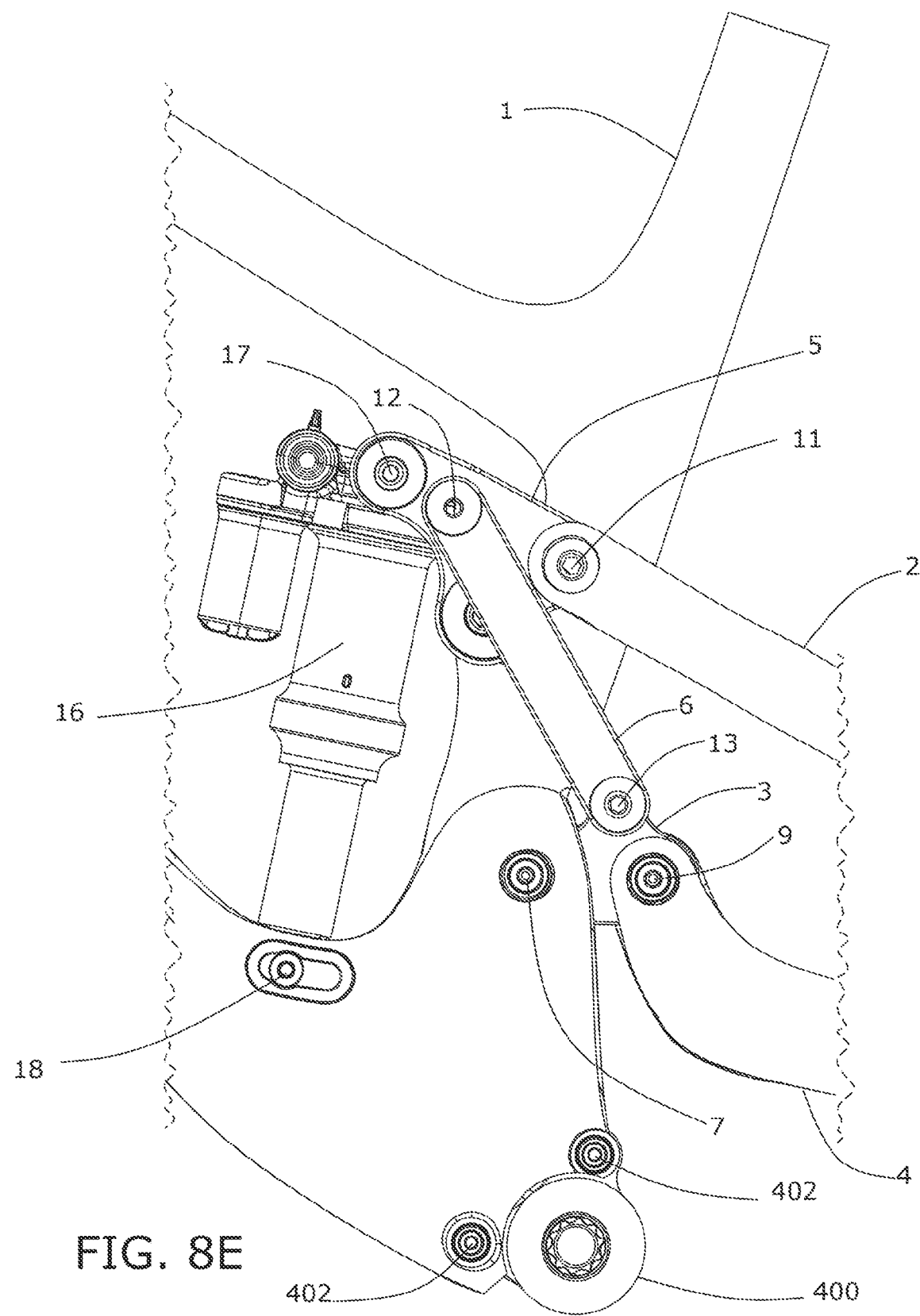
FIG. 8E is a partial left elevation view of the suspension linkage of FIG. 8A.

As best shown in FIGS. 8A, 8B and 8D, the suspended body 1 of FIG. 8A includes a motive power source compartment 422 adapted to receive a motive power source 400. A motive power source 400 may be such as an electric motor powered by an on-board power source such as a battery. In other examples, a motive power source 400 may be an engine such as an internal combustion engine, or a combination of an engine and a motor, or a combination of one or more of these with a transmission. In some examples, a gearbox may be coupled to the suspended body-1 and may be used with any idler disclosed herein. The motive power source 400 may be coupled to the suspended body-1 with one or more mounts 402. An e-bike may also include a crank 54 and pedals to enable the e-bike to be powered at least in part by a rider's legs. For example, as shown in FIG. 8C, the motive power source 400 may include a crank interface 404 to allow a crank and/or driving cog 55 to couple to the motive power source 400. The motive power source 400 and/or the rider's legs, via the cranks, may power the two-wheeled vehicle. The crank interface may be any suitable interface that can transmit torque between the motive power source 400 and a crank 54. For example, the crank interface 404 may be a shaft with a spline, flat, key, threaded aperture, or other suitable structure to receive a crank 54.

The suspended body-1 may include an energy storage compartment 420 adapted to receive an energy storage module 416, such as a battery. In the embodiment shown, the energy storage compartment 420 is formed in the downtube of the suspended body 1. In other embodiments, one or more energy storage compartments 420 may be formed in other portions of the suspended body 1 such as the seat tube or a top tube. The energy storage compartment 420 may be selectively closed by a panel 418, for example to enable removal of the energy storage module 416 from the energy storage compartment 420 such as for charging, replacement, and/or removal to reduce weight of the vehicle if the e-bike is to be used in a pedal-only mode, or the like. The panel 418 may be formed of a thin shell including one or more attachment mechanisms suitable to selectively couple the panel 418 to the suspended body 1 to seal the energy storage compartment 420. The panel 418 may help prevent the ingress of dirt, water, mud, dust or other contaminants into the energy storage compartment 420. The panel 418 may contain the energy storage module 416 within the energy storage compartment 420.

The energy storage module 416 may be any suitable device that can store and/or convert energy into electrical energy for use by the motive power source 400. For example, the energy storage module 416 may be a primary (e.g., single use) or secondary (e.g., rechargeable) battery. Any suitable battery technology may be used. In many implementations, the energy storage module 416 is a rechargeable battery using a technology such as lithium ion, nickel metal hydride, nickel cadmium, lead acid, or other rechargeable batteries. In some implementations, the energy storage module 416 is a single use battery, such as an alkaline battery.

The energy storage module 416 is in electrical communication with the motive power source 400 via an electrical conduit 414. The electrical conduit 414 may provide electrical power to the motive power source 400. In some implementations where the motive power source 400 also generates power (e.g., regenerative braking), the energy storage module 416 may receive power from the motive power source 400 via the electrical conduit 414.

Figure 8F:
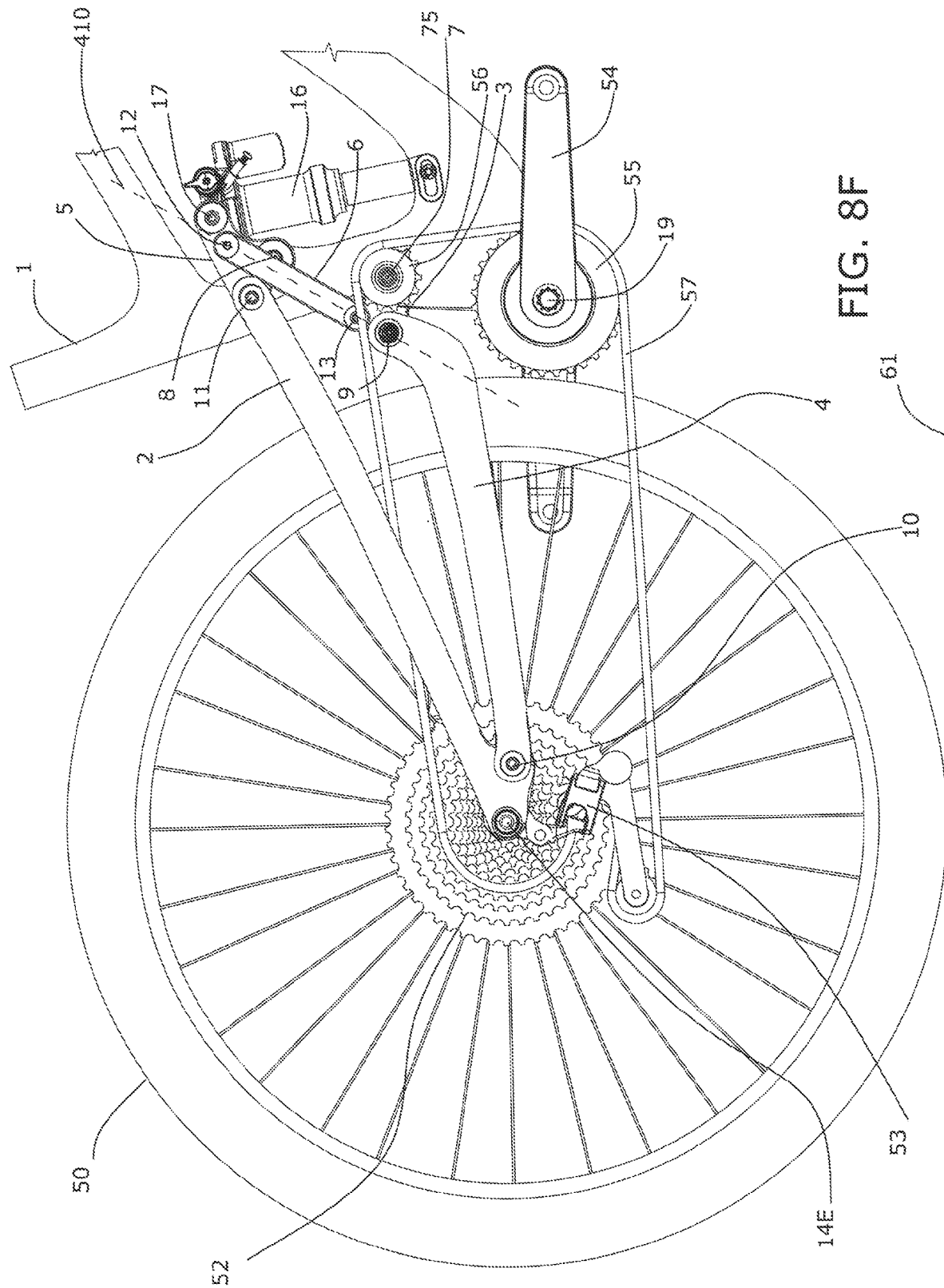
FIG. 8F is a partial right elevation view of the suspension linkage of FIG. 8A in an extended state.
Figure 8G:
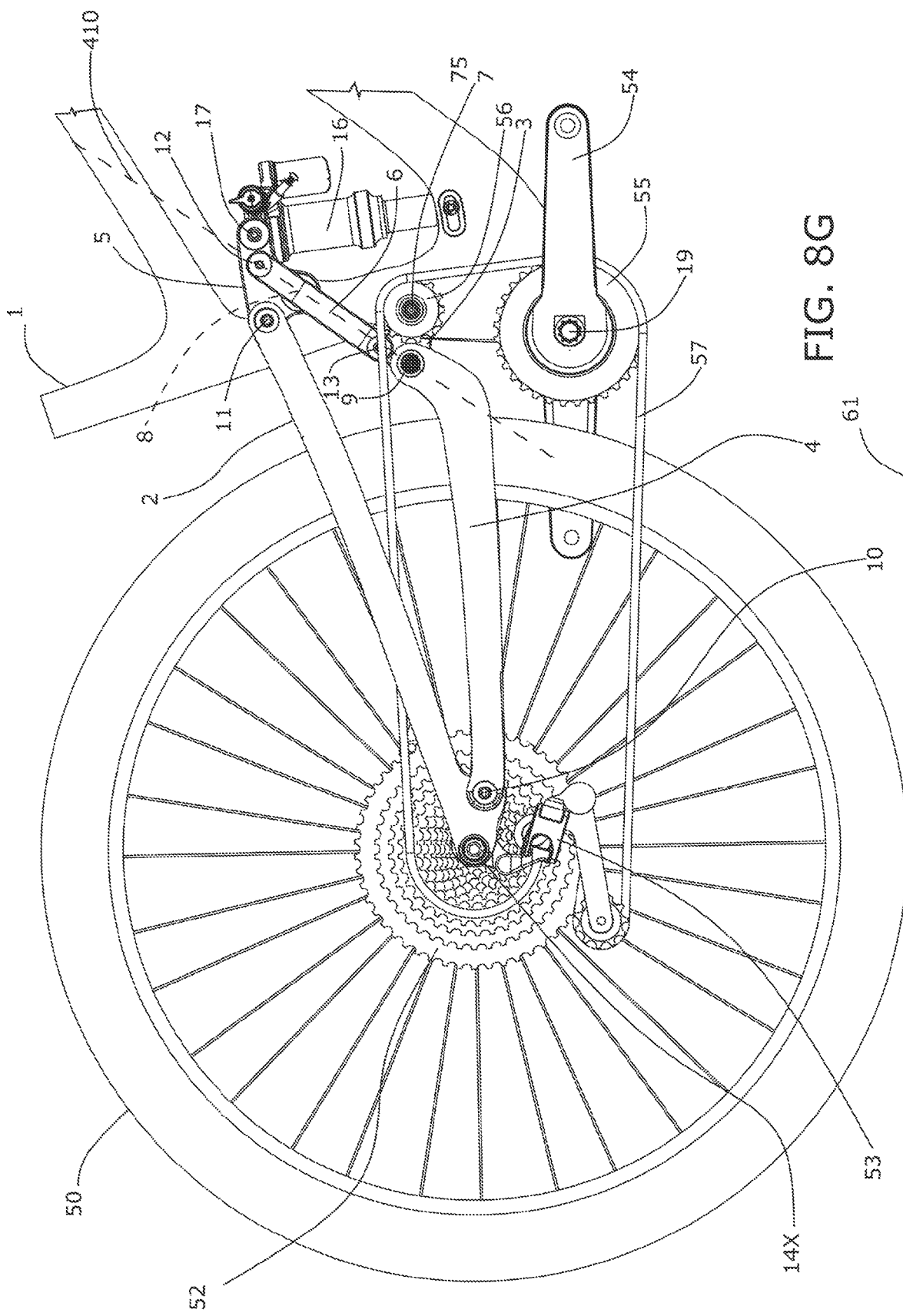
FIG. 8G is a partial right elevation view of the suspension linkage of FIG. 8A at an intermediate state between an extended and compressed state.
Figure 8H:
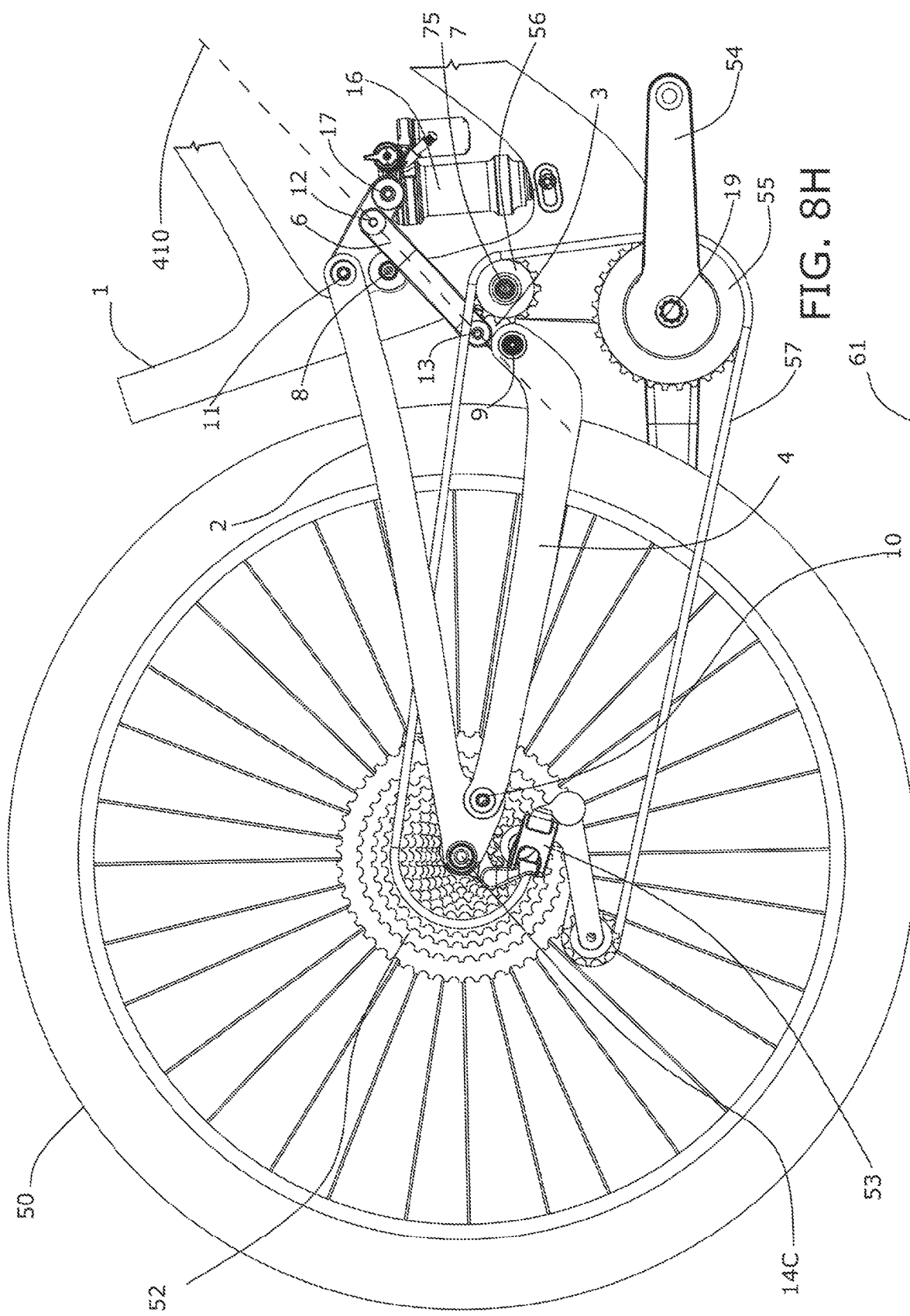
FIG. 8H is a partial right elevation view of the suspension linkage of FIG. 8A in a compressed state.
Figure 8I:
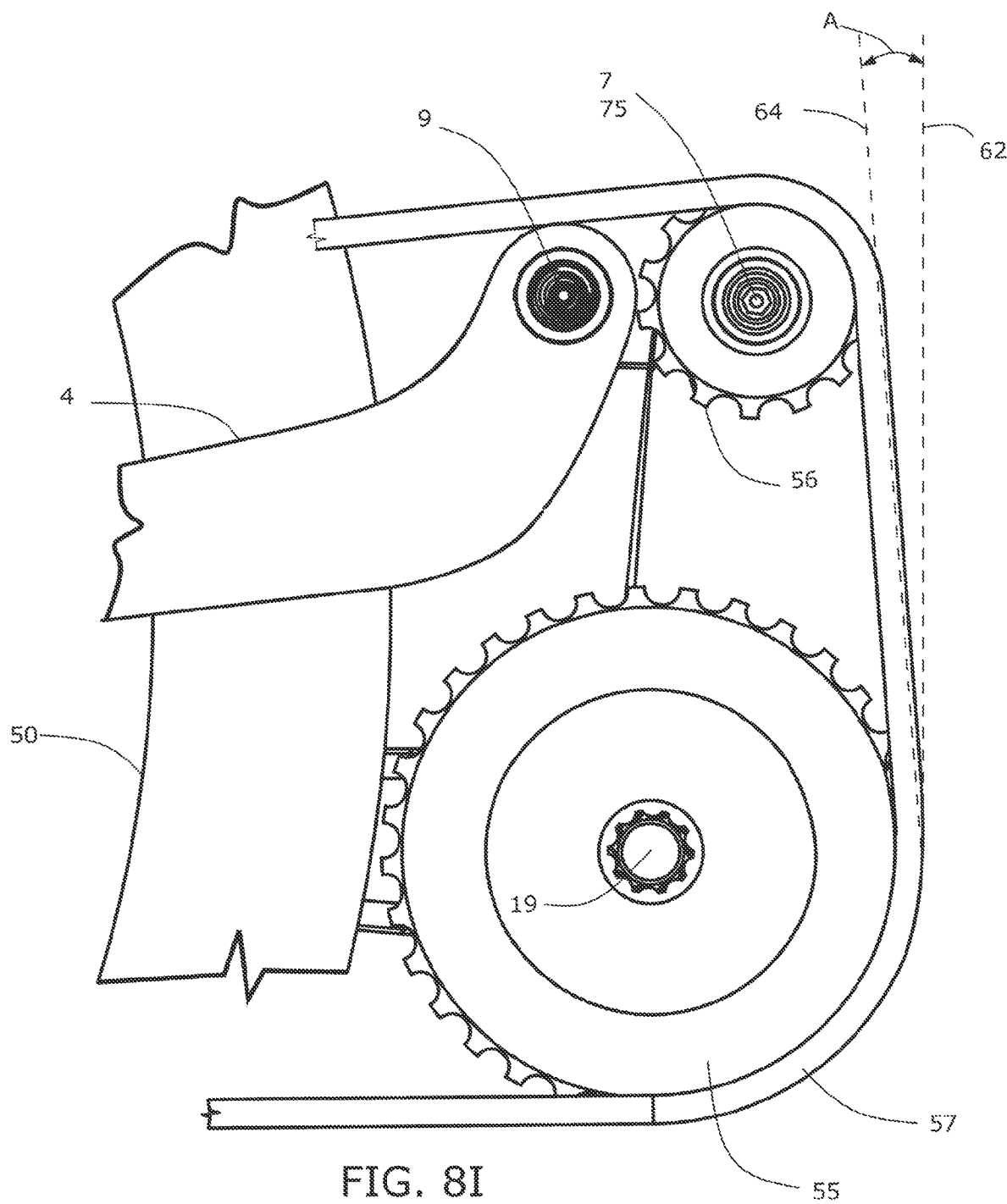
FIG. 8I is a partial right elevation view of the suspension linkage of FIG. 8A showing a contact angle of the belt/chain to the driving cog.
Figure 9A:
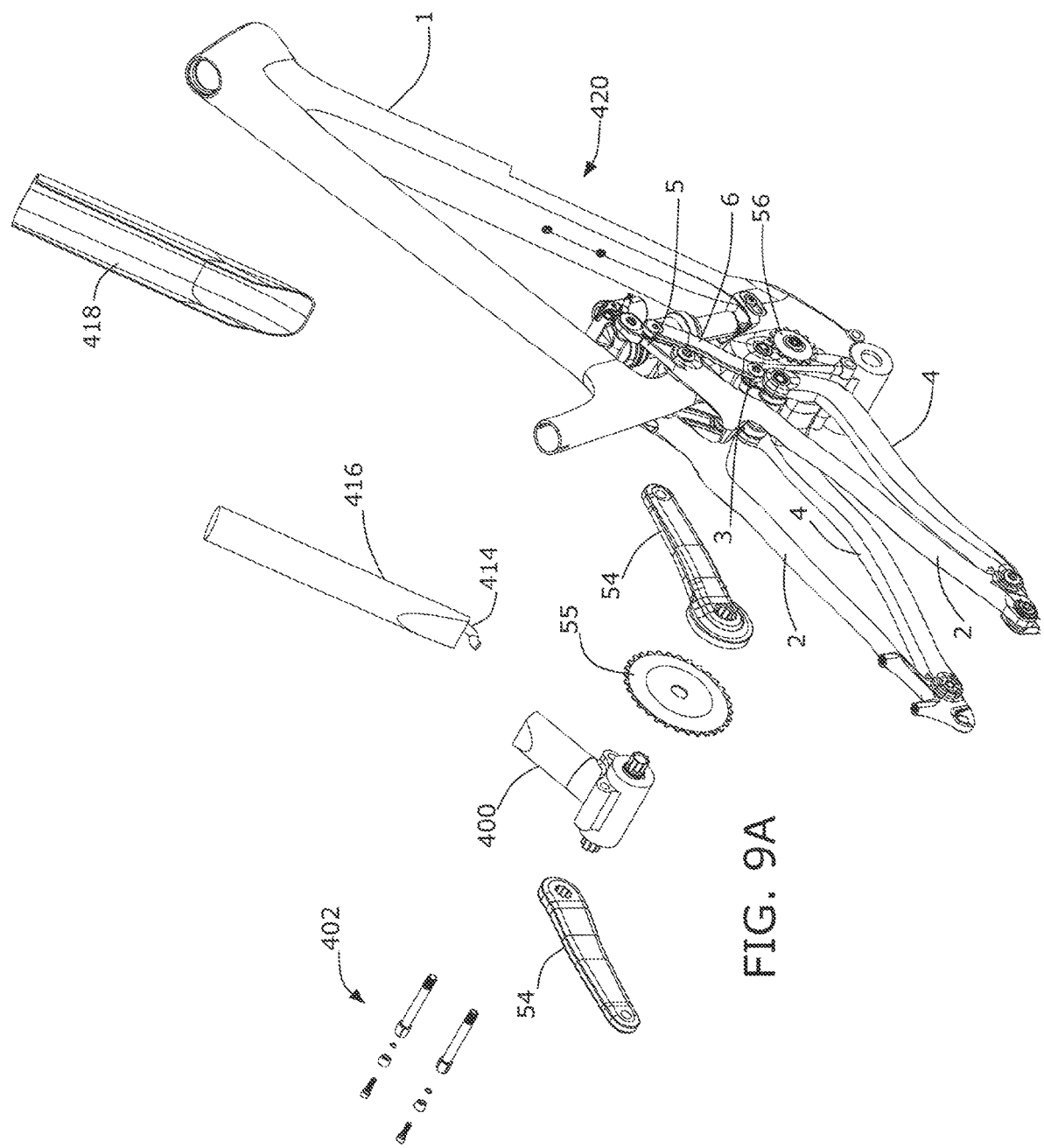
FIG. 9A is an exploded isometric view of a 6-bar suspension linkage for an electric bike.
Figure 9B:
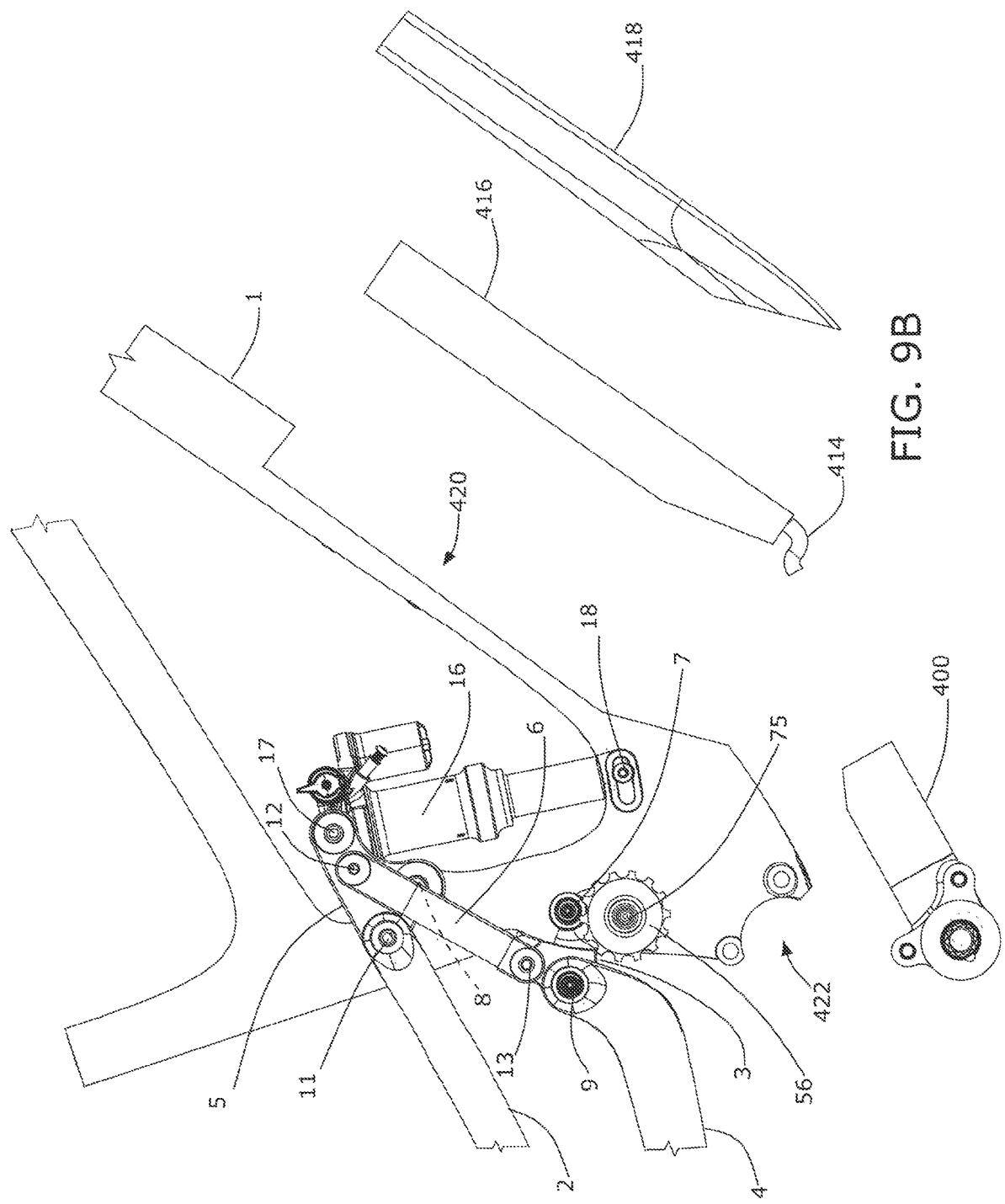
FIG. 9B is a partial exploded elevation view of the suspension linkage of FIG. 9A.
Figure 9C:
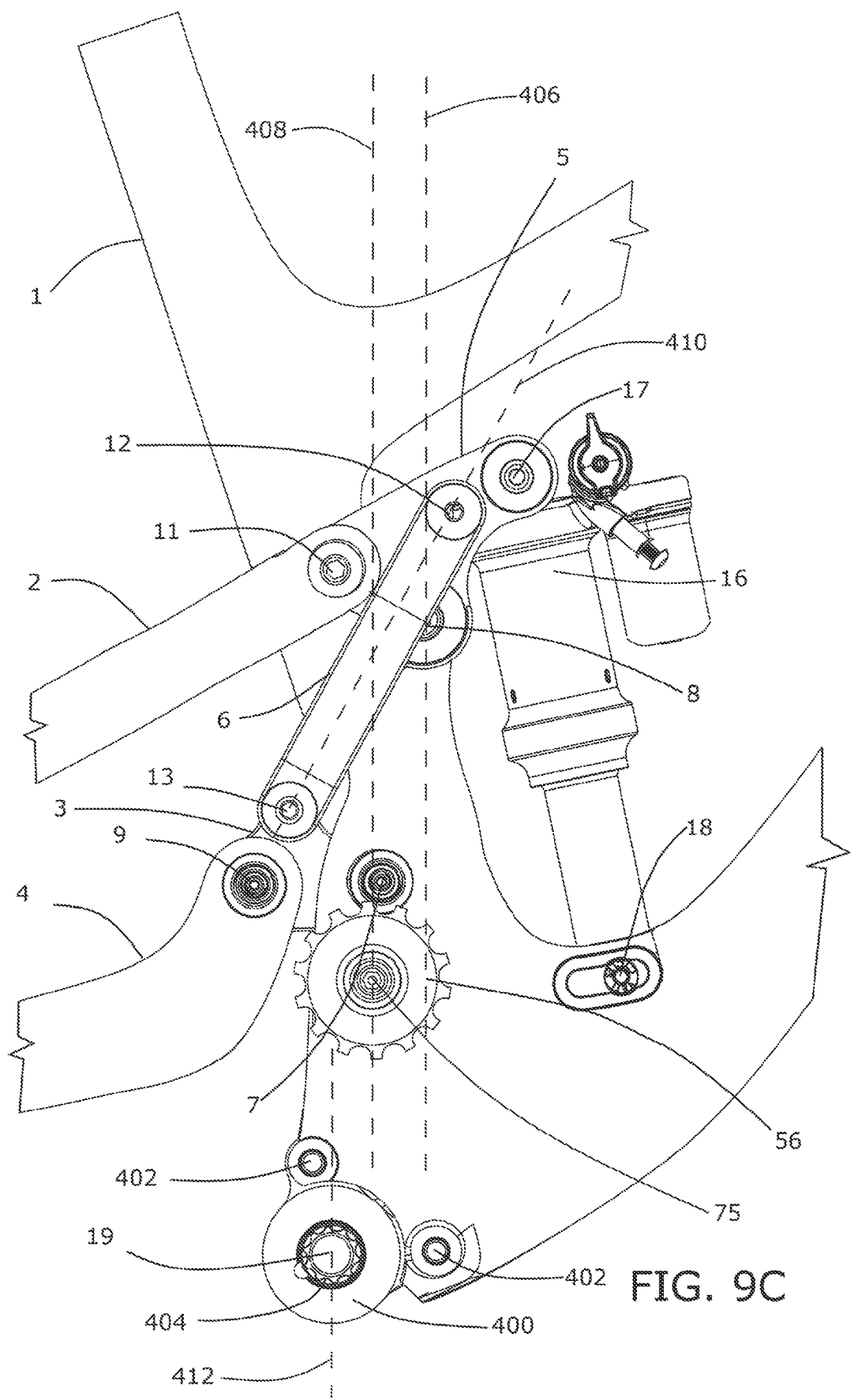
FIG. 9C is a partial right elevation view of the suspension linkage of FIG. 9A.
Figure 9D:
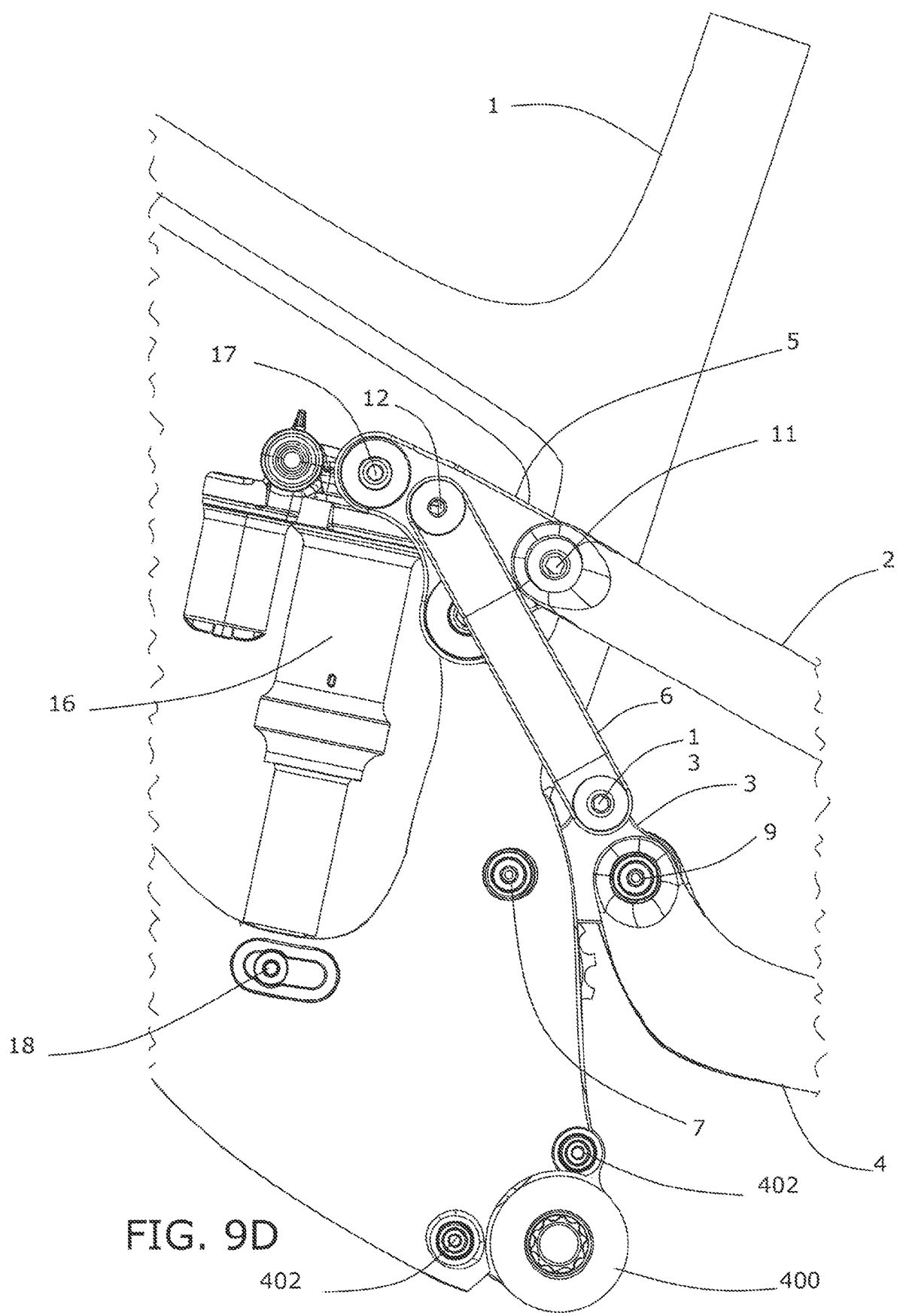
FIG. 9D is a partial left elevation view of the suspension linkage of FIG. 9A.
Figure 9E:
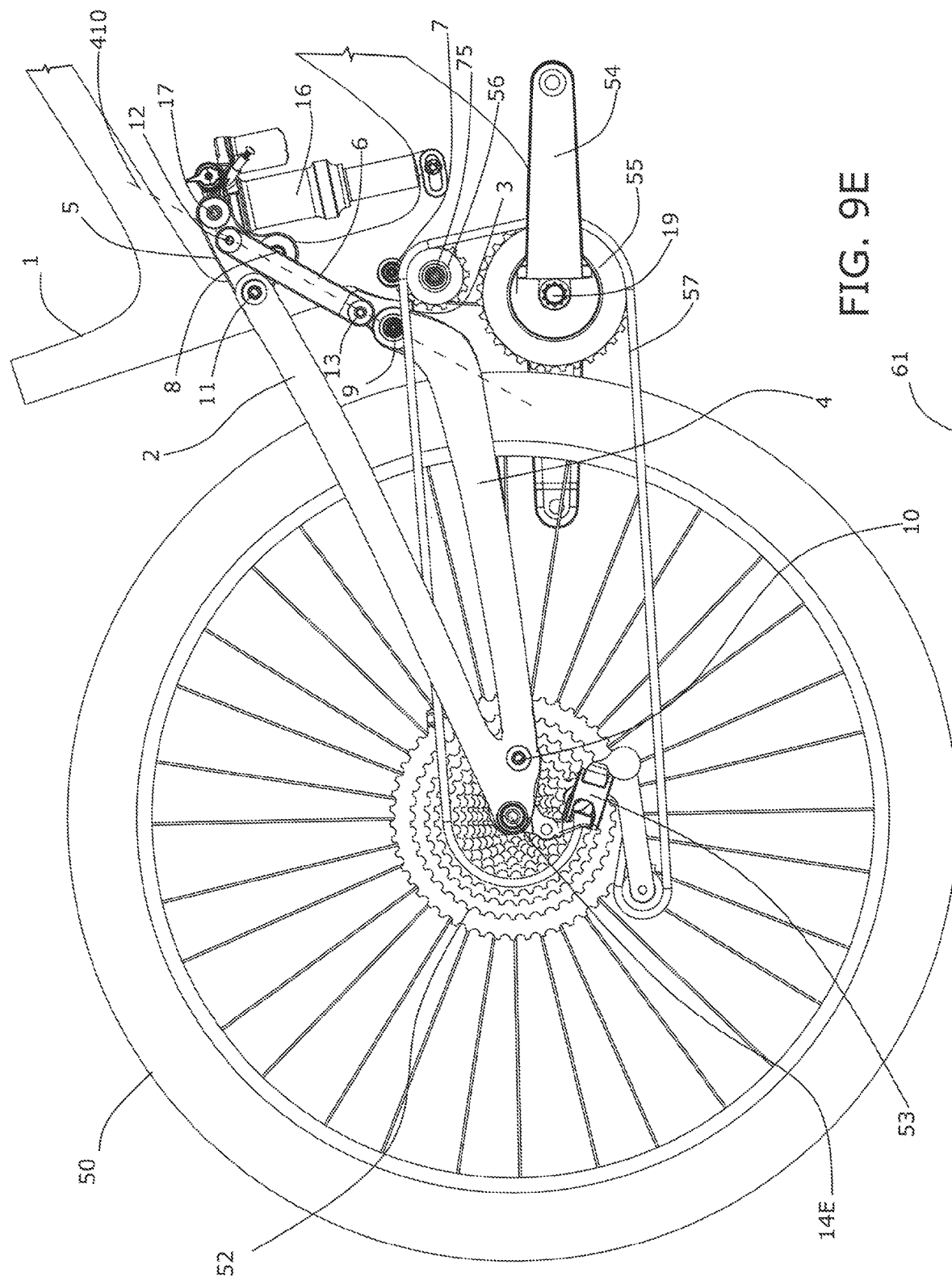
FIG. 9E is a partial right elevation view of the suspension linkage of FIG. 9A in an extended state.
Figure 9F:
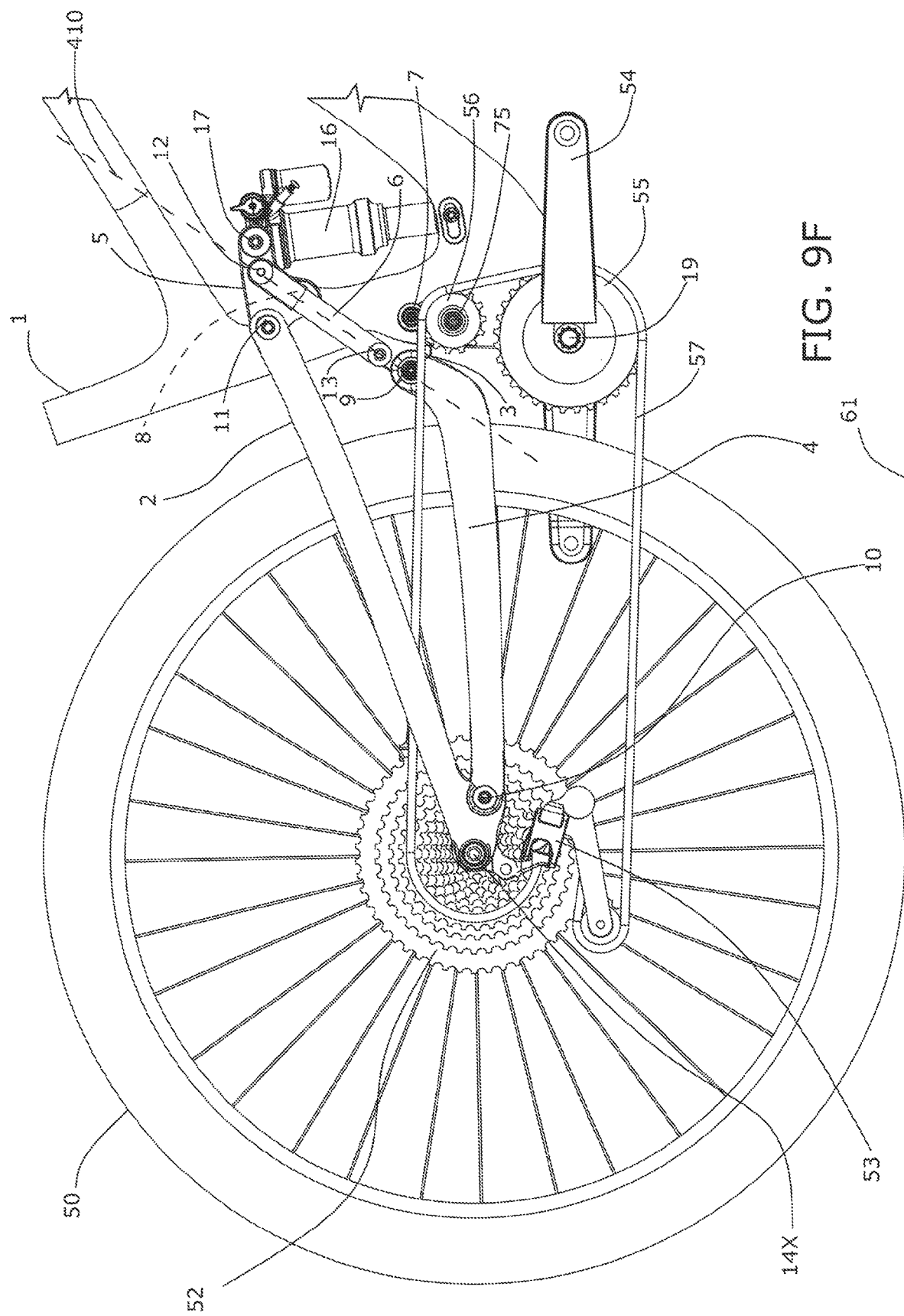
FIG. 9F is a partial right elevation view of the suspension linkage of FIG. 9A at an intermediate state between an extended and compressed state.
Figure 9G:
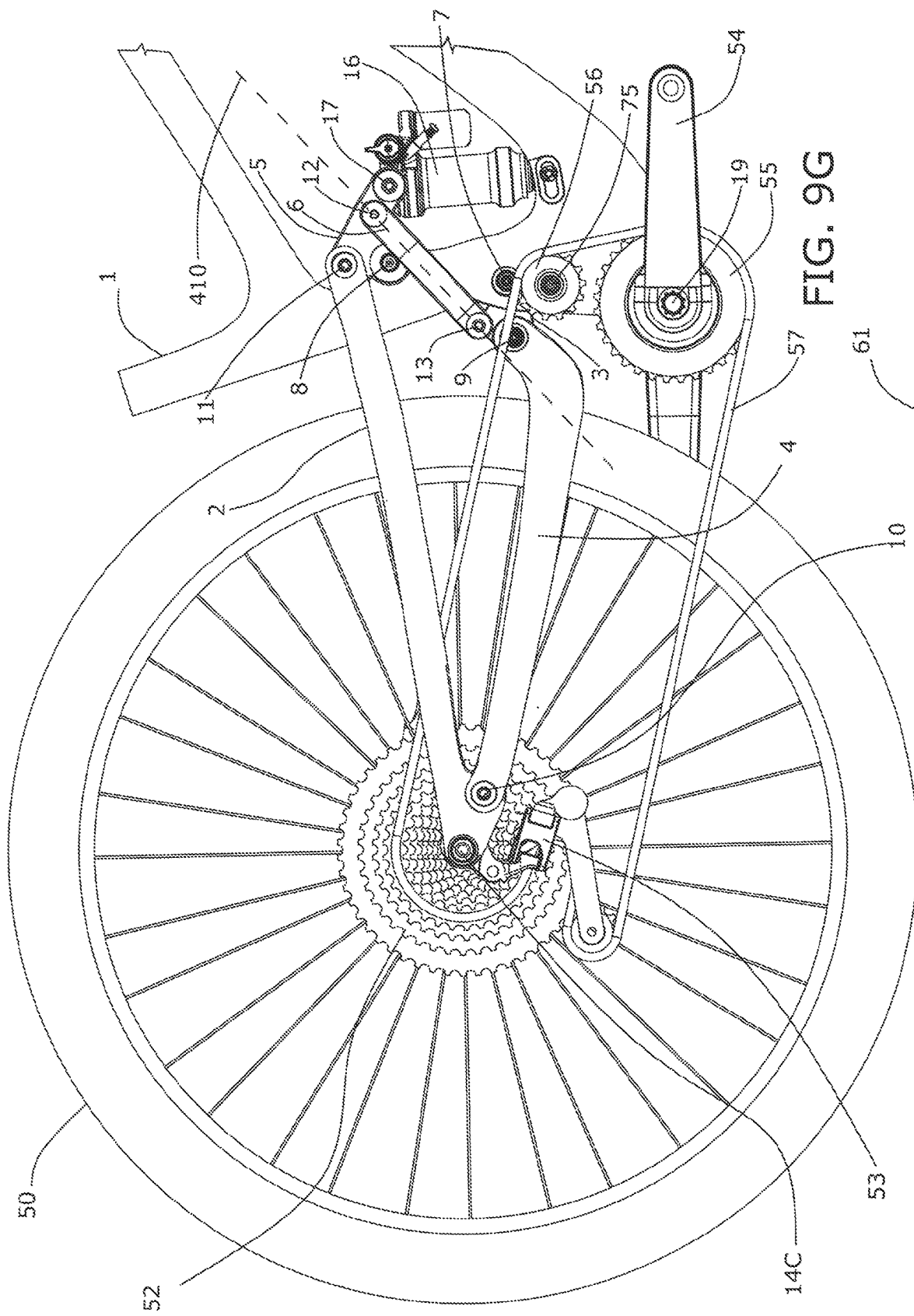
FIG. 9G is a partial right elevation view of the suspension linkage of FIG. 9A in a compressed state.
Figure 10:
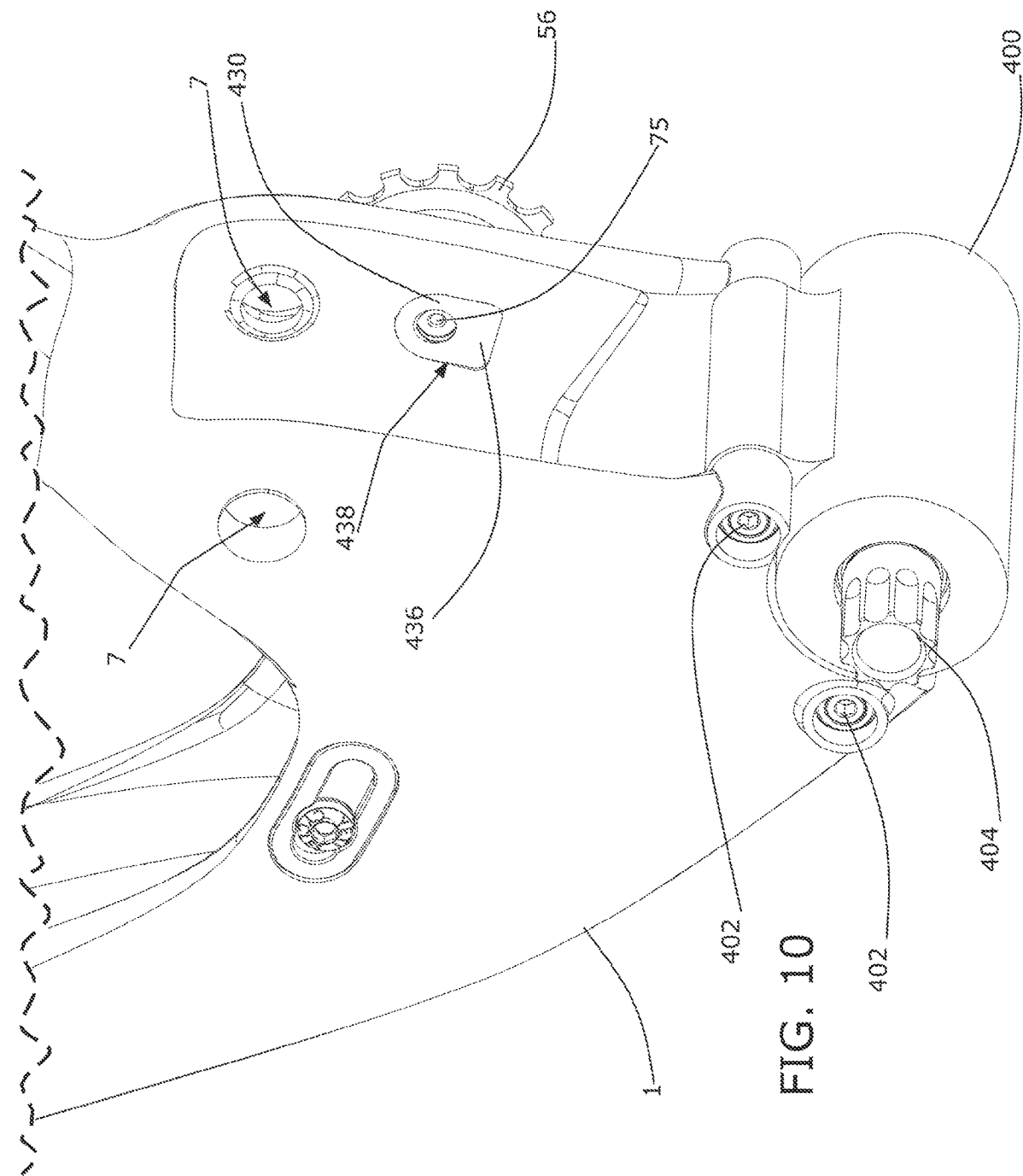
FIG. 10 is a partial isometric view of an embodiment of a suspension linkage.
Figure 11:
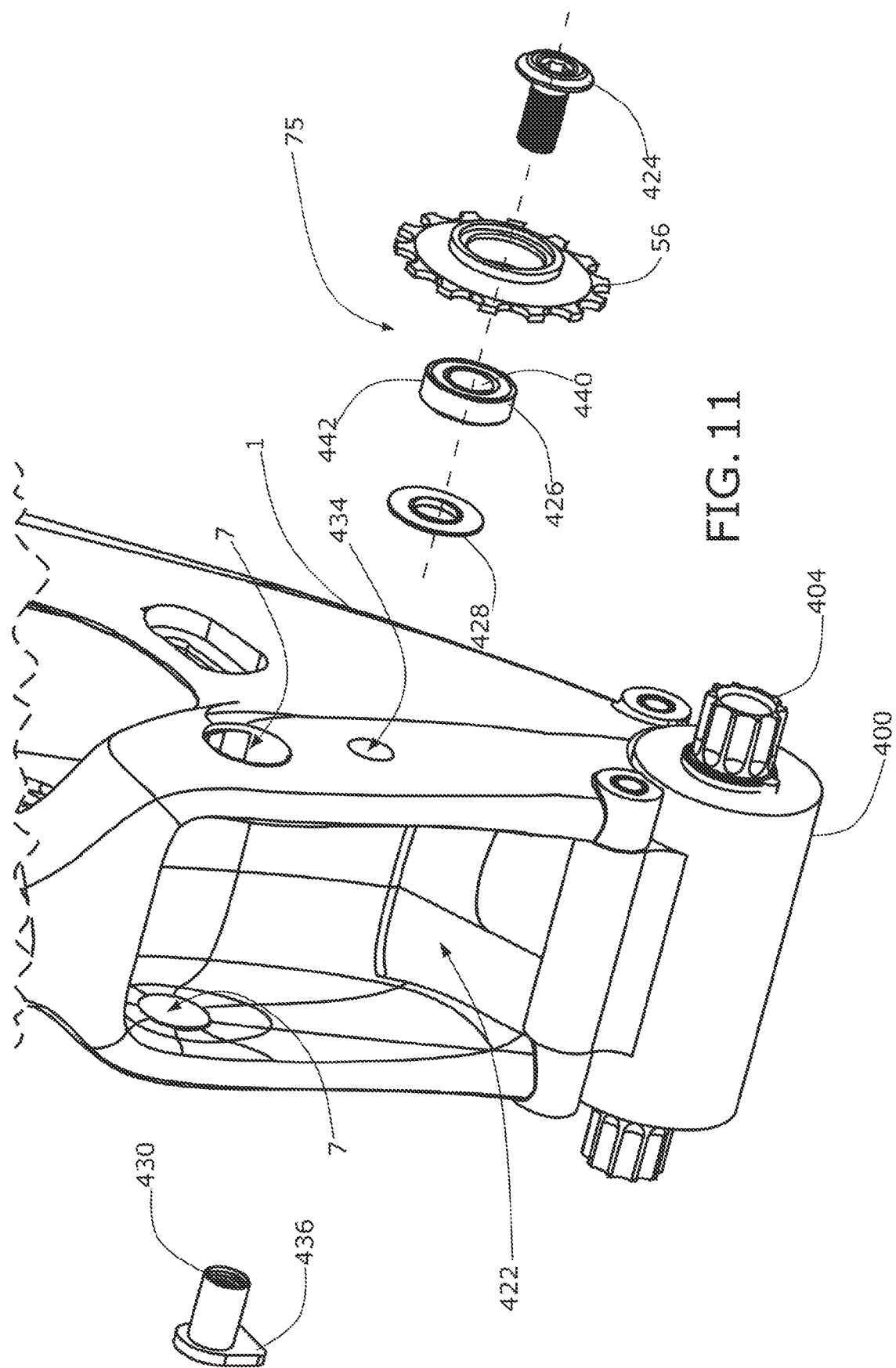
FIG. 11 is a partial exploded isometric view of the suspension linkage of FIG. 10.
Figure 12:
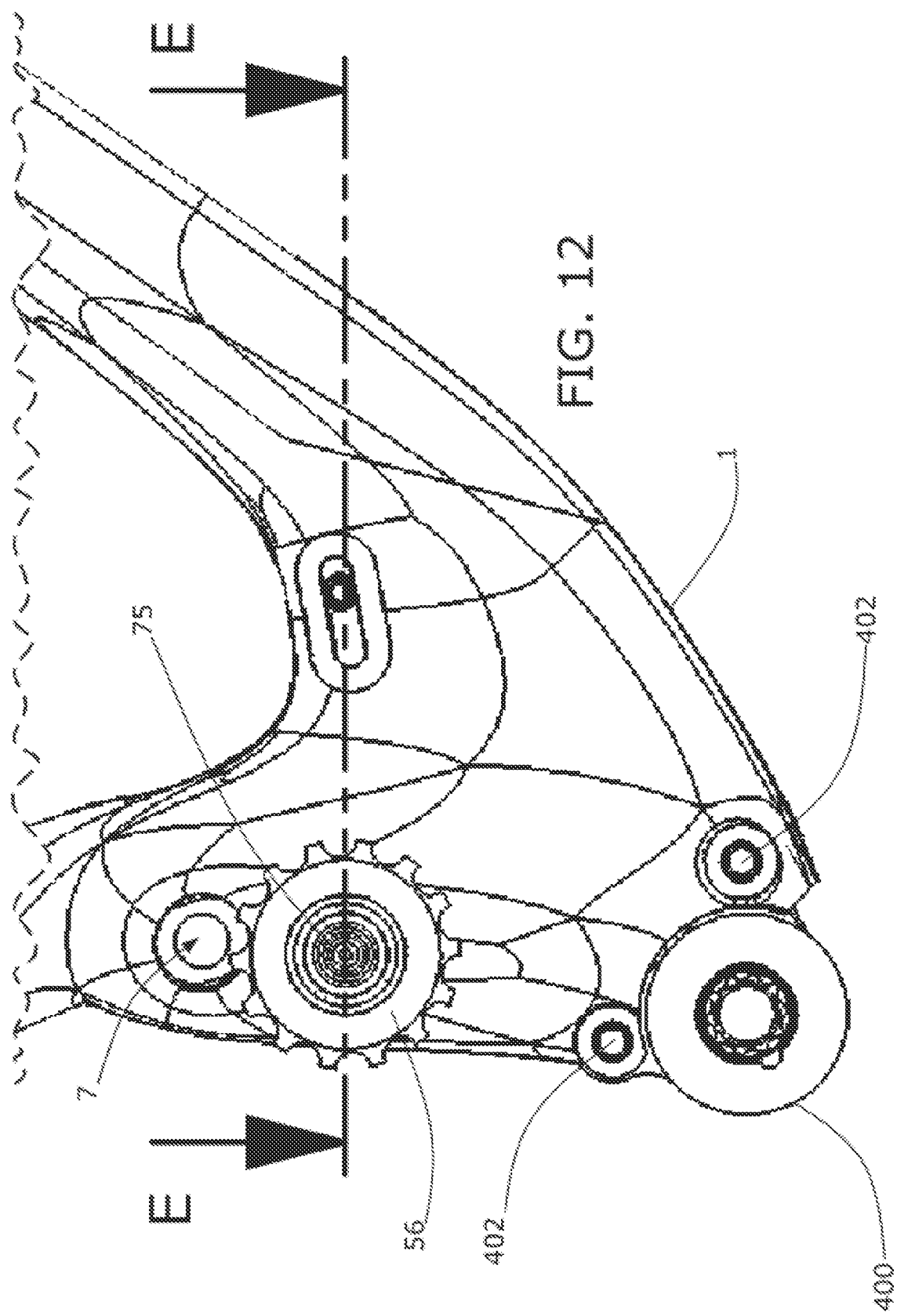
FIG. 12 is a partial elevation view of the suspension linkage of FIG. 10.
Figure 13:
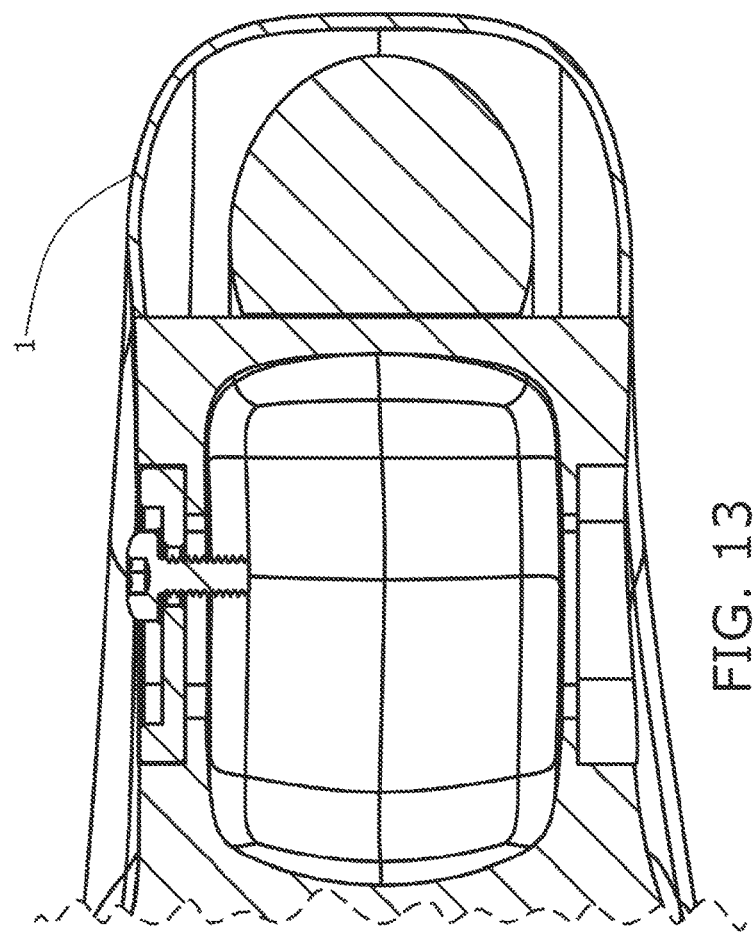
FIG. 13 is a partial section view of the suspension linkage of FIG. 10 taken along section line E-E of FIG. 12.
Figure 13:
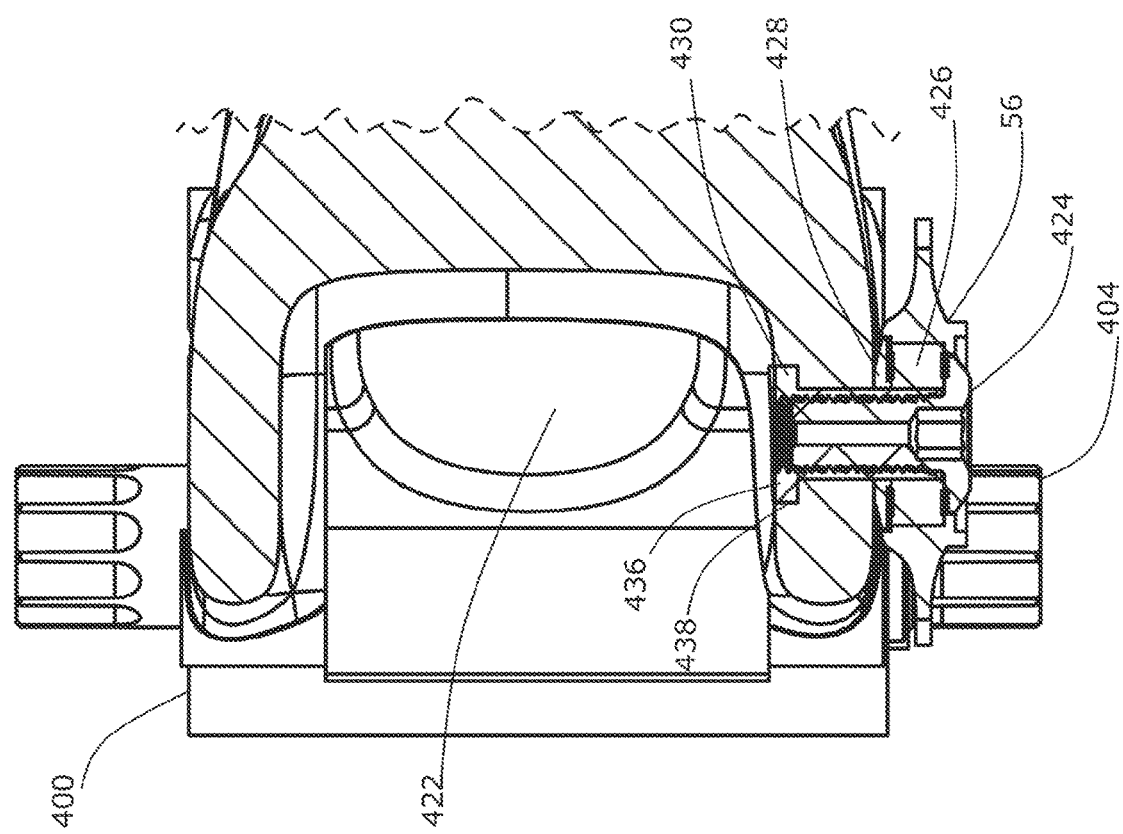

As shown best in FIG. 8C, the driving cog 55 axis 19 may define a driving cog axis plane 412. The driving cog axis plane 412 may extend vertically through the driving cog axis 19. An IVC plane may extend vertically through any of the IVCs disclosed herein, such as an IVC plane 406 that extends vertically through the IVC[1][5] 8. Similarly, an IVC plane 408 may extend vertically through the IVC[1][3] 7. The IVC plane 408 may also extend through the idler cog 56 axis 75, such as in the embodiment shown in FIG. 8C where the idler cog 56 axis 75 is coincident with the IVC[1][3] 7. In many embodiments, the IVC plane 406 may be disposed forward of the IVC plane 408. In many embodiments, the IVC plane 408 may be disposed close to the driving cog axis plane 412. Disposing the IVC plane 408 close to the driving cog axis plane 412 may have the advantage of enabling a larger contact angle of the chain/belt 57 with the idler 56 than an arrangement where the planes 412 and 408 are relatively farther from one another, such as when the IVC plane 408 is disposed forward of the plane 412. See, e.g., FIG. 8I showing a contact angle A of the chain/belt 57 relative to the driving cog 55 and the idler 56. The contact angle A is formed between a forward vertical tangent 62 of the driving cog 55 and line 64 that is tangent to both the driving cog and the idler. As the IVC plane 408 is moved closer to the driving cog axis plane 412, the contact angle A increases. Typically the contact angle A is greater than zero degrees. Larger contact angles A of the chain/belt 57 with the idler 56 may increase the efficiency of the energy transmission around the idler, decrease wear, decrease the likelihood of the chain/belt 57 coming loose or slipping off the driving cog 55 and/or idler 56, and/or decrease stress on the idler 56 and/or chain/belt 57. In general there is a balance between weight and efficiency with the diameter or tooth count of the idler 56. A greater diameter or tooth count can better retain the chain/belt 57 with a greater chain/tooth interface. Generally the larger the diameter of the idler (i.e., greater tooth count), the lower the anti-squat of the suspension linkage and vice versa. A greater diameter or tooth count improves power transmission efficiency due to the relative chain/belt 57 angle reduction. Generally, the larger the idler 56, the heavier and the more difficult it is to package. Thus, disposing the IVC plane 408 forward of the driving cog axis plane 412 may improve idler cog 56 efficiency without the necessity of adding a larger, heavier idler. In some embodiments, a larger idler may be used with an e-bike than with a pedal bike since weight may be less critical in an e-bike application.

Also shown in FIG. 8C, is a longitudinal axis 410 of the link body-6. The longitudinal axis 410 extends between the IVC[3][6] 13 and the IVC[5][6] 12. As shown in FIGS. 8F-8H, the longitudinal axis 410 may move from a position behind the IVC[1][5] 8 when the suspension linkage is in an at least partially extended state (e.g., FIG. 8F) to a position over the IVC[1][5] 8 as the suspension linkage is in an intermediate state (e.g., at an inflection point shown in FIG. 8G), and to a position in front of the IVC[1][5] 8 as the suspension linkage is moved to an at least partially compressed state (e.g., as shown in FIG. 8H).

The suspension linkage and idler cog 56 of FIGS. 9A-9H may be substantially similar to those of FIGS. 3A-3F, but applied to an e-bike frame. Duplicative description of the suspension linkage of FIGS. 9A-9H is therefore omitted for brevity. Certain aspects of the embodiment of FIGS. 9A-9G may be similar to aspects of the embodiment of FIGS. 8A-8H, such as the aspects related to e-bike features. Such similar features are not described further, for the sake of brevity. The frame of FIGS. 9A-9G includes an idler cog 56 whose axis 75 is not coincident with the IVC[1][3] 7. For example, as shown in FIGS. 9A-9G, the idler cog 56 is disposed on the suspended body-1 at a location below the IVC[1][3] 7. In other embodiments, the idler cog 56 and its axis 75 may be located in other suitable positions on the suspended body-1. The relative position of the idler cog axis 75 to the driving cog axis 19 may influence the anti-squat behavior of the suspension linkage. An advantage of the embodiment of FIGS. 9A-9G, where the idler cog axis is not coincident with the IVC[1][3] 7, includes fine tuning of the anti-squat performance of the suspension linkage, as such embodiments may have more flexibility of placement of the idler cog axis 75 when the idler cog axis 75 location is not coupled to the location of the IVC[1][3] 7 (e.g., as compared to the embodiment of FIGS. 8A-8H). For example, an idler cog axis 75 position that is further away from the driving cog axis 19 (e.g., higher or closer to the IVC[1][3] 7) reduces anti-squat of the suspension relative to a suspension whose idler cog axis is closer to the driving cog axis 19. Generally, as the idler cog axis 75 position gets closer to the IVC[1][3], anti-squat is reduced. For example, the position of the idler cog axis 75 shown in FIGS. 9A-9G, may reduce the anti-squat performance of the suspension linkage keeping it closer to 100% in magnitude at sag/inflection (e.g., in the position of the suspension linkage shown in FIG. 9F). Such a position of the idler cog axis 75 may be beneficial for an e-bike as less anti-squat may be needed with the addition of power from the motive power source 400.

FIGS. 10-13 show an embodiment of a suspended body-1 suitable for use with the e-bike frame of FIGS. 9A-9G. In this embodiment, the location of the idler cog axis 75 may be determined by an aperture 434 formed in the suspended body-1. In some embodiments, more than one aperture 434 may be formed in different locations in the suspended body-1 and/or the aperture 434 may be a slot, such that the idler cog 56 may be selectively located in different locations in the suspended body-1, such as to tune anti-squat performance of the suspension linkage. In the embodiment shown in FIGS. 10-13, the idler cog 56 may be secured to the suspended body-1 by a washer 428 and a fastener 424. The fastener 424 may be a screw, a bolt, or the like. The fastener 424 may be received in an internal race 440 of a bearing assembly 426. The outer race 442 of the bearing assembly 426 may be received in the idler cog 56, such as to allow the idler cog 56 to rotate with respect to the suspended body-1. The fastener 424 may be selectively couplable to a nut 430. For example, the fastener 424 may include threads that couple with threads in the nut 430. The nut 430 may include a keyed portion 436. The keyed portion 436 may be selectively receivable in a receptacle 438 formed in the suspended body-1. The interface of the receptacle 438 and the keyed portion 436 may prevent the nut 430 from rotating relative to the suspended body-1. In some examples, the aperture 434 may include threads adapted to receive threads of the fastener 424 alternately to the use of the nut 430.

Figure 14:
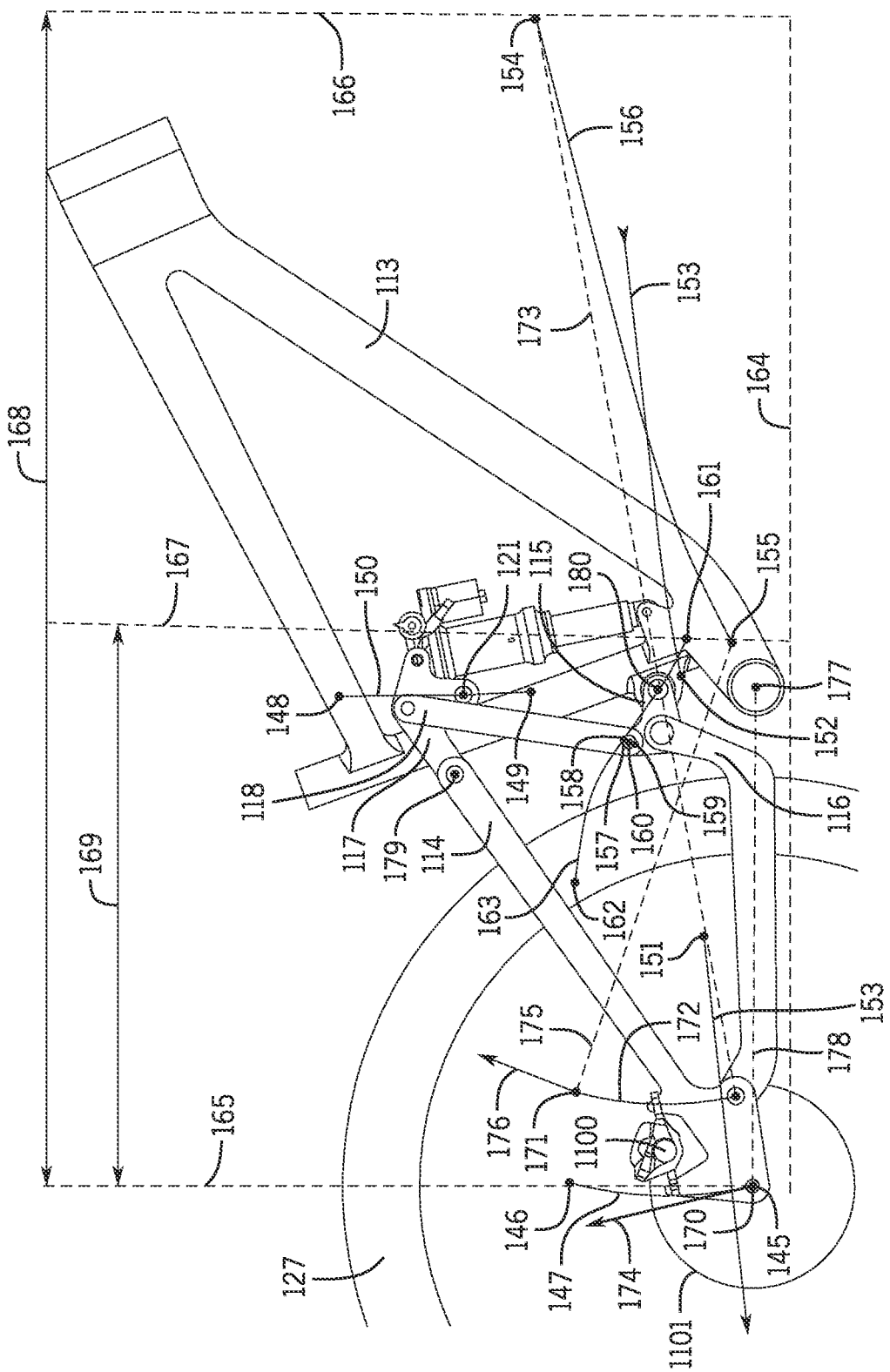
FIG. 14 shows a selected portion of the 15 IVC migration paths of the embodiments shown in FIGS. 1A, 2A, 3A, 8A, and 9A.

FIG. 14 illustrates a selected portion of the 15 IVC migration paths of the embodiments shown herein. Note that not all IVCs or IVC migrations are shown for clarity of the figure. As shown in FIG. 14, the various parts and IVCs of the suspension system may be located at different positions in the system depending on the state of the system. For example, the driven wheel axis may be located at different positions along the driven wheel axis migration path (DWAP) 147, which has a path length DWAP [L]. For example, the driven wheel axis 145 may be at extended state position as shown in FIG. 14, at compressed state position 146 as shown by the termination of DWAP 147, or at any other position along the DWAP 147. As another example, IVC[115][117] 133 may be located at different positions along the IVC[115][117] migration path 150. For example, IVC[115][117] may be at extended state position 148, at compressed state position 149, or at any other position along the IVC[115][117] migration path 150. DIVC[AD][113][114] may be located at different positions along the DIVC[AD][113][114] migration path 156, which has a path length DIVC[AD][113][114][L]. For example, DIVC[AD][113][114] may be at extended state position 154, at compressed state position 155, or at any other position along the DIVC[AD][113][114] migration path 156. IVC[115][118] may be located at different positions along the IVC[115][118] migration path 160. For example, IVC[115][118] may be at extended state position 157, at inflection point 158 of bottom link 115, at compressed state position 159, or at any other position along the IVC[115][118] migration path 160. In other words, as DWAP moves from the extended state to the compressed state, link body 115 initially rotates clockwise until IVC[115][118] reaches inflection point position 158, then reverses direction and rotates counter clockwise until IVC[115][118] reaches the compressed position 159. IVC[113][118] may be located at different positions along the IVC[113][118] migration path 163. For example, IVC[113][118] may be at extended state position 161, at compressed state position 162, or at any other position along the IVC[113][118] migration path 163.

The various migration paths may be composed of more than one migration path. For example, IVC[114][115] may be located at different positions along the IVC[114][115] migration path 153, which has an inflection point and is therefore composed of two migration paths. IVC[114][115] may be at extended state position 151, at compressed state position 152, or at any other position along the IVC[114][115] migration path 153. FIG. 14 shows IVC[114][117] at the extended state 179 and SIVC[113][115] at the extended state 180, but for the sake of clarity in the FIG. 14 does not show their migration paths.

Several different relationships may exist between IVCs, as shown in FIG. 14. For example, IVC[114][116] may have different positional relationships relative to various IVCs. IVC[114][116] may be located at different positions along the IVC[114][116] migration path 172. IVC[114][116] may be at extended state position 170, at compressed state position 171, or at any other position along the IVC[114][116] migration path 172. The relationship between IVC [114][116] at extended state position 170 and DIVC[AD][113][114] at extended state position 154 is represented by extended IVC line IVC[E] 173. In various examples, IVC [114][116] extended tangent direction IVC[114][116][ET] 174 is coincident to IVC[114][116] at extended state position 170 and perpendicular to IVC[E] 173. In various examples, the relationship between IVC[114][116] at compressed state position 171 and DIVC[AD][113][114] at compressed state position 155 is represented by compressed IVC line IVC[C] 175. In various examples, IVC[114][116] compressed tangent direction IVC[114][116][CT] 176 is coincident to IVC[114][116] at compressed state position 171 and perpendicular to IVC[C] 175.

In various examples, the base line 164 extends parallel to the ground at the extended state. Rear line 165 extends perpendicular to a rear end of base line 164 and intersects with driven wheel axis 145 at extended state position. Front line 166 extends perpendicular to a front end of base line 164 and intersects with DIVC[AD][113][114] at extended state position 154. Center line 167 is perpendicular to a center portion of base line 164 and intersects with DIVC[AD][113][114] at compressed state position 155. The DIVC extended direction variable (DIVC[AD][EDV]) 168 extends between rear line 165 and front line 166. The DIVC compressed direction variable (DIVC[AD][CDV]) 169 extends between rear line 165 and center line 167.

Figure 15:
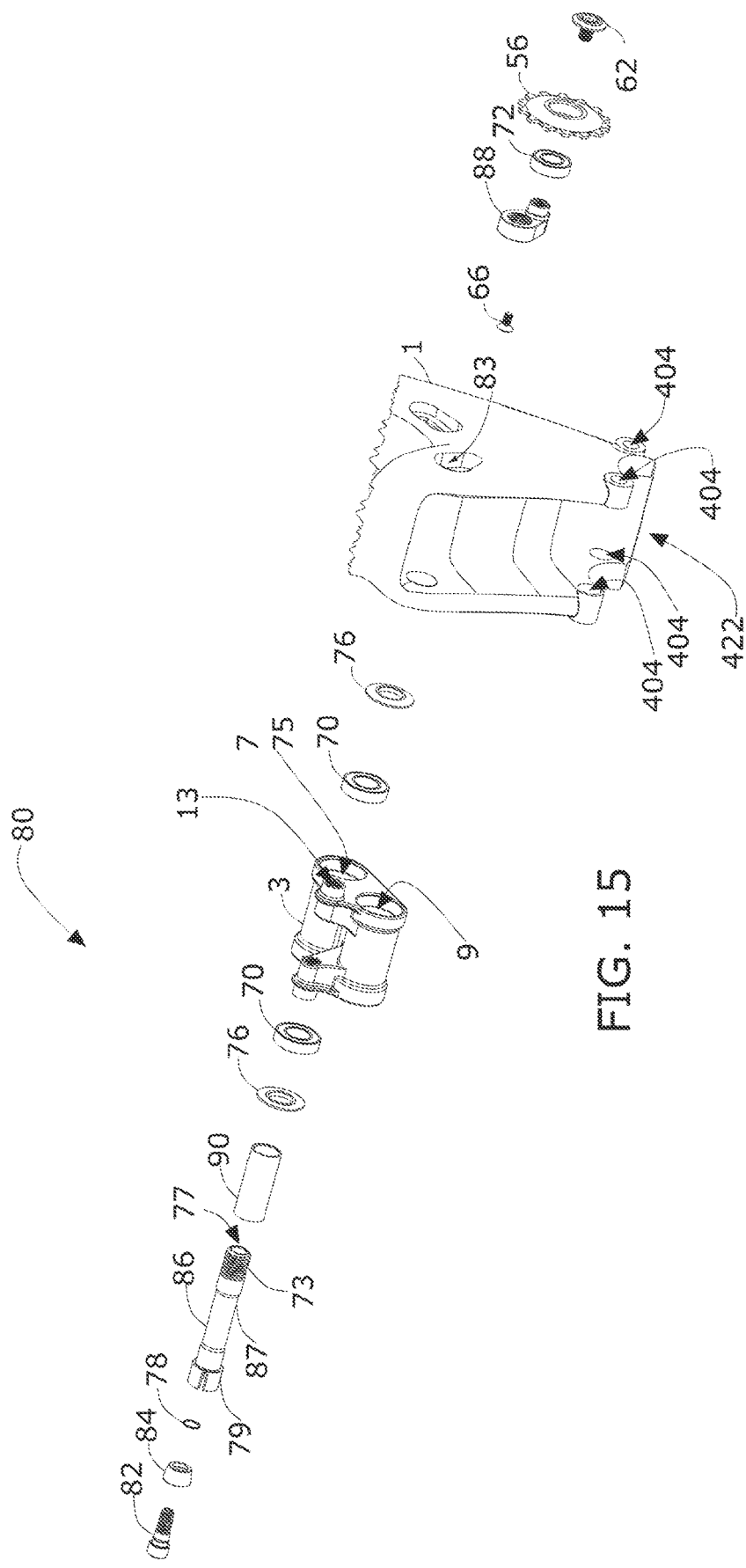
FIG. 15 shows an exploded isometric view of a portion of a suspension linkage for an electric bike.
Figure 16:
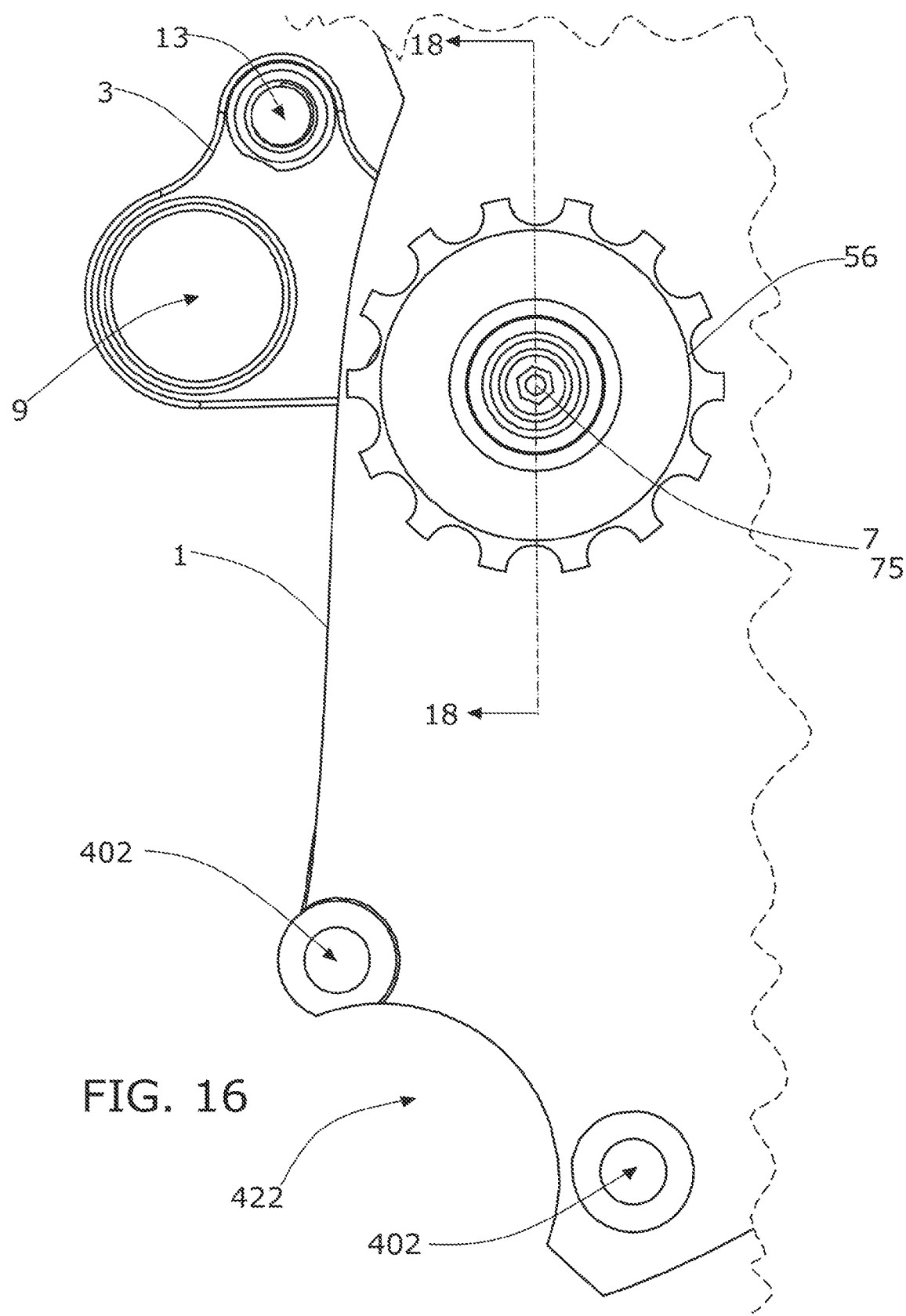
FIG. 16 shows a partial elevation view of a portion of the suspension linkage of the FIG. 15.
Figure 17A:
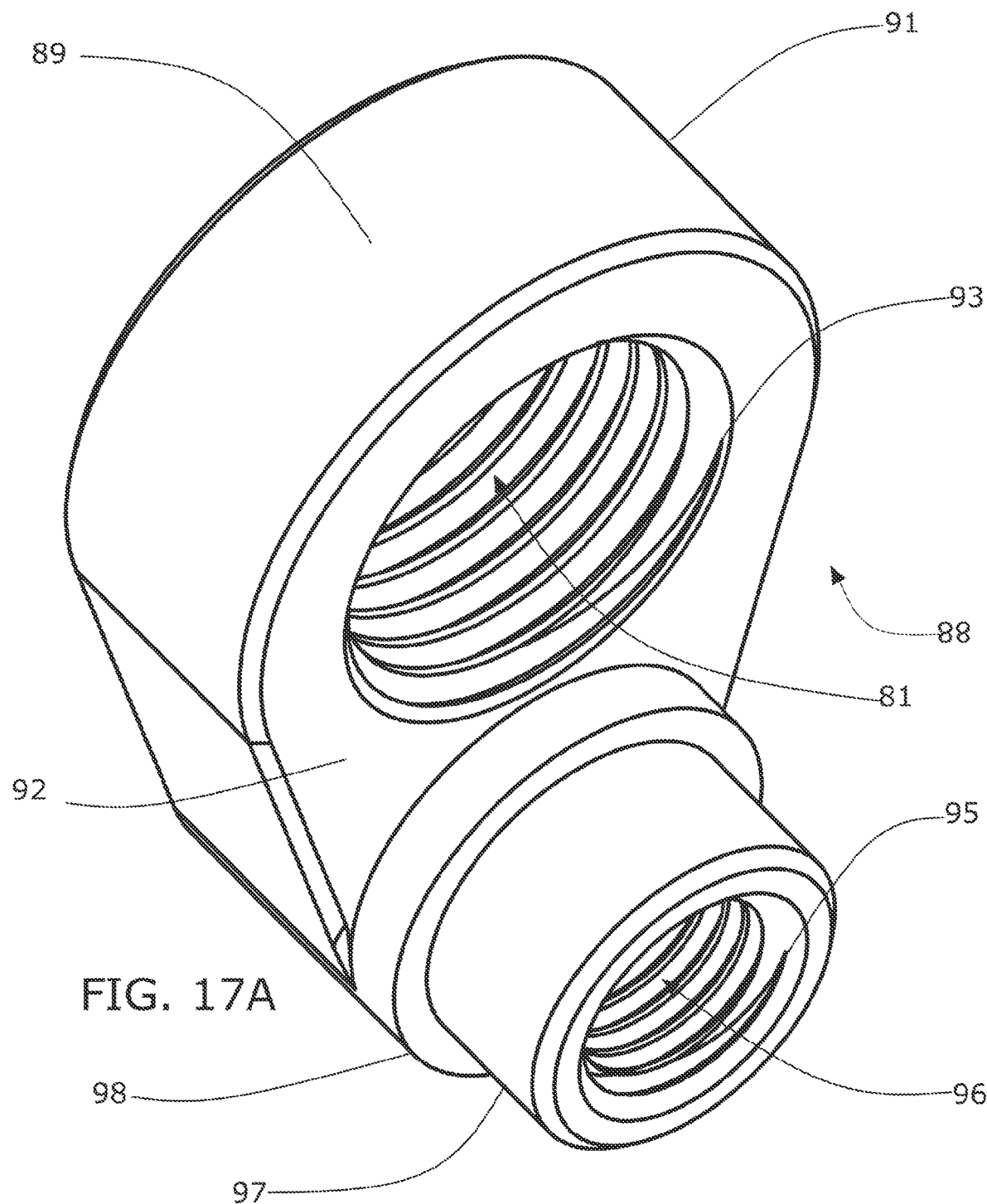
FIG. 17A shows an example of a key suitable for use with the suspension linkages disclosed herein.
Figure 17B:
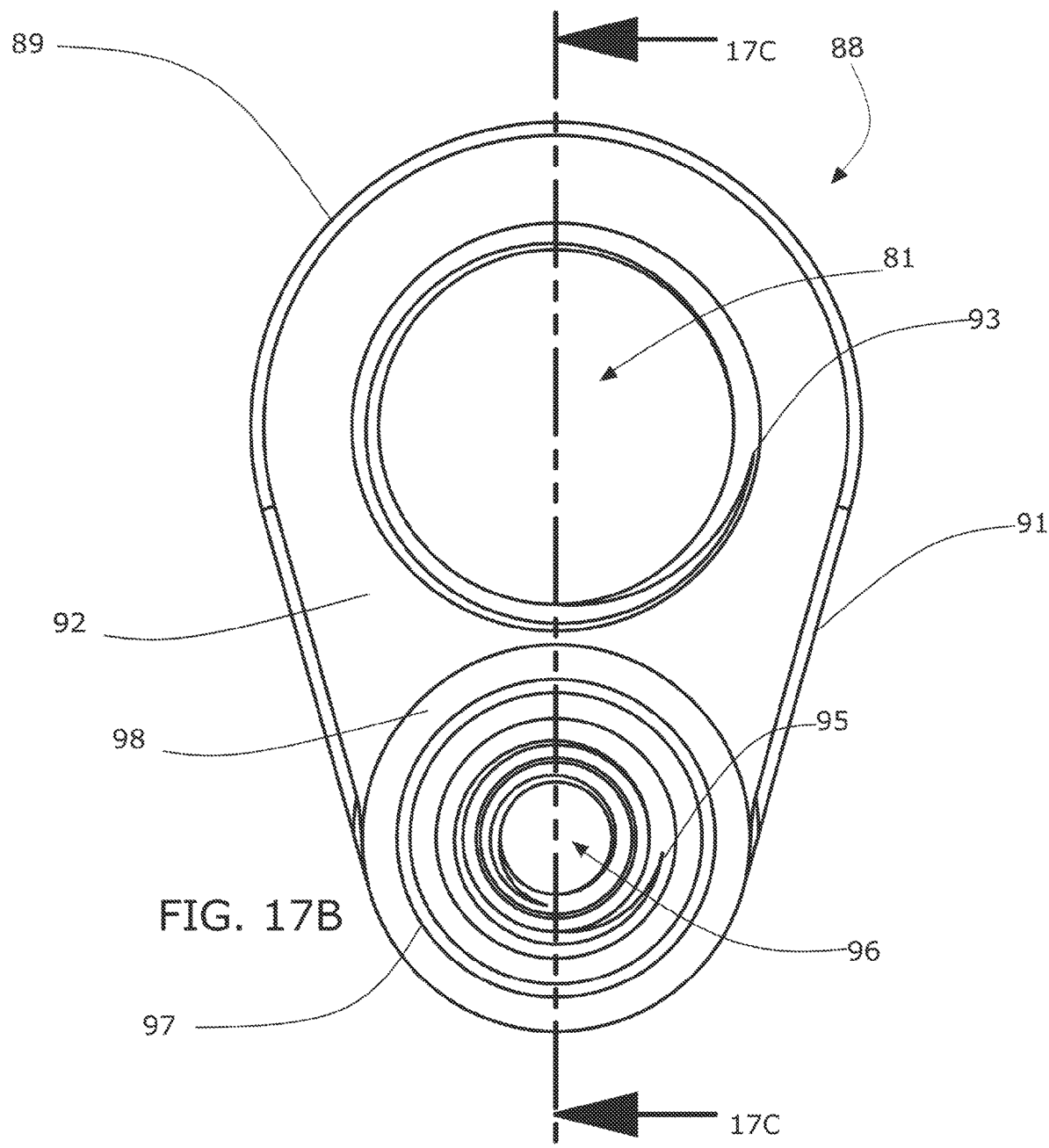
FIG. 17B shows a side elevation view of the key of FIG. 17A.
Figure 17C:
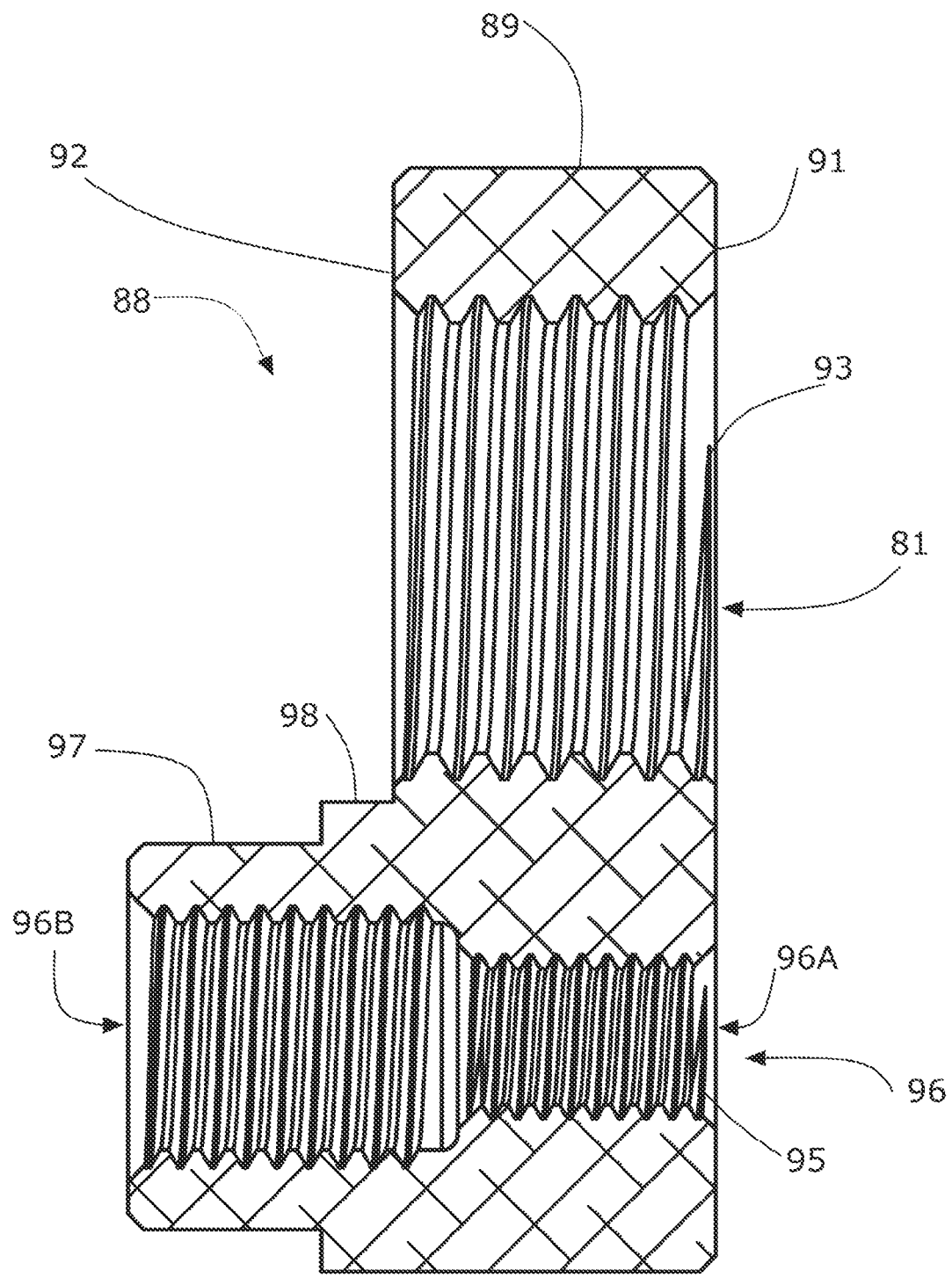
FIG. 17C shows a section view of the key of FIG. 17A taken along section line 17C-17C of FIG. 17B.
Figure 18:
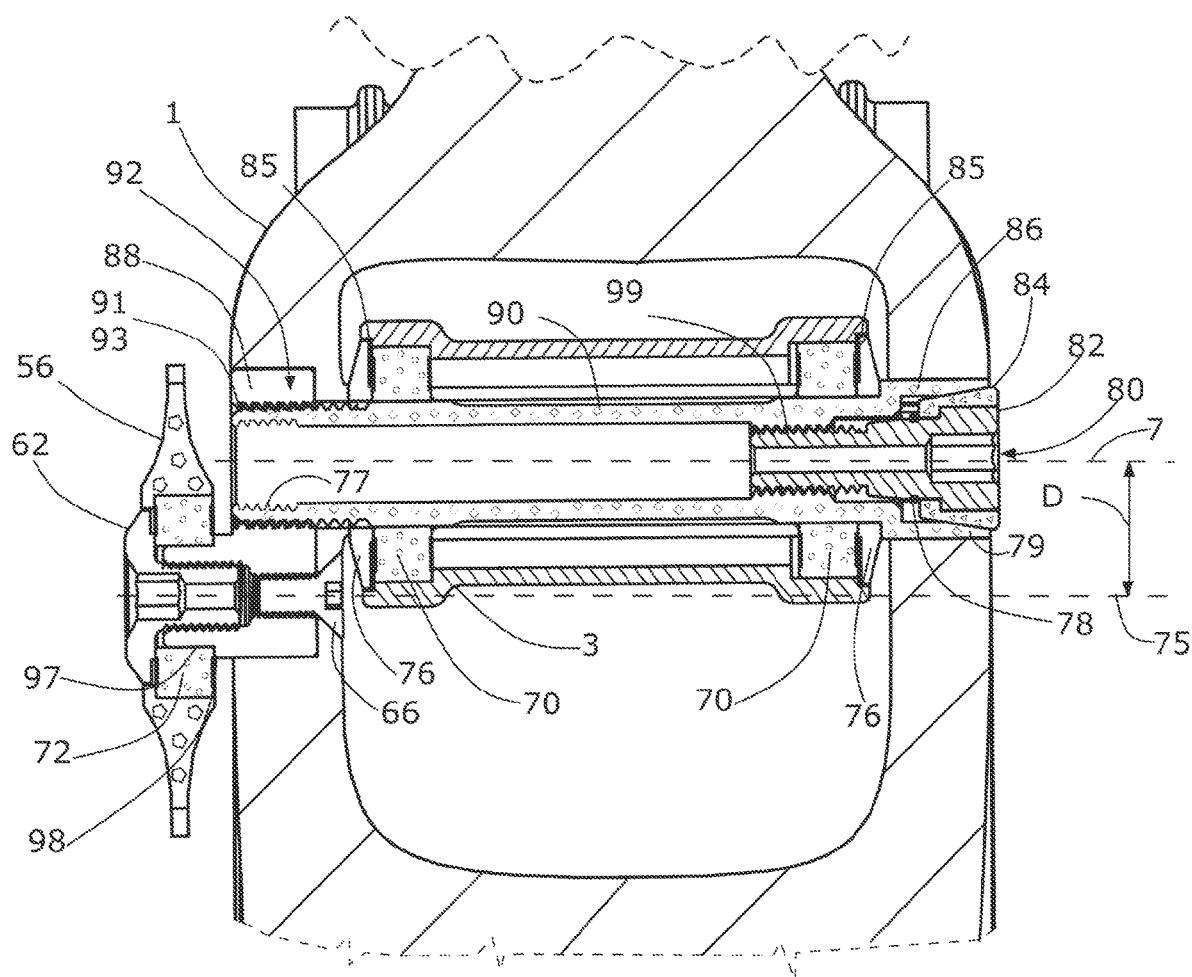
FIG. 18 shows a partial section view of the portion of the suspension linkage of FIG. 16 taken along section line 18-18 of FIG. 16.

FIG. 15 is a partial exploded rear isometric of a portion of a suspension linkage according to the present disclosure. FIG. 16 shows a partial elevation view of a portion of the suspension linkage of the FIG. 15. FIGS. 17A-C show details of a key. FIG. 18 shows a partial section view of the portion of the suspension linkage of FIG. 16 taken along section line 18-18 of FIG. 16. In FIGS. 15-18, portions of the suspension linkage are removed, for clarity. As shown for example in FIG. 15-18, the motive power source 400 may be received in the motive power source compartment 422 and secured to the suspended body 1 via the mounts 402.

As best shown in FIGS. 15 and 18, the idler 56 may be coupled to the suspended body 1 and the suspension linkage by an axle assembly 80. The link body 3 may be coupled to the suspended body 1 by the axle assembly 80. The axle assembly 80 may include a fastener element 82, a tapered collet 84, one or more race extenders 76, a retainer 78, one or more bearings 70/72, an axle 86, a key 88, an optional key fastener 66, a spacer 90, and an idler fastener 62.

With reference to FIGS. 17A-17C, the key 88 may be formed of a body 91. The body 91 may have a main portion 89. The main portion 89 may have a locking shape, such as a lobe as shown. The main portion 89 may have other suitable shapes that resist rotation when coupled with the suspended body 1 or other portions of the axle assembly 80 (e.g., triangle, square, spline, star, other polygons or irregular shapes). The main portion 89 may have an aperture 81 formed therein or therethrough (e.g., may be a through hole or a blind hole). The aperture 81 may include threads 93 formed on an inner surface thereof. A shoulder 98 may extend proud of a face 92 of the main portion 89. A wall 97 may extend from the shoulder 98 further away from the face 92 of the main portion 89. The wall 97 may have an aperture 96 formed therein or therethrough (e.g., may be a through hole or a blind hole). As shown, in FIG. 17C, the aperture 96 may have a first portion 96A with a diameter that is smaller than a diameter of a second portion 96B. The first portion 96A and the second portion 96B may be disposed end-to-end along the length of the aperture 96. A step may be formed between the portions 96A, B due to the different diameters of the respective portions. Either or both of the portions 96A, B may include helical threads 95.

The fastener element 82, key fastener 66 and/or idler fastener 62 may be a variety of types of fastener. In some examples, the fastener 82 is a socket head cap screw. In some examples the key fastener is a counter sink screw. In some examples the idler fastener is a flange bolt. The fasteners 62, 66, and 82 include external helical fastener threads adapted to mate with other components of the assembly 80. The tapered collet 84 has an aperture formed therein and adapted to receive the fastener 82. The aperture 186 is sufficiently large to allow a clearance with the fastener 82 such that the fastener threads 184 do not engage the tapered collet 84 at the aperture 186. The tapered collet 84 may be assembled with the fastener 82 and held to the fastener 82 with a retainer 78 such as a snap ring, spring, circlip, or the like. The retainer 78 may help withdraw the tapered collet 84 when disassembling the axle assembly 80.

The axle 86 may have an elongate body 87 with an expandable portion 79 at one end of the elongate body 87 and external axle threads 73 at an opposite end of the elongate body 87. The axle 86 may optionally have internal axle threads 77 at the opposite end of the elongate body 87 from the expandable portion 79. The axle 86 may include internal axle threads 99 in an end of the elongate body 87 near the expandable portion 79. The inside diameter of the expandable portion 79 may be the same size or less than an outer diameter of the tapered collet 84.

The bearings 70 may allow for rotational motion of the link body 3 with respect to the axle assembly 80. For example, the bearings 70 may be roller bearings, tapered bearings, bushings, or the like. The spacer 90 may be a hollow tube with a diameter larger than that of the axle 86. The spacer 90 may be received over the axle 86. The bearings 70 may be adapted to receive the race extenders 76. The race extender 76 and the spacer 90 may stabilize and/or locate the bearings 70 in the axle assembly 80. In some embodiments, the bearings 70 may be located or secured to the axle 86 by the spacer 90 and the race extenders 76. For example, as shown in FIG. 17, the bearing 70 may be sandwiched between the respective ends of the spacer 90 and the respective race extenders 76.

As best shown in FIG. 17, when assembled, the key 88 may be received in an aperture 83 (see FIG. 15) formed in the suspended body 1. The key 88 may be secured to the suspended body 1 such as by the pulling force of the engagement of the external axle threads 73 with the threads 93 in the aperture 81, a press fit, or by other suitable structures. The key 88 may optionally be secured to the suspended by the threaded engagement of the fastener 66 with the threads 95 of the first portion 96A of the aperture 96. The bearings 70 and respective race extenders 76, and spacer 90, may be assembled with the link body 3, such as within an aperture of the link body 3 that is coincident with the IVC[1][3] 7. Either of the bearings 70 may be floating or fixed along the axle 86. For example, the link body 3 may include a locating feature, such as a step 85, that receives an outer portion of the race extenders 76 that limits movement of the bearing 70 in a transverse direction along the axle 86. The bearings 70 may be allowed to move along the axle 86.

The fastener element 82 may be threaded into internal threads 99 formed in the axle. As the fastener element 82 is drawn in to the axle 86, the fastener element 82 may cause the collet 84 to expand the expandable portion 79 outward to engage the expandable portion 79 with the inner face of an aperture formed in the suspended body 1 (e.g., by friction), to secure the axle assembly 80 to the suspended body 1.

The bearing 72 may be assembled with the key 88. For example, an inner race of the bearing 72 may be received on the wall 97 and located by the shoulder 98. The outer race of the bearing 72 may be received in an aperture formed in the idler 56. The idler 56 and bearing 72 may be secured to the axle assembly 80 by the threaded engagement of the fastener 62 with the threads 95 of the second portion 96B of the aperture 96. The structure shown in FIG. 17 may be suitable for an idler as shown in FIGS. 3A-3F and/or FIGS. 9A-9G. The PIVC[1][3] 7 may be spaced apart from the idler rotation axis 75 by a distance D. The distance D may be determined by a spacing between the aperture 81 and the aperture 96 of the key 88. In many embodiments, the distance D may be less than or equal to about 50-mm. For example, the distance D may be about 10-mm, 15-mm, 20-mm, 25-mm, 30-mm, 35-mm, 40-mm, 45-mm, or other suitable distances. In other embodiments, the idler 56 may be secured to the axle assembly 80 such as by the optional internal axle threads 77. Such an arrangement may be suitable for an idler 56 such as shown in FIGS. 2A-2H and/or FIGS. 9A-9G.

In numerous embodiments, a method of analyzing different behaviors of the suspension system is disclosed. For example, motions related to inflection point 158 of bottom link 115 may be analyzed as the suspension is moved from the extended to the compressed state. In one example, IVC[115][118] migration path 160 may be analyzed. IVC[115][118] migration path 160 reverses as the suspension moves from the extended state at least partially to the compressed state. In another example, this behavior may be visualized by analyzing IVC[113][118] migration path 163 in comparison to IVC[115][118] migration path 160. When the suspension is in the extended state, IVC[113][118] at extended state position 161 is not coincident to IVC[115][118] migration path 160. As the suspension moves towards the compressed state, IVC[115][118] moves from extended state position 157 towards inflection point 158 of bottom link 115 along IVC[115][118] migration path 160. At a point between the driven wheel axis 145 at the extended state position and at the compressed state 146, IVC[113][118] migration path 163 intersects IVC[115][118] migration path 160 at inflection point 158. As the suspension continues to move towards the compressed state, IVC[115][118] moves from inflection point 158 towards compressed state position 159 along the IVC[115][118] migration path 160.

FIG. 14 also shows a relationship between the driven wheel axis 145 at the extended state and a driving cog axis 177, represented by the driving wheel axis to driving cog axis (DWDC) line 178. The seat-stay 114 is operatively coupled to a driven wheel 127.

Note that in all figures, "-E" denotes the extended state, "-C" denotes the compressed state, "-X" denotes a state between extended and compressed. These are only labeled at rear wheel axis 14 for clarity. Rear wheel axis 14-E at the extended state, 14-C at the compressed state, and 14-X at a position between the extended state and the compressed state are shown in figures throughout.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. For example, while some embodiments specify particular relationships between parts of the system, other relationships are contemplated. It is also contemplated that steps to any disclosed method may be performed in any order. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A two-wheel vehicle suspension linkage comprising:
    a suspended body 1, a wheel carrier body 2, a link body 3, a link body 4, a link body 5, and a link body 6 operatively coupled defining a primary instantaneous velocity center (PIVC) at each joint between link bodies;
    a wheel operatively connected to the wheel carrier body 2;
    a driven cog operatively connected to the wheel;
    a driving cog operatively connected to the suspended body 1, the driving cog being disposed transversely inboard of at least a portion of at least one of the link bodies in a plane extending through the driving cog, parallel to gravity, and parallel to an axis of rotation of the driving cog;
    an idler operatively connected by an elongated flexible member to the wheel carrier body 2, the link body 3, the link body 4, the link body 5 or the link body 6, wherein the idler is rotatable about an idler rotation axis and wherein the idler is pivotally connected to the suspended body;
    the elongated flexible member is disposed along a route between the driving cog and the driven cog, wherein the idler is disposed in the route between the driving cog and the driven cog; and
    a damper unit configured to resist movement between two or more of the suspended body 1, wheel carrier body 2, link body 3, link body 4, link body 5, or link body 6.

2. The two-wheel vehicle suspension linkage of claim 1, wherein the idler is rotatably connected to suspended body 1 concentrically with a linkage pivot with the wheel carrier body 2, the link body 3, the link body 4, the link body 5 or the link body 6.

3. The two-wheel vehicle suspension linkage of claim 2, wherein:
    the link body 3 includes jointed connections with:
        the suspended body 1 defining a PIVC[1][3],
        the link body 4 defining a PIVC[3][4], and
        the link body 6 defining a PIVC[3][6]; and
    the link body 4 includes a jointed connection with the wheel carrier body 2 defining a PIVC[2][4];
    the link body 5 includes jointed connections with:
        the suspended body 1 defining a PIVC[1][5],
        the wheel carrier body 2 defining a PIVC[2][5], and
        the link body 6 defining a PIVC[5][6]; wherein the idler rotation axis is coincident to the PIVC[1][3].

4. The two-wheel vehicle suspension linkage of claim 3, wherein the link body 6 defines a longitudinal axis, and the longitudinal axis moves from a position behind the PIVC[1][5] when the suspension linkage is in an at least partially extended state to a position in front of the PIVC[1][5] when the suspension linkage is in an at least partially compressed state.

5. The two-wheel vehicle suspension linkage of claim 3, wherein the link body-6 has a longitudinal axis extending between the PIVC[3][6] and the PIVC[5][6], wherein the longitudinal axis is in a first position behind the IVC[1][5] when the suspension linkage is in an at least partially extended state and in a second position in front of the IVC[1][5] when the suspension linkage is in a partially compressed state.

6. The two-wheel vehicle suspension linkage of claim 1, wherein the idler rotation axis is coincident to a PIVC defined by a combination of the suspended body 1 and, the wheel carrier body 2, the link body 3, the link body 4, the link body 5, or the link body 6.

7. The two-wheel vehicle suspension linkage of claim 6, wherein the idler is mounted to an axle, wherein the axle is pivotally connecting the wheel carrier body 2, linkage body 3, linkage body 4, linkage body 5, or linkage body 6 to suspended body-1.

8. The two-wheel vehicle suspension linkage of claim 1, wherein the link body 3 includes jointed connections with:
    the suspended body 1 defining a PIVC[1][3],
    the link body 4 defining a PIVC[3][4], and
    the link body 6 defining a PIVC[3][6];
    the link body 4 includes a jointed connection with wheel carrier body 2 defining a PIVC[2][4];
    the link body 5 includes jointed connections with:
    the suspended body 1 defining a PIVC[1][5],
    the wheel carrier body 2 defining a PIVC[2][5], and
    the link body 6 defining a PIVC[5][6], wherein the idler rotation axis is not coincident to the PIVC[1][3].

9. The two-wheel vehicle suspension linkage of claim 8, wherein the PIVC[1][3][7] is spaced apart from the idler rotation axis by a distance of less than or equal to 50-mm.

10. The two-wheel vehicle suspension linkage of claim 1, wherein the idler comprises an idler cog.

11. The two-wheel vehicle suspension linkage of claim 1, wherein at least one PIVC migration path reverses as the suspension linkage moves from an at least partially extended state to an at least partially compressed state.

12. The two-wheel vehicle suspension linkage of claim 1, wherein the suspended body 1 includes:
    a motive power source compartment, and
    an energy storage compartment selectively coverable by a panel.

13. The two-wheel vehicle suspension linkage of claim 12, further comprising:

a motive power source received in the motive power source compartment;

an energy storage module received in the energy storage compartment and contained by the panel;

an electrical conduit in electrical communication with the motive power source and the energy storage module and operative to supply electrical power from the energy storage module to the motive power source.

14. The two-wheel vehicle suspension linkage of claim 12, wherein the idler rotation axis is coincident with a PIVC.

15. The two-wheel vehicle suspension linkage of claim 12, wherein the idler rotation axis is not coincident with a PIVC.

16. The two-wheel vehicle suspension linkage of claim 1, wherein the driving cog is rotatable about a driving cog axis and the idler rotation axis is disposed above and forward of the driving cog axis.

17. The two-wheel vehicle suspension linkage of claim 1, wherein a contact angle formed between a forward vertical tangent of the driving cog and line that is tangent to both the driving cog and the idler is greater than zero degrees.

18. The two-wheel vehicle suspension linkage of claim 1, further comprising an instantaneous force center (IFC) located at an intersection of a force vector of the elongated flexible member and a driving force vector, wherein as the suspension linkage moves between an extended and compressed state, the IFC moves from an extended position rearward to an intermediate position and then forward to compressed position.

19. The two-wheel vehicle suspension linkage of claim 18, wherein the compressed position is forward of at least one of the extended position or the intermediate position.

20. The two-wheel vehicle suspension linkage of claim 1, wherein an anti-squat percentage of the suspension linkage increases as a vertical travel of the wheel increases to a first position, wherein as the vertical wheel travel increases further to a second position, the anti-squat percentage falls.

21. The two-wheel vehicle suspension linkage of claim 1, wherein a rate of change of a power transmitting length of the elongated flexible member (dPTL) increases as a vertical travel of the wheel increases to a first position, wherein as the vertical wheel travel increases further to a second position, the dPTL falls.

22. The two-wheel vehicle suspension linkage of claim 21, wherein the dPTL is maximized near a sag point of the two-wheel vehicle suspension linkage.

23. The two-wheel vehicle suspension linkage of claim 21, wherein the dPTL is maximized at a first value of the vertical travel of the wheel, and wherein the link body 3 has an inflection point at a second value of the vertical travel of the wheel greater than the first value.

24. A two-wheel vehicle suspension linkage comprising:
a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies;
a driving cog having a driving cog diameter and operatively connected to the suspended body 1, wherein the driving cog is rotatable in a driving cog center plane about a driving cog axis normal to the driving cog center plane, and a driving cog region is defined between:
a front driving cog plane tangent to a front of the driving cog diameter, parallel to the driving cog axis, and parallel to gravity, and
a rear driving cog plane tangent to a rear of the driving cog diameter, parallel to the driving cog axis, and parallel to gravity, wherein at least a portion of one or more of the plurality of link bodies is located inside the driving cog region and extends transversely outward past the driving cog center plane.

25. The two-wheel vehicle suspension linkage of claim 24, further comprising a damper unit configured to resist movement between two or more of the suspended body 1, the wheel carrier body 2, the link body 3, the link body 4, the link body 5, or the link body 6.

26. A two-wheel vehicle suspension linkage comprising:
a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies;
a driving cog operatively connected to the suspended body 1 and defining a driving cog axis of rotation, a driving cog radius, a driving cog center plane, and a driving cog region, wherein;
the driving cog region is defined between a front driving cog plane tangent to a front of the driving cog, parallel to the driving cog axis of rotation, and parallel to gravity and a rear driving cog plane tangent to a rear of the driving cog, parallel to the driving cog axis of rotation, and parallel to gravity,
a first distance from a suspended body center plane to a vertical reference plane of one or more of the plurality of link bodies normal to the driving cog axis is greater than a second distance from the suspended body center plane to the driving cog center plane, and
the first distance and the second distance are measured in the driving cog region;
wherein the link body 3 includes jointed connections with:
the suspended body 1 defining a PIVC[1][3],
the link body 4 defining a PIVC[3][4], and
the link body 6 defining a PIVC[3][6]; and
the link body 4 includes a jointed connection with wheel carrier body 2 defining a PIVC[2][4];
the link body 5 includes jointed connections with:
the suspended body 1 defining a PIVC[1][5],
the wheel carrier body 2 defining PIVC[2][5], and
the link body 6 defining an PIVC[5][6], wherein the driving cog radius is 40%-65% of a distance from the PIVC[1][3] to the driving cog axis of rotation.

27. The two-wheel vehicle suspension linkage of claim 26 further comprising a damper unit configured to resist movement between two or more of the suspended body 1, the wheel carrier body 2, the link body 3, the link body 4, the link body 5, or the link body 6.

28. A two-wheel vehicle suspension linkage comprising:
a suspended body 1, and a plurality of link bodies including a wheel carrier body 2, a link body 3, a link body 4, a link body 5, and a link body 6 operatively coupled defining a primary instantaneous velocity center (PIVC) at each joint between the plurality of link bodies;
a driving cog operatively connected to the suspended body 1 and defining a driving cog radius, a driving cog axis of rotation, and a driving cog center plane, wherein a portion of the link body 4 is located outside the driving cog center plane in a vertical cross-sectional view of the two-wheel vehicle suspension linkage parallel to the driving cog axis of rotation and between a front driving cog plane and a rear driving cog plane, the front driving cog plane being tangent to a front of the driving cog, parallel to the driving cog axis of rotation, and parallel to gravity, the rear driving cog plane being tangent to a rear of the driving cog, parallel to the driving cog axis of rotation, and parallel to gravity;

wherein the link body 3 includes jointed connections with:
the suspended body 1 defining a PIVC[1][3],
the link body 4 defining a PIVC[3][4], and
the link body 6 defining a PIVC[3][6]; and the link body 4 includes a jointed connection with wheel carrier body 2 defining a PIVC[2][4];

the link body 5 includes jointed connections with:
the suspended body 1 defining a PIVC[1][5],
the wheel carrier body 2 defining a PIVC[2][5], and
the link body 6 defining a PIVC[5][6], wherein the driving cog radius is 40%-70% of a distance from the PIVC[3][6] to the PIVC[5][6].

29. The two-wheel vehicle suspension linkage of claim 28 further comprising a damper unit configured to resist movement between two or more of the suspended body 1, the wheel carrier body 2, the link body 3, the link body 4, the link body 5, or the link body 6.

30. A two-wheel vehicle suspension linkage comprising:
a suspended body 1;
a wheel carrier body 2;
a wheel operatively connected to the wheel carrier body 2;
a driven cog operatively connected to the wheel;
a driving cog operatively connected to the suspended body 1;
an idler operatively connected to the suspended body 1, wherein the idler is rotatable about an idler rotation axis; and
an elongated flexible member disposed along a route between the driving cog and the driven cog, wherein the idler is disposed in the route between the driving cog and the driven cog, wherein an instantaneous force center (IFC) is located at an intersection of a force vector of the elongated flexible member and a driving force vector, wherein as the suspension linkage moves between an extended and compressed state, the IFC moves from an extended position rearward to an intermediate position and then forward to compressed position, wherein an axis of the wheel in the compressed state is rearward of an axis of the wheel in the extended state.

31. The two-wheel vehicle suspension linkage of claim 30 further comprising a link body 3, a link body 4, a link body 5, and a link body 6 operatively coupled with one another and the suspended body 1 and wheel carrier body 2 and defining a primary instantaneous velocity center (PIVC) at each joint between link bodies.

32. The two-wheel vehicle suspension linkage of claim 30 further comprising a damper unit configured to resist movement between two or more of the suspended body 1, wheel carrier body 2, link body 3, link body 4, link body 5, or link body 6.

33. A two-wheel vehicle suspension linkage comprising:
a suspended body 1;
a wheel carrier body 2;
a wheel operatively connected to the wheel carrier body 2;
a driven cog operatively connected to the wheel;
a driving cog operatively connected to the suspended body 1;
an idler operatively connected to the suspended body 1, wherein the idler is rotatable about an idler rotation axis; and
an elongated flexible member disposed along a route between the driving cog and the driven cog, wherein the idler is disposed in the route between the driving cog and the driven cog, wherein a rate of change of a power transmitting length of the elongated flexible member (dPTL) increases as a vertical travel of the wheel increases to a first position, wherein as the vertical wheel travel increases further to a second position, the dPTL falls, wherein a driven wheel axis path of the wheel is rearward from a minimum vertical wheel travel to a maximum vertical wheel travel.

34. The two-wheel vehicle suspension linkage of claim 33 further comprising a link body 3, a link body 4, a link body 5, and a link body 6 operatively coupled with one another and the suspended body 1 and wheel carrier body 2 and defining a primary instantaneous velocity center (PIVC) at each joint between link bodies.

35. The two-wheel vehicle suspension linkage of claim 33 further comprising a damper unit configured to resist movement between two or more of the suspended body 1, wheel carrier body 2, link body 3, link body 4, link body 5, or link body 6.

* * * * *